United States Patent
Kim et al.

(10) Patent No.: US 12,539,310 B2
(45) Date of Patent: Feb. 3, 2026

(54) HETERO-STRUCTURED RIBONUCLEIC ACID AND USE THEREOF

(71) Applicant: NA VACCINE INSTITUTE, Seoul (KR)

(72) Inventors: Dong Ho Kim, Seongnam-si (KR); Myung Soo Kang, Seoul (KR)

(73) Assignee: NA VACCINE INSTITUTE, Seoul (KR)

( * ) Notice: Subject to any disclaimer, the term of this patent is extended or adjusted under 35 U.S.C. 154(b) by 1136 days.

(21) Appl. No.: 17/510,536

(22) Filed: Oct. 26, 2021

(65) Prior Publication Data

US 2022/0193112 A1 Jun. 23, 2022

Related U.S. Application Data

(63) Continuation-in-part of application No. PCT/KR2020/008623, filed on Jul. 1, 2020.

(30) Foreign Application Priority Data

| Jul. 2, 2019 | (KR) | 10-2019-0079470 |
| Nov. 26, 2019 | (KR) | 10-2019-0153760 |
| Mar. 27, 2020 | (KR) | 10-2020-0037711 |

(51) Int. Cl.
| A61K 31/7105 | (2006.01) |
| A61K 39/00 | (2006.01) |
| A61P 35/00 | (2006.01) |

(52) U.S. Cl.
CPC ...... *A61K 31/7105* (2013.01); *A61K 39/0011* (2013.01); *A61P 35/00* (2018.01); *A61K 2039/5156* (2013.01)

(58) Field of Classification Search
CPC ...... A61K 31/7105; A61K 2039/55561; C12N 2310/17; C12N 15/117; C12N 15/113
See application file for complete search history.

(56) References Cited

U.S. PATENT DOCUMENTS

| 5,712,257 A | 1/1998 | Carter |
| 5,906,980 A | 5/1999 | Carter |
| 7,834,064 B2 | 11/2010 | Salazar |
| 7,981,673 B2 | 7/2011 | Adams et al. |
| 9,012,622 B2 * | 4/2015 | Lu ............... C12N 15/1138 435/6.14 |
| 9,090,650 B2 | 7/2015 | Seya et al. |
| 9,315,538 B2 | 4/2016 | Carter et al. |
| 10,023,871 B2 | 7/2018 | Rohayem |
| 2007/0003960 A1 | 1/2007 | Tuschl et al. |
| 2007/0160632 A1 | 7/2007 | Haixiang |
| 2007/0224219 A1 | 9/2007 | Carter et al. |
| 2009/0041809 A1 | 2/2009 | Emtage |
| 2009/0088401 A1 | 4/2009 | Salazar |
| 2012/0244185 A1 | 9/2012 | Tucker et al. |
| 2014/0335154 A1 | 11/2014 | Bot |
| 2015/0307884 A1 | 10/2015 | Nakano et al. |
| 2016/0310590 A1 | 10/2016 | O'Hagan et al. |
| 2017/0107517 A1 | 4/2017 | Rohayem et al. |
| 2018/0216078 A1 | 8/2018 | Rossi et al. |

FOREIGN PATENT DOCUMENTS

| EP | 2477652 A1 | 7/2012 |
| EP | 3083962 A1 | 6/2015 |
| WO | WO2003-028656 A2 | 4/2003 |
| WO | WO2003-099298 A1 | 12/2003 |
| WO | WO2009-130301 A1 | 10/2009 |
| WO | WO2010-047835 A2 | 4/2010 |
| WO | WO2012-014945 A1 | 2/2012 |
| WO | WO2014-165296 A1 | 10/2014 |
| WO | WO 2019/083962 A1 | 5/2019 |

OTHER PUBLICATIONS

Kong et al., May 30, 2023, Cell Reports, 42, 112441, p. 1-20 (Year: 2023).*
Sadeq et al., 2021, Non-coding RNA, 7, 15, p. 1-18 (Year: 2002).*
Sacbrood virus strain BJ 2012, complete genome; GenBank: KF960044.1 (Year: 2014).*
Brutscher et al., Jul. 25, 2017, Scientific Reports, 7:6448, p. 1-15 (Year: 2017).*
Jelinek et al., 2011, The Journal of Immunology, 186 (4): 2422-2429 (Year: 2011).*
Leonard et al., Jan. 8, 2008, PNAS, vol. 105, No. 1, p. 258-263 and Supplemental Methods (Year: 2008).*
Ohmichi et al., 2002, J. Am. Chem. Soc. 124, p. 10367-10372 (Year: 2002).*
MEGAscript® RNAi Kit, Part No. AM1626, Instruction Manual, Revision Date: Oct. 2009, p. 1-29 (Year: 2009).*
Anzar et al., May 2, 2019, Journal for Immuno Therapy of Cancer, 7:116, p. 1-16 (Year: 2019).*
Office Action issued Mar. 28, 2023, in corresponding Japanese Patent Application No. 2021-578257 (with English Translation), 17 pages.
Kabilova T.O. et al. "Antiproliferative and interferon-inducing activities of unique short double- stranded RNA" Biochemistry, Bilophysics and Molecular Biology, 2011, vol. 436, pp. 8-11.
Marques J.T. et al.," A structural basis for discriminating between self and nonself double-stranded RNAs in mammalian cells", Nat Biotechnol, vol. 24, pp. 559-565, 2006.
Shinagawa T. et al., "Generation of Ski-knockdown mice by expressing a long double-strand RNA from an RNA polymerase II promoter", Genes Dev, vol. 17, 2003, pp. 1340-1345.
Zharkov M.I. et al., "Molecular Mechanism of the Antiproliferative Activity of Short Immunostimulating dsRNA", Front Oncol, 2019, vol. 9:1454, 12 pages.
First Examination Report issued Nov. 2023, in corresponding Australian Patent Application No. 2020299074, 6 pages.

(Continued)

*Primary Examiner* — Soren Harward
*Assistant Examiner* — Jenna L Persons
(74) *Attorney, Agent, or Firm* — Oblon, McClelland, Maier & Neustadt, L.L.P.

(57) ABSTRACT

A hetero-structured RNA with two 3'-overhangs and use thereof as an immune stimulant are provided.

12 Claims, 18 Drawing Sheets

Specification includes a Sequence Listing.

(56) References Cited

OTHER PUBLICATIONS

Extended European Search Report issued Nov. 2, 2023, in corresponding European Patent Application No. 20835409.2, 13 pages.
Monica J. Piatek et al., Endogenous siRNAs, regulators of internal affairs, Biochem Soc Trans. Aug. 2014, vol. 42(4), pp. 1174-1179.
Jiehua Zhou et al. "Deep Sequencing Analyses of DsiRNAs Reveal the Influence of 3' Terminal Overhangs on Dicing Polarity, Strand Selectivity, and RNA Editing of siRNAs", Molecular Therapy-Nucleic Acids, vol. 1, Jan. 1, 2012, p. e17, XP055377053.
Satoyo Okahira et al., "Interferon-β Induction Through Toll-Like Receptor 3 Depends on Double-Stranded RNA Structure", DNA and Cell Biology, vol. 24, No. 10, Oct. 1, 2005 (Oct. 1, 2005), pp. 614-623.
James Hough et al., "Strategies for the production of dsRNA biocontrols as alternatives to chemical pesticides", Frontiers in Bioengineering and Biotechnology, vol. 10, Oct. 10, 2022 (Oct. 10, 2022), XP093048482.
Amanda S. O'toole et al., "Stability of 3' double nucleotide overhangs that model the 3' ends of siRNA", RNA, vol. 11, No. 4, Apr. 1, 2005, pp. 512-516, XP093048695.
Øyvind Kileng et al., "Induction of interferon system genes in Atlantic salmon by the imidazoquinoline S-27609, a ligand for Toll-like receptor 7", Fish & Shellfish Immunology, Academic Press, London, GB, vol. 24, No. 5, May 1, 2008 (May 1, 2008), pp. 514-522.
Victoria J Philbin et al., "Identification and characterization of a functional, alternatively spliced Toll-like receptor 7 (TLR7) and genomic disruption of TLR8 in chickens", Cancer Research, Wiley-Blackwell Publishing Ltd, GB, vol. 114, No. 4, Mar. 21, pp. 507-521.
Anonymous: "MEGAscript RNAi Kit", Oct. 27, 2009 (Oct. 27, 2009), XP093048721.
Tsukasa Seya et al., "A Toll-like receptor 3 (TLR3) agonist ARNAX for therapeutic immunotherapy", Advanced Drug Delivery Reviews, Elsevier, Amsterdam, NL, vol. 147, Jul. 1, 2019 (Jul. 1, 2019), pp. 37-43, XP085927685.
Tsukasa Seya et al., "Targeting TLR3 with no RIG-I/MDA5 activation is effective in immunotherapy for cancer", Expert Opinion on therapeutic targets, vol. 17, No. 5, Feb. 18, 2013 (Feb. 18, 2013), pp. 533-544.
J. N. Leonard et al., "The TLR3 signaling complex forms by cooperative receptor dimerization", Proceedings of the National Academy of Sciences, vol. 105, No. 1, Jan. 8, 2008 (Jan. 8, 2008), pp. 258-263.
Bo Jin et al, "Immunomodulatory Effects of dsRNA and Its Potential as Vaccine Adjuvant" Journal of Biomedicine and Biotechnology, vol. 2010, Article ID 690438, 17pages.
Ivett Jelinek et al. "TLR3-Specific Double-Stranded RNA Oligonucleotide Adjuvants Induce Dendritic Cell Cross-Presentation, CTL Responses, and Antiviral Protection" The Journal of Immunology, 2011, 186:2422-2429.
"Cosmid vector pPIBTcosTET, complete sequence—Nucleotide-NCBI". GenBank: EU234497.1, (2021).
"Tomato 5-enolpyruvylshikimate-3-phosphate synthase mRNA, complete cds—Nucleotide—NCBI". GenBank: M21071.1 (2021).
"Sacbrond virus isolate BJ8 structural polyprotein gene, complete cds—Nucleotide—NCBI" GenBank: KF960043.1 (2021).
Laura M. Brutscher et al. "Virus and dsRNA-triggered transcriptional responses reveal key components of honey bee antiviral defense" Scientific Reports, (Jul. 25, 2017).
Maria Gonzalez-Cao et al. "Activation of viral defense signaling in cancer" Therapeutic Advances in Medical Oncology (2018, vol. 10: 1-12).
M. Firoz Mian et al. "Length of dsRNA (poly I:C) drives distinct innate immune responses, depending on the cell type", Journal of Leukocyte Biology, vol. 94, Nov. 2013.
Yi Zhang et al. "A novel rabies vaccine based on toll-like receptor 3 (TLR3) agonist PIKA adjuvant exhibiting excellent safety and efficacy in animal studies", Virology 489 (2016) 165-172.
Yuk Fai Lau et al. "Activation of the innate immune system provides broad spectrum protection against influenza A viruses with pandemic potential in mice". Virology, Oct. 10, 2010; 406(1): 80-87.
Tetsuo Nakano et al. "Novel methods for nucleotide length control in double-stranded polyinosinic-polycytidylic acid production using uneven length components", Bioscience, Biotechnology, and Biochemistry, 2018, vol. 82, No. 11, 1889-1901.
Misako Matsumoto et al. "Defined TLR3-specific adjuvant that induces NK and CTL activation without significant cytokine production in vivo". Nature Communications 6, (2015). doi:10.1038/ncomms7280.
Matthew D. Vesely et al. "Natural Innate and Adaptive Immunity to Cancer", Annu. Rev. Immunol. 2011.29:235-271.
Ira Mellman et al. "Cancer immunotherapy comes of age", Nature,; 480(7378): 480-489.(2011).
Kazuo Sugamura el al. "Therapeutic Targeting of the Effector T-Cell Co-Stimulatory Molecule QX40", Reviews, vol. 4, Jun. 2004.
Pejman Soroosh et al. "OX40-OX40 Ligand Interaction through T Cell-T Cell Contact Contributes to CD4 T Cell Longevity", The Journal of Immunology, 2006.
Deanne M. Compaan et al. "The Crystal Structure of the Costimulatory OC40-OX40L Complex", Structure 14, 1321-1330, Aug. 2006.
Andrew Weinberg et al. "Engagement of the OX-40 Receptor In Vivo Enhances Antitumor Immunity". The Journal of Immunology, 2000.
Silvia Piconese et al. "OX40 triggering blocks suppression by regulatory T cells nd facilitates tumor rejection", The Journal of Experimental Medicine, vol. 205, Apr. 2008.
Brendan Curti et al. "OX40 is a Potent Immune-Stimulating Target in Late-Stage Cancer Patients". Cancer Res; 73(24) Dec. 2013.
Michael Croft et al. "The significance of OX40 and OX40L to T-cell biology and immune disease", Immunological Reviews 229, 2009.
Taku Okazaki et al. "PD-1 and PD-1 ligand's: from discovery to clinical application", International Immunology, vol. 19, No. 7, pp. 813-624, 2007.
R. Housion Thompson et al."Tomor B7-H1 is Associated with Poor Prognosis in Renal Cell Carcinoma Patients with Long-term Follow-up", Cancer Res 2006, 66: (7).
Mojgan Ahmadzadeh et al. "Tumor antigen-specific CD8 T cells infiltrating the tumor express high levels of PD-1 and are functionally impaired", Blood, Aug. 2009, vol. 114, No. 6.
Arlene Sharpe et al. "The B7-CD28 Superfamily", Nature Reviews, Immunology, vol. 2, Feb. 2002.
Mary E. Keir et al. "PD-1 and Its Ligands in Tolerance and Immunity", Annu Rev. Immunol. 2008.26:677-704.
International Search Report issued Oct. 8, 2020, in PCT/KR2020/008623 filed Jul. 1, 2020.
Written Opinion issued Oct. 8, 2020, in PCT/KR2020/008623 filed Jul. 1, 2020.
Office Action mailed on Jan. 28, 2021, in corresponding Korean Patent Application No. 10-2020-37711.
KR NOA mailed on Apr. 27, 2021, in corresponding Korean Patent Application No. 10-2020-37711.

* cited by examiner

SEQUENCE LISTING

<160> NUMBER OF SEQ ID NOS: 99

<210> SEQ ID NO 1

-continued

```
<211> LENGTH: 123
<212> TYPE: RNA
<213> ORGANISM: Artificial Sequence
<220> FEATURE:
<223> OTHER INFORMATION: Synthetic Heterostructured RNA (NA1001)

<400> SEQUENCE: 1
gggucgcgcg uuucggugau gacggugaaa accucugaca caugcagcuc ccggagacgg    60
ucacagcuug ucuguaagcg gaugccggga gcagacaagc ccgcccuaua gugagucgua   120
uua                                                                 123

<210> SEQ ID NO 2
<211> LENGTH: 173
<212> TYPE: RNA
<213> ORGANISM: Artificial Sequence
<220> FEATURE:
<223> OTHER INFORMATION: Synthetic Heterostructured RNA (NA1501)

<400> SEQUENCE: 2
gggucgcgcg uuucggugau gacggugaaa accucugaca caugcagcuc ccggagacgg    60
ucacagcuug ucuguaagcg gaugccggga gcagacaagc ccgucagggc gcgucagcgg   120
guguuggcgg gugucggggc uggcuuaacu augcccuaua gugagucgua uua          173

<210> SEQ ID NO 3
<211> LENGTH: 223
<212> TYPE: RNA
<213> ORGANISM: Artificial Sequence
<220> FEATURE:
<223> OTHER INFORMATION: Synthetic Heterostructured RNA (NA2001)

<400> SEQUENCE: 3
gggucgcgcg uuucggugau gacggugaaa accucugaca caugcagcuc ccggagacgg    60
ucacagcuug ucuguaagcg gaugccggga gcagacaagc ccgucagggc gcgucagcgg   120
guguuggcgg gugucggggc uggcuuaacu augcggcauc agagcagauu guacugagag   180
ugcaccauau gcggugugaa auacccuaua gugagucgua uua                     223

<210> SEQ ID NO 4
<211> LENGTH: 323
<212> TYPE: RNA
<213> ORGANISM: Artificial Sequence
<220> FEATURE:
<223> OTHER INFORMATION: Synthetic Heterostructured RNA (NA3001)

<400> SEQUENCE: 4
gggucgcgcg uuucggugau gacggugaaa accucugaca caugcagcuc ccggagacgg    60
ucacagcuug ucuguaagcg gaugccggga gcagacaagc ccgucagggc gcgucagcgg   120
guguuggcgg gugucggggc uggcuuaacu augcggcauc agagcagauu guacugagag   180
ugcaccauau gcggugugaa auaccgcaca gaugcguaag gagaaaauac cgcaucaggc   240
gccauucgcc auucaggcug cgcaacuguu gggaagggcg aucggugcgg gccucuucgc   300
uaucccuaua gugagucgua uua                                           323

<210> SEQ ID NO 5
<211> LENGTH: 423
<212> TYPE: RNA
<213> ORGANISM: Artificial Sequence
<220> FEATURE:
<223> OTHER INFORMATION: Synthetic Heterostructured RNA (NA4001)

<400> SEQUENCE: 5
```

```
gggucgcgcg uuucggugau gacggugaaa accucugaca caugcagcuc ccggagacgg      60
ucacagcuug ucuguaagcg gaugccggga gcagacaagc ccgucagggc gcgucagcgg     120
guguuggcgg gugucgggc uggcuuaacu augcggcauc agagcagauu guacugagag      180
ugcaccauau gcggugugaa auaccgcaca gaugcguaag gagaaaauac cgcaucaggc     240
gccauucgcc auucaggcug cgcaacuguu gggaagggcg aucggugcgg gccucuucgc     300
uauuacgcca gcuggcgaaa gggggaugug cugcaaggcg auuaaguugg guaacgccag     360
gguuuuccca gucacgacgu uguaaaacga cggccagugc caacccuaua gugagucgua     420
uua                                                                  423

<210> SEQ ID NO 6
<211> LENGTH: 523
<212> TYPE: RNA
<213> ORGANISM: Artificial Sequence
<220> FEATURE:
<223> OTHER INFORMATION: Synthetic Heterostructured RNA (NA5001)

<400> SEQUENCE: 6
gggucgcgcg uuucggugau gacggugaaa accucugaca caugcagcuc ccggagacgg     60
ucacagcuug ucuguaagcg gaugccggga gcagacaagc ccgucagggc gcgucagcgg    120
guguuggcgg gugucgggc uggcuuaacu augcggcauc agagcagauu guacugagag     180
ugcaccauau gcggugugaa auaccgcaca gaugcguaag gagaaaauac cgcaucaggc    240
gccauucgcc auucaggcug cgcaacuguu gggaagggcg aucggugcgg gccucuucgc    300
uauuacgcca gcuggcgaaa gggggaugug cugcaaggcg auuaaguugg guaacgccag    360
gguuuuccca gucacgacgu uguaaaacga cggccagugc caaagaagca ugacggcaag    420
uggacgauua ucuccagagg aucgcccgga accgaggacg aguucguaau cauggucaua    480
gcuguuuccu gugugaaauu guucccuaua gugagucgua uua                      523

<210> SEQ ID NO 7
<211> LENGTH: 623
<212> TYPE: RNA
<213> ORGANISM: Artificial Sequence
<220> FEATURE:
<223> OTHER INFORMATION: Synthetic Heterostructured RNA (NA6001)

<400> SEQUENCE: 7
gggucgcgcg uuucggugau gacggugaaa accucugaca caugcagcuc ccggagacgg     60
ucacagcuug ucuguaagcg gaugccggga gcagacaagc ccgucagggc gcgucagcgg    120
guguuggcgg gugucgggc uggcuuaacu augcggcauc agagcagauu guacugagag     180
ugcaccauau gcggugugaa auaccgcaca gaugcguaag gagaaaauac cgcaucaggc    240
gccauucgcc auucaggcug cgcaacuguu gggaagggcg aucggugcgg gccucuucgc    300
uauuacgcca gcuggcgaaa gggggaugug cugcaaggcg auuaaguugg guaacgccag    360
gguuuuccca gucacgacgu uguaaaacga cggccagugc caaagaagca ugacggcaag    420
uggacgauua ucuccagagg aucgcccgga accgaggacg aguucguaau cauggucaua    480
gcuguuuccu gugugaaauu guuauccgcu cacaauucca cacaacauac gagccggaag    540
cauaaagugu aaagccuggg gugccuaaug agugagcuaa cucacauuaa uugcguugcg    600
cuccccuaua gugagucgua uua                                            623

<210> SEQ ID NO 8
```

<211> LENGTH: 723
<212> TYPE: RNA
<213> ORGANISM: Artificial Sequence
<220> FEATURE:
<223> OTHER INFORMATION: Synthetic Heterostructured RNA (NA7001)

<400> SEQUENCE: 8

| | | | | | |
|---|---|---|---|---|---|
| gggucgcgcg | uuucggugau | gacggugaaa | accucugaca | caugcagcuc | ccggagacgg | 60 |
| ucacagcuug | ucuguaagcg | gaugccggga | gcagacaagc | ccgucagggc | gcgucagcgg | 120 |
| guguuggcgg | gugucggggc | uggcuuaacu | augcggcauc | agagcagauu | guacugagag | 180 |
| ugcaccauau | gcggugugaa | auaccgcaca | gaugcguaag | gagaaaauac | cgcaucaggc | 240 |
| gccauucgcc | auucaggcug | cgcaacuguu | gggaagggcg | aucggugcgg | gccucuucgc | 300 |
| uauuacgcca | gcuggcgaaa | ggggaugug | cugcaaggcg | auuaaguugg | guaacgccag | 360 |
| gguuuuccca | gucacgacgu | uguaaaacga | cggccagugc | caaagaagca | ugacggcaag | 420 |
| uggacgauua | ucuccagagg | aucgccggga | accgaggacg | aguucguaau | cauggucaua | 480 |
| gcuguuuccu | gugugaaauu | guuauccgcu | cacaauucca | cacaacauac | gagccggaag | 540 |
| cauaaagugu | aaagccuggg | gugccuaaug | agugagcuaa | cucacauuaa | uugcguugcg | 600 |
| cucacugccc | gcuuuccagu | cgggaaaccu | gucgugccag | cugcauuaau | gaaucggcca | 660 |
| acgcgcgggg | agaggcgguu | ugcguauugg | gcgcucuucc | gcucccuaua | gugagucgua | 720 |
| uua | | | | | | 723 |

<210> SEQ ID NO 9
<211> LENGTH: 823
<212> TYPE: RNA
<213> ORGANISM: Artificial Sequence
<220> FEATURE:
<223> OTHER INFORMATION: Synthetic Heterostructured RNA (NA8001)

<400> SEQUENCE: 9

| | | | | | |
|---|---|---|---|---|---|
| gggucgcgcg | uuucggugau | gacggugaaa | accucugaca | caugcagcuc | ccggagacgg | 60 |
| ucacagcuug | ucuguaagcg | gaugccggga | gcagacaagc | ccgucagggc | gcgucagcgg | 120 |
| guguuggcgg | gugucggggc | uggcuuaacu | augcggcauc | agagcagauu | guacugagag | 180 |
| ugcaccauau | gcggugugaa | auaccgcaca | gaugcguaag | gagaaaauac | cgcaucaggc | 240 |
| gccauucgcc | auucaggcug | cgcaacuguu | gggaagggcg | aucggugcgg | gccucuucgc | 300 |
| uauuacgcca | gcuggcgaaa | ggggaugug | cugcaaggcg | auuaaguugg | guaacgccag | 360 |
| gguuuuccca | gucacgacgu | uguaaaacga | cggccagugc | caaagaagca | ugacggcaag | 420 |
| uggacgauua | ucuccagagg | aucgccggga | accgaggacg | aguucguaau | cauggucaua | 480 |
| gcuguuuccu | gugugaaauu | guuauccgcu | cacaauucca | cacaacauac | gagccggaag | 540 |
| cauaaagugu | aaagccuggg | gugccuaaug | agugagcuaa | cucacauuaa | uugcguugcg | 600 |
| cucacugccc | gcuuuccagu | cgggaaaccu | gucgugccag | cugcauuaau | gaaucggcca | 660 |
| acgcgcgggg | agaggcgguu | ugcguauugg | gcgcucuucc | gcuccucgc | ucacugacuc | 720 |
| gcugcgcucg | gucguucggc | ugcggcgagc | gguaucagcu | cacucaaagg | cgguaauacg | 780 |
| guuauccaca | gaaucagggg | auacccuaua | gugagucgua | uua | | 823 |

<210> SEQ ID NO 10
<211> LENGTH: 123
<212> TYPE: RNA
<213> ORGANISM: Artificial Sequence
<220> FEATURE:
<223> OTHER INFORMATION: Synthetic Heterostructured RNA (NA1002)

```
<400> SEQUENCE: 10 ggggaauuccc gacaaaaggu gguuggugaa gcugacauug gacuccauuc ugcuuaauug      60 ccuaaccccca ucucccuuca aucuaccuac cauaaccauu uccccuaua gugagucgua     120 uua                                                                    123

<210> SEQ ID NO 11
<211> LENGTH: 173
<212> TYPE: RNA
<213> ORGANISM: Artificial Sequence
<220> FEATURE:
<223> OTHER INFORMATION: Synthetic Heterostructured RNA (NA1502)

<400> SEQUENCE: 11 ggggaauuccc gacaaaaggu gguuggugaa gcugacauug gacuccauuc ugcuuaauug      60 ccuaaccccca ucucccuuca aucuaccuac cauaaccauu ucuucaaaa uuuucucaaa     120 aaaacaauuu ggucuucaaa caacuccaag aacccccuaua gugagucgua uua            173

<210> SEQ ID NO 12
<211> LENGTH: 223
<212> TYPE: RNA
<213> ORGANISM: Artificial Sequence
<220> FEATURE:
<223> OTHER INFORMATION: Synthetic Heterostructured RNA (NA2002)

<400> SEQUENCE: 12 ggggaauuccc gacaaaaggu gguuggugaa gcugacauug gacuccauuc ugcuuaauug      60 ccuaaccccca ucucccuuca aucuaccuac cauaaccauu ucuucaaaa uuuucucaaa     120 aaaacaauuu ggucuucaaa caacuccaag aacacagaga gagagguggaa aaacugaagu     180 uuuucacaag aaauggcaca gaucccuaua gugagucgua uua                        223

<210> SEQ ID NO 13
<211> LENGTH: 323
<212> TYPE: RNA
<213> ORGANISM: Artificial Sequence
<220> FEATURE:
<223> OTHER INFORMATION: Synthetic Heterostructured RNA (NA3002)

<400> SEQUENCE: 13 ggggaauuccc gacaaaaggu gguuggugaa gcugacauug gacuccauuc ugcuuaauug      60 ccuaaccccca ucucccuuca aucuaccuac cauaaccauu ucuucaaaa uuuucucaaa     120 aaaacaauuu ggucuucaaa caacuccaag aacacagaga gagagguggaa aaacugaagu     180 uuuucacaag aaauggcaca gauuaguagc auggcacaag ggauacagac ccuuagucug     240
aauuccucca aucuuucuaa aacacaaaag ggucccucug uuucaaauuc ucucuucuuu     300
ggacccuaua gugagucgua uua                                              323

<210> SEQ ID NO 14
<211> LENGTH: 423
<212> TYPE: RNA
<213> ORGANISM: Artificial Sequence
<220> FEATURE:
<223> OTHER INFORMATION: Synthetic Heterostructured RNA (NA4002)

<400> SEQUENCE: 14 ggggaauuccc gacaaaaggu gguuggugaa gcugacauug gacuccauuc ugcuuaauug      60 ccuaaccccca ucucccuuca aucuaccuac cauaaccauu ucuucaaaa uuuucucaaa     120
```

| | |
|---|---|
| aaaacaauuu ggucuucaaa caacuccaag aacacagaga gagaguggaa aaacugaagu | 180 |
| uuuucacaag aaauggcaca gauuaguagc auggcacaag ggauacagac ccuuagucug | 240 |
| aauuccucca aucuuucuaa aacacaaaag gguccucuug uuucaaauuc ucucuucuuu | 300 |
| ggaucaaaga aacuaaccca aauuucagca aaaucauuag ggguguuuaa gaaagauuca | 360 |
| guuugaggg uggugaggaa gucaucuuuu aggauuucug caucccuaua gugagucgua | 420 |
| uua | 423 |

<210> SEQ ID NO 15
<211> LENGTH: 523
<212> TYPE: RNA
<213> ORGANISM: Artificial Sequence
<220> FEATURE:
<223> OTHER INFORMATION: Synthetic Heterostructured RNA (NA5002)

<400> SEQUENCE: 15

| | |
|---|---|
| ggggaauucc gacaaaaggu gguuggugaa gcugacauug gacuccauuc ugcuuaauug | 60 |
| ccuaacccca ucuccuuca aucuaccuac cauaaccauu uucuucaaaa uuuucucaaa | 120 |
| aaaacaauuu ggucuucaaa caacuccaag aacacagaga gagaguggaa aaacugaagu | 180 |
| uuuucacaag aaauggcaca gauuaguagc auggcacaag ggauacagac ccuuagucug | 240 |
| aauuccucca aucuuucuaa aacacaaaag gguccucuug uuucaaauuc ucucuucuuu | 300 |
| ggaucaaaga aacuaaccca aauuucagca aaaucauuag ggguguuuaa gaaagauuca | 360 |
| guuugaggg uggugaggaa gucaucuuuu aggauuucug caucagggc uacugcagag | 420 |
| aaaccccaug agauugugcu agaacccauc aaagauauau cgguacugu uaaauuaccc | 480 |
| gguucgaaau cccuuuccaa ucgcccuaua gugagucgua uua | 523 |

<210> SEQ ID NO 16
<211> LENGTH: 623
<212> TYPE: RNA
<213> ORGANISM: Artificial Sequence
<220> FEATURE:
<223> OTHER INFORMATION: Synthetic Heterostructured RNA (NA6002)

<400> SEQUENCE: 16

| | |
|---|---|
| ggggaauucc gacaaaaggu gguuggugaa gcugacauug gacuccauuc ugcuuaauug | 60 |
| ccuaacccca ucuccuuca aucuaccuac cauaaccauu uucuucaaaa uuuucucaaa | 120 |
| aaaacaauuu ggucuucaaa caacuccaag aacacagaga gagaguggaa aaacugaagu | 180 |
| uuuucacaag aaauggcaca gauuaguagc auggcacaag ggauacagac ccuuagucug | 240 |
| aauuccucca aucuuucuaa aacacaaaag gguccucuug uuucaaauuc ucucuucuuu | 300 |
| ggaucaaaga aacuaaccca aauuucagca aaaucauuag ggguguuuaa gaaagauuca | 360 |
| guuugaggg uggugaggaa gucaucuuuu aggauuucug caucagggc uacugcagag | 420 |
| aaaccccaug agauugugcu agaacccauc aaagauauau cgguacugu uaaauuaccc | 480 |
| gguucgaaau cccuuuccaa ucguauucuc cuucuugcug cccuuucuga gggaaggacu | 540 |
| guuguugaca auuuacugag uagugacgac auucauuaca ugcuuggugc guugaaaaca | 600 |
| cuucccuaua gugagucgua uua | 623 |

<210> SEQ ID NO 17
<211> LENGTH: 723
<212> TYPE: RNA
<213> ORGANISM: Artificial Sequence
<220> FEATURE:
<223> OTHER INFORMATION: Synthetic Heterostructured RNA (NA7002)

<400> SEQUENCE: 17

```
gggaauucc gacaaaaggu gguugguaa gcugacauug gacuccauuc ugcuuaauug     60
ccuaacccca ucucccuuca aucuaccuac cauaaccauu ucuucaaaa uuuucucaaa    120
aaacaauuu ggucuucaaa caacuccaag aacacagaga gagaguggaa aaacugaagu    180
uuucacaag aaauggcaca gauuaguagc auggcacaag ggauacagac ccuuagucug    240
aauuccucca aucuuucuaa aacacaaaag gguccucuug uuucaaauuc ucucuucuuu   300
ggaucaaaga aacuaaccca aauuucagca aaaucauuag ggguguuuaa gaaagauuca   360
guuugaggg uggugaggaa gucaucuuuu aggauuucug caucaguggc uacugcagag    420
aaaccccaug agauugugcu agaacccauc aaagauauau cugguacugu uaaauuaccc   480
gguucgaaau cccuuuccaa ucguauucuc cuucuugcug cccuuucuga gggaaggacu   540
guuguugaca auuuacugag uagugacgac auucauuaca ugcuuggugc guugaaaaca   600
cuuggacuuc auguugaaga ugacaaugaa aaccaacgag caauugugga agguuguggu   660
gggcaguuuc cugucgguaa aaagucugag gaagaaaucc aaccccuaua gugagucgua   720
uua                                                                723
```

<210> SEQ ID NO 18
<211> LENGTH: 823
<212> TYPE: RNA
<213> ORGANISM: Artificial Sequence
<220> FEATURE:
<223> OTHER INFORMATION: Synthetic Heterostructured RNA (NA8002)

<400> SEQUENCE: 18

```
gggaauucc gacaaaaggu gguugguaa gcugacauug gacuccauuc ugcuuaauug     60
ccuaacccca ucucccuuca aucuaccuac cauaaccauu ucuucaaaa uuuucucaaa    120
aaacaauuu ggucuucaaa caacuccaag aacacagaga gagaguggaa aaacugaagu    180
uuucacaag aaauggcaca gauuaguagc auggcacaag ggauacagac ccuuagucug    240
aauuccucca aucuuucuaa aacacaaaag gguccucuug uuucaaauuc ucucuucuuu   300
ggaucaaaga aacuaaccca aauuucagca aaaucauuag ggguguuuaa gaaagauuca   360
guuugaggg uggugaggaa gucaucuuuu aggauuucug caucaguggc uacugcagag    420
aaaccccaug agauugugcu agaacccauc aaagauauau cugguacugu uaaauuaccc   480
gguucgaaau cccuuuccaa ucguauucuc cuucuugcug cccuuucuga gggaaggacu   540
guuguugaca auuuacugag uagugacgac auucauuaca ugcuuggugc guugaaaaca   600
cuuggacuuc auguugaaga ugacaaugaa aaccaacgag caauugugga agguuguggu   660
gggcaguuuc cugucgguaa aaagucugag gaagaaaucc aacuauuccu ggaaaugca    720
ggaacagcaa ugcguccguu gacagcagca guuacuguag cuggaggaca uucaagauau   780
guucuugaug gaguuccuag gaucccuaua gugagucgua uua                    823
```

<210> SEQ ID NO 19
<211> LENGTH: 336
<212> TYPE: RNA
<213> ORGANISM: Artificial Sequence
<220> FEATURE:
<223> OTHER INFORMATION: Synthetic Heterostructured RNA (R1)

<400> SEQUENCE: 19

```
gggaccucga caaccugcac gcuugccuaa acaaggcaaa acuaacggua agucggaugg   60
```

| | |
|---|---|
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accacgcuaa caacucuacc gacaccguug | 240 |
| acaccguucu ggaaaaaaac guuaccguua cccacucugu uaaccugcug gaagacucuc | 300 |
| acaacgguaa acugugcccu auagugaguc guauua | 336 |

<210> SEQ ID NO 20
<211> LENGTH: 414
<212> TYPE: RNA
<213> ORGANISM: Artificial Sequence
<220> FEATURE:
<223> OTHER INFORMATION: Synthetic Heterostructured RNA (R2)

<400> SEQUENCE: 20

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accacgcuaa caacucuacc gacaccguug | 240 |
| acaccguucu ggaaaaaaac guuaccguua cccacucugu uaaccugcug gaagacucuc | 300 |
| acaacgguaa acugugccgu cugaaaggua ucgcuccgcu gcagcugggu aaaugcaaca | 360 |
| ucgcugguug gcugcugggu aacccggaau gcgacccuau agugagucgu auua | 414 |

<210> SEQ ID NO 21
<211> LENGTH: 483
<212> TYPE: RNA
<213> ORGANISM: Artificial Sequence
<220> FEATURE:
<223> OTHER INFORMATION: Synthetic Heterostructured RNA (R3)

<400> SEQUENCE: 21

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accacgcuaa caacucuacc gacaccguug | 240 |
| acaccguucu ggaaaaaaac guuaccguua cccacucugu uaaccugcug gaagacucuc | 300 |
| acaacgguaa acugugccgu cugaaaggua ucgcuccgcu gcagcugggu aaaugcaaca | 360 |
| ucgcugguug gcugcugggu aacccggaau gcgaccgcu gcugccgguu cguucuuggu | 420 |
| cuuacaucgu ugaaaccccg aacucugaaa acgguaucug cuacccuaua gugagucgua | 480 |
| uua | 483 |

<210> SEQ ID NO 22
<211> LENGTH: 605
<212> TYPE: RNA
<213> ORGANISM: Artificial Sequence
<220> FEATURE:
<223> OTHER INFORMATION: Synthetic Heterostructured RNA (R4)

<400> SEQUENCE: 22

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accacgcuaa caacucuacc gacaccguug | 240 |

| | | |
|---|---|---|
| acaccguucu | ggaaaaaaac guuaccguua cccacucugu uaaccugcug gaagacucuc | 300 |
| acaacgguaa | acugccgu cugaaaggua ucgcuccgcu gcagcugggu aaaugcaaca | 360 |
| ucgcugguug | gcugcugggu aacccggaau gcgacccgcu gcugccgguu cguucuuggu | 420 |
| cuuacaucgu | ugaaaccccg aacucugaaa acgguaucug cuacccgggu gacuucaucg | 480 |
| acuacgaaga | acugcgugaa cagcugucuu cuguucuuc uuucgaacgu uucgaaaucu | 540 |
| ucccgaaaga | aucuucuugg ccgaaccaca acaccaacgg uguuacccua uagugagucg | 600 |
| uauua | | 605 |

<210> SEQ ID NO 23
<211> LENGTH: 681
<212> TYPE: RNA
<213> ORGANISM: Artificial Sequence
<220> FEATURE:
<223> OTHER INFORMATION: Synthetic Heterostructured RNA (R5)

<400> SEQUENCE: 23

| | | |
|---|---|---|
| gggaccucga | caaccugcac gcuugccuaa acaaggcaaa acuaacggua agucggaugg | 60 |
| uaacaucacu | gcuggagaaa cccagcgugg uggcauaccu agagggaaag gccgguggcg | 120 |
| guuccggggg | agccgagcuc augaaagcua accugcuggu ucugcugugc gcucuggcug | 180 |
| cugcugacgc | ugacaccauc ugcaucgguu accgcuaa caacucuacc gacaccguug | 240 |
| acaccguucu | ggaaaaaaac guuaccguua cccacucugu uaaccugcug gaagacucuc | 300 |
| acaacgguaa | acugccgu cugaaaggua ucgcuccgcu gcagcugggu aaaugcaaca | 360 |
| ucgcugguug | gcugcugggu aacccggaau gcgacccgcu gcugccgguu cguucuuggu | 420 |
| cuuacaucgu | ugaaaccccg aacucugaaa acgguaucug cuacccgggu gacuucaucg | 480 |
| acuacgaaga | acugcgugaa cagcugucuu cuguucuuc uuucgaacgu uucgaaaucu | 540 |
| ucccgaaaga | aucuucuugg ccgaaccaca acaccaacgg uguuaccgcu gcuugcucuc | 600 |
| acgaagguaa | aucuucuuuc uaccguaacc ugcuguggcu gaccgaaaaa gaagguucuu | 660 |
| acccuauagu | gagucguauu a | 681 |

<210> SEQ ID NO 24
<211> LENGTH: 750
<212> TYPE: RNA
<213> ORGANISM: Artificial Sequence
<220> FEATURE:
<223> OTHER INFORMATION: Synthetic Heterostructured RNA (R6)

<400> SEQUENCE: 24

| | | |
|---|---|---|
| gggaccucga | caaccugcac gcuugccuaa acaaggcaaa acuaacggua agucggaugg | 60 |
| uaacaucacu | gcuggagaaa cccagcgugg uggcauaccu agagggaaag gccgguggcg | 120 |
| guuccggggg | agccgagcuc augaaagcua accugcuggu ucugcugugc gcucuggcug | 180 |
| cugcugacgc | ugacaccauc ugcaucgguu accgcuaa caacucuacc gacaccguug | 240 |
| acaccguucu | ggaaaaaaac guuaccguua cccacucugu uaaccugcug gaagacucuc | 300 |
| acaacgguaa | acugccgu cugaaaggua ucgcuccgcu gcagcugggu aaaugcaaca | 360 |
| ucgcugguug | gcugcugggu aacccggaau gcgacccgcu gcugccgguu cguucuuggu | 420 |
| cuuacaucgu | ugaaaccccg aacucugaaa acgguaucug cuacccgggu gacuucaucg | 480 |
| acuacgaaga | acugcgugaa cagcugucuu cuguucuuc uuucgaacgu uucgaaaucu | 540 |
| ucccgaaaga | aucuucuugg ccgaaccaca acaccaacgg uguuaccgcu gcuugcucuc | 600 |

| | |
|---|---:|
| acgaagguaa aucuucuuuc uaccguaacc ugcuguggcu gaccgaaaaa gaagguucuu | 660 |
| acccgaaacu gaaaaacucu uacguuaaca aaaaagguaa agaaguucug guucuguggg | 720 |
| guauccacca cccuauagug agucguauua | 750 |

```
<210> SEQ ID NO 25
<211> LENGTH: 839
<212> TYPE: RNA
<213> ORGANISM: Artificial Sequence
<220> FEATURE:
<223> OTHER INFORMATION: Synthetic Heterostructured RNA (R7)

<400> SEQUENCE: 25
```

| | |
|---|---:|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accgcuaa caacucuacc gacaccguug | 240 |
| acaccguucu ggaaaaaaac guuaccguua cccacucugu uaaccugcug gaagacucuc | 300 |
| acaacgguaa acugugccgu cugaaaggua ucgcuccgcu gcagcugggu aaaugcaaca | 360 |
| ucgcugguug gcugcugggu aacccggaau gcgaccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuc uguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaagguucuu | 660 |
| acccgaaacu gaaaaacucu uacguuaaca aaaaagguaa agaaguucug guucuguggg | 720 |
| guauccacca cccgccgaac ucuaaagaac agcagaaccu guaccagaac gaaaacgcuu | 780 |
| acguuucugu uguuaccucu aacuacaacc gucguuucac ccuauaguga gucguauua | 839 |

```
<210> SEQ ID NO 26
<211> LENGTH: 902
<212> TYPE: RNA
<213> ORGANISM: Artificial Sequence
<220> FEATURE:
<223> OTHER INFORMATION: Synthetic Heterostructured RNA (R8)

<400> SEQUENCE: 26
```

| | |
|---|---:|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accgcuaa caacucuacc gacaccguug | 240 |
| acaccguucu ggaaaaaaac guuaccguua cccacucugu uaaccugcug gaagacucuc | 300 |
| acaacgguaa acugugccgu cugaaaggua ucgcuccgcu gcagcugggu aaaugcaaca | 360 |
| ucgcugguug gcugcugggu aacccggaau gcgaccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuc uguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaagguucuu | 660 |
| acccgaaacu gaaaaacucu uacguuaaca aaaaagguaa agaaguucug guucuguggg | 720 |
| guauccacca cccgccgaac ucuaaagaac agcagaaccu guaccagaac gaaaacgcuu | 780 |

| | | |
|---|---|---|
| acguuucugu uguuaccucu aacuacaacc gucguuucac cccggaaauc gcugaacguc | | 840 |
| cgaaaguucg ugaccaggcu ggucguauga acuacuacug gacccuauag ugagucguau | | 900 |
| ua | | 902 |

<210> SEQ ID NO 27
<211> LENGTH: 1049
<212> TYPE: RNA
<213> ORGANISM: Artificial Sequence
<220> FEATURE:
<223> OTHER INFORMATION: Synthetic Heterostructured RNA (R9)

<400> SEQUENCE: 27

| | | |
|---|---|---|
| gggaccucga caaccugcac gcuugccuaa acaaggcaaa acuaacggua agucggaugg | | 60 |
| uaacaucacu gcuggagaaa cccagcgugg uggcauaccu agagggaaag gccgguggcg | | 120 |
| guuccggggg agccgagcuc augaaagcua accugcuggu ucugcugugc gcucuggcug | | 180 |
| cugcugacgc ugacaccauc ugcaucgguu accgcuaa caacucuacc gacaccguug | | 240 |
| acaccguucu ggaaaaaaac guuaccguua cccacucugu uaaccugcug aagacucuc | | 300 |
| acaacgguaa acugugccgu cugaaaggua ucgcuccgcu gcagcugggu aaaugcaaca | | 360 |
| ucgcugguug gcugcugggu aacccggaau gcgacccgcu gcugccgguu cguucuuggu | | 420 |
| cuuacaucgu ugaaaccccg aacucugaaa acgguaucug cuacccgggu gacuucaucg | | 480 |
| acuacgaaga acugcgugaa cagcugucuu cuguuucuuc uucgaacgu ucgaaaucu | | 540 |
| ucccgaaaga aucuucuugg ccgaaccaca acaccaacgg uguuaccgcu gcuugcucuc | | 600 |
| acgaagguaa aucuucuuuc uaccguaacc ugcuguggcu gaccgaaaaa gagguucuu | | 660 |
| acccgaaacu gaaaaacucu uacguuaaca aaaagguaa agaaguucug guucuguggg | | 720 |
| guauccacca cccgccgaac ucuaaagaac agcagaaccu uaccagaac gaaaacgcuu | | 780 |
| acguuucugu uguuaccucu aacuacaacc gucguuucac cccggaaauc gcugaacguc | | 840 |
| cgaaaguucg ugaccaggcu ggucguauga acuacuacug gacccugcug aaaccgggug | | 900 |
| acaccaucau cuucgaagcu aacgguaacc ugaucgcucc gaugacgcu uucgcucugu | | 960 |
| cucgugguuu cgguucuggu aucaucaccu cuaacgcuuc uaugcacgaa ugcaacacca | | 1020 |
| aaugccagac ccuauaguga gucguauua | | 1049 |

<210> SEQ ID NO 28
<211> LENGTH: 1170
<212> TYPE: RNA
<213> ORGANISM: Artificial Sequence
<220> FEATURE:
<223> OTHER INFORMATION: Synthetic Heterostructured RNA (R10)

<400> SEQUENCE: 28

| | | |
|---|---|---|
| gggaccucga caaccugcac gcuugccuaa acaaggcaaa acuaacggua agucggaugg | | 60 |
| uaacaucacu gcuggagaaa cccagcgugg uggcauaccu agagggaaag gccgguggcg | | 120 |
| guuccggggg agccgagcuc augaaagcua accugcuggu ucugcugugc gcucuggcug | | 180 |
| cugcugacgc ugacaccauc ugcaucgguu accgcuaa caacucuacc gacaccguug | | 240 |
| acaccguucu ggaaaaaaac guuaccguua cccacucugu uaaccugcug aagacucuc | | 300 |
| acaacgguaa acugugccgu cugaaaggua ucgcuccgcu gcagcugggu aaaugcaaca | | 360 |
| ucgcugguug gcugcugggu aacccggaau gcgacccgcu gcugccgguu cguucuuggu | | 420 |
| cuuacaucgu ugaaaccccg aacucugaaa acgguaucug cuacccgggu gacuucaucg | | 480 |

| | |
|---|---|
| acuacgaaga acugcgugaa cagcugucuu cuguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaaguucuu | 660 |
| acccgaaacu gaaaaacucu acguuaaca aaaagguaa agaaguucug guucuguggg | 720 |
| guauccacca cccgccgaac ucuaaagaac agcagaaccu guaccagaac gaaaacgcuu | 780 |
| acguuucugu uguuaccucu aacuacaacc gucguuucac cccggaaauc gcugaacguc | 840 |
| cgaaaguucg ugaccaggcu ggucguauga acuacuacug gacccugcug aaaccggguq | 900 |
| acaccaucau cuucgaagcu aacguaaccc ugaucgcucc gauguacgcu ucgcucugu | 960 |
| cucgugguuu cgguucuggu aucaucaccu cuaacgcuuc uaugcacgaa ugcaacacca | 1020 |
| aaugccagac cccgcugggu gcaucaacu cuucucugcc guaccagaac auccacccgg | 1080 |
| uuaccaucgg ugaaugcccg aaauacguuc guucugcuaa acugcguaug guuaccgguc | 1140 |
| ugcguaacau cccuauagug agucguauua | 1170 |

<210> SEQ ID NO 29
<211> LENGTH: 1665
<212> TYPE: RNA
<213> ORGANISM: Artificial Sequence
<220> FEATURE:
<223> OTHER INFORMATION: Synthetic Heterostructured RNA (R11)

<400> SEQUENCE: 29

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcacgguu accacgcuaa caacucuacc gacaccguug | 240 |
| acaccguucu ggaaaaaaac guuaccguua cccacucugu uaaccugcug gaagacucuc | 300 |
| acaacguuaa acugccgu cugaaaggua ucgucccgcu gcagcugggu aaaugcaaca | 360 |
| ucgcugguug gcugcugggu aacccggaau gcgacccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuu cuguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaaguucuu | 660 |
| acccgaaacu gaaaaacucu acguuaaca aaaagguaa agaaguucug guucuguggg | 720 |
| guauccacca cccgccgaac ucuaaagaac agcagaaccu guaccagaac gaaaacgcuu | 780 |
| acguuucugu uguuaccucu aacuacaacc gucguuucac cccggaaauc gcugaacguc | 840 |
| cgaaaguucg ugaccaggcu ggucguauga acuacuacug gacccugcug aaaccggguq | 900 |
| acaccaucau cuucgaagcu aacguaaccc ugaucgcucc gauguacgcu ucgcucugu | 960 |
| cucgugguuu cgguucuggu aucaucaccu cuaacgcuuc uaugcacgaa ugcaacacca | 1020 |
| aaugccagac cccgcugggu gcaucaacu cuucucugcc guaccagaac auccacccgg | 1080 |
| uuaccaucgg ugaaugcccg aaauacguuc guucugcuaa acugcguaug guuaccgguc | 1140 |
| ugcguaacau cccgucuauc cagucucgug gucuguucgg ugcuaucgcu gguuucaucg | 1200 |
| aaggugguug gaccgguaug aucgacgguu gguacgguua ccaccaccag aacgaacagg | 1260 |
| guucggguua cgcugcugac cagaaaucua cccagaacgc uaucaacggu aucaccaaca | 1320 |
| aaguuaacac cguuaucgaa aaaaugaaca uccaguucac cgcuguuggu aaagaauuca | 1380 |

```
acaaacugga aaaacguaug gaaaaccuga acaaaaaagu ugacgacggu uuccuggaca    1440
ucuggaccua caacgcugaa cugcugguuc ugcuggaaaa cgaacguacc cuggacuucc    1500
acgacucuaa cguuaaaaac cuguacgaaa aaguuaaauc ucagcugaaa acaacgcua     1560 aagaaaucgg uaacgguugc uucgaauucu accacaaaug cgacaacgaa ugcauggaau    1620 cguucguaa cgguaccuac gacuacccua uagugagucg uauua                    1665
```

<210> SEQ ID NO 30
<211> LENGTH: 482
<212> TYPE: RNA
<213> ORGANISM: Artificial Sequence
<220> FEATURE:
<223> OTHER INFORMATION: Synthetic Heterostructured RNA (NA,NVT,VP1,
      VP10)

<400> SEQUENCE: 30

```
gggcgauaau acaguuuugg acucaggugu gagauuuuau gaucaggacu augaaggaca      60
aauaacccca auggaauaug uaacggguu guauaacuuu ggucagggc caauagaguu       120 acguuuugau uuuguuucaa augcguuuca cacuggaaca gugauuauau cagcggagua     180
uaaucgauca ucuacuaaua cggaugagug ucagucacac ucaacuuaua cuaaaacguu    240
ccacuuggga gaacaaaaau caguacauuu cacugugccu uauauauaug auacuguuau    300
gcggagaaau acggcuagcg ccuauuuacc gguaacugau uaugauaagg cagauaaugu    360
uaguagggcg caggcuacgg ggauuagagc agaaucuaaa augagaguga aagugagauc    420
gcccuauagu gagucguauu agucgacugc agaggccugc augcaagcuu ggcguaauca    480
ug                                                                  482
```

<210> SEQ ID NO 31
<211> LENGTH: 493
<212> TYPE: RNA
<213> ORGANISM: Artificial Sequence
<220> FEATURE:
<223> OTHER INFORMATION: Synthetic Heterostructured RNA (NVT IV,NVT 4,
      VP20)

<400> SEQUENCE: 31

```
gggcgauaau acaguuuugg acucaggugu gagauuuuau gaucaggacu augaaggaca      60
aauaacccca auggaauaug uaacggguu guauaacuuu ggucagggc caauagaguu       120 acguuuugau uuuguuucaa augcguuuca cacuggaaca gugauuauau cagcggagua     180
uaaucgauca ucuacuaaua cggaugagug ucagucacac ucaacuuaua cuaaaacguu    240
ccacuuggga gaacaaaaau caguacauuu cacugugccu uauauauaug auacuguuau    300
gcggagaaau acggcuagcg ccuauuuacc gguaacugau uaugauaagg cagauaaugu    360
uaguagggcg caggcuacgg ggauuagagc agaaucuaaa augagaguga aagugagauc    420
gcccuauagu gagucguauu agucgacugc agaggccugc augcaagcuu uguuguguu     480 guuguuguug uug                                                      493
```

<210> SEQ ID NO 32
<211> LENGTH: 123
<212> TYPE: RNA
<213> ORGANISM: Artificial Sequence
<220> FEATURE:
<223> OTHER INFORMATION: Synthetic Heterostructured RNA (NA1001)

<400> SEQUENCE: 32

| | |
|---|---|
| gggcgggcuu gucugcuccc ggcauccgcu uacagacaag cugugaccgu cuccgggagc | 60 |
| ugcauguguc agagguuuuc accgucauca ccgaaacgcg cgacccuaua gugagucgua | 120 |
| uua | 123 |

<210> SEQ ID NO 33
<211> LENGTH: 173
<212> TYPE: RNA
<213> ORGANISM: Artificial Sequence
<220> FEATURE:
<223> OTHER INFORMATION: Synthetic Heterostructured RNA (NA1501)

<400> SEQUENCE: 33

| | |
|---|---|
| gggcauaguu aagccagccc cgacacccgc caacacccgc ugacgcgccc ugacgggcuu | 60 |
| gucugcuccc ggcauccgcu uacagacaag cugugaccgu cuccgggagc ugcauguguc | 120 |
| agagguuuuc accgucauca ccgaaacgcg cgacccuaua gugagucgua uua | 173 |

<210> SEQ ID NO 34
<211> LENGTH: 223
<212> TYPE: RNA
<213> ORGANISM: Artificial Sequence
<220> FEATURE:
<223> OTHER INFORMATION: Synthetic Heterostructured RNA (NA2001)

<400> SEQUENCE: 34

| | |
|---|---|
| ggguauuuca caccgcauau ggugcacucu caguacaauc ugcucugaug ccgcauaguu | 60 |
| aagccagccc cgacacccgc caacacccgc ugacgcgccc ugacgggcuu gucugcuccc | 120 |
| ggcauccgcu uacagacaag cugugaccgu cuccgggagc ugcauguguc agagguuuuc | 180 |
| accgucauca ccgaaacgcg cgacccuaua gugagucgua uua | 223 |

<210> SEQ ID NO 35
<211> LENGTH: 323
<212> TYPE: RNA
<213> ORGANISM: Artificial Sequence
<220> FEATURE:
<223> OTHER INFORMATION: Synthetic Heterostructured RNA (NA3001)

<400> SEQUENCE: 35

| | |
|---|---|
| gggauagcga agaggcccgc accgaucgcc cuucccaaca guugcgcagc cugaauggcg | 60 |
| aauggcgccu gaugcgguau uuucuccuua cgcaucugug cgguauuuca caccgcauau | 120 |
| ggugcacucu caguacaauc ugcucugaug ccgcauaguu aagccagccc cgacacccgc | 180 |
| caacacccgc ugacgcgccc ugacgggcuu gucugcuccc ggcauccgcu uacagacaag | 240 |
| cugugaccgu cuccgggagc ugcauguguc agagguuuuc accgucauca ccgaaacgcg | 300 |
| cgacccuaua gugagucgua uua | 323 |

<210> SEQ ID NO 36
<211> LENGTH: 423
<212> TYPE: RNA
<213> ORGANISM: Artificial Sequence
<220> FEATURE:
<223> OTHER INFORMATION: Synthetic Heterostructured RNA (NA4001)

<400> SEQUENCE: 36

| | |
|---|---|
| ggguuggcac uggccgucgu uuuacaacgu cgugacuggg aaaacccugg cguuacccaa | 60 |
| cuuaaucgcc uugcagcaca uccccuuuc gccagcuggc guaauagcga agaggcccgc | 120 |
| accgaucgcc cuucccaaca guugcgcagc cugaauggcg aauggcgccu gaugcgguau | 180 |
| uuucuccuua cgcaucugug cgguauuuca caccgcauau ggugcacucu caguacaauc | 240 |

```
ugcucugaug ccgcauaguu aagccagccc cgacacccgc caacacccgc ugacgcgccc    300
ugacgggcuu gucugcuccc ggcauccgcu uacagacaag cugugaccgu cuccgggagc    360 ugcaugucu agagguuuuc accgucauca ccgaaacgcg cgacccuaua gugagucgua    420
uua                                                                 423

<210> SEQ ID NO 37
<211> LENGTH: 523
<212> TYPE: RNA
<213> ORGANISM: Artificial Sequence
<220> FEATURE:
<223> OTHER INFORMATION: Synthetic Heterostructured RNA (NA5001)

<400> SEQUENCE: 37
gggaacaauu ucacacagga aacagcuaug accaugauua cgaacucguc cucgguuccc     60
ggcgauccuc uggagauaau cguccacuug ccgucaugcu ucuuuggcac uggccgucgu    120
uuuacaacgu cgugacuggg aaaacccugg cguuacccaa cuuaaucgcc uugcagcaca    180 uccccuuuc gccagcuggc guaauagcga agaggcccgc accgaucgcc cuucccaaca    240
guugcgcagc cugaauggcg aauggcgccu gaugcgguau uuucuccuua cgcaucugug    300
cgguauuuca caccgcauau ggugcacucu caguacaauc ugcucugaug ccgcauaguu    360
aagccagccc cgacacccgc caacacccgc ugacgcgccc ugacgggcuu gucugcuccc    420
ggcauccgcu uacagacaag cugugaccgu cuccgggagc ugcaugugu agagguuuuc    480 accgucauca ccgaaacgcg cgacccuaua gugagucgua uua                     523

<210> SEQ ID NO 38
<211> LENGTH: 623
<212> TYPE: RNA
<213> ORGANISM: Artificial Sequence
<220> FEATURE:
<223> OTHER INFORMATION: Synthetic Heterostructured RNA (NA6001)

<400> SEQUENCE: 38
ggggagcgca acgcaauuaa ugugaguuag cucacucauu aggcacccca ggcuuuacac     60
uuuaugcuuc cggcucguau guugugugga auugugagcg gauaacaauu ucacacagga    120
aacagcuaug accaugauua cgaacucguc cucgguuccc ggcgauccuc uggagauaau    180
cguccacuug ccgucaugcu ucuuuggcac uggccgucgu uuuacaacgu cgugacuggg    240
aaaacccugg cguuacccaa cuuaaucgcc uugcagcaca uccccuuuc gccagcuggc    300 guaauagcga agaggcccgc accgaucgcc cuucccaaca guugcgcagc cugaauggcg    360
aauggcgccu gaugcgguau uuucuccuua cgcaucugug cgguauuuca caccgcauau    420
ggugcacucu caguacaauc ugcucugaug ccgcauaguu aagccagccc cgacacccgc    480
caacacccgc ugacgcgccc ugacgggcuu gucugcuccc ggcauccgcu uacagacaag    540
cugugaccgu cuccgggagc ugcaugugu agagguuuuc accgucauca ccgaaacgcg    600
cgacccuaua gugagucgua uua                                           623

<210> SEQ ID NO 39
<211> LENGTH: 723
<212> TYPE: RNA
<213> ORGANISM: Artificial Sequence
<220> FEATURE:
<223> OTHER INFORMATION: Synthetic Heterostructured RNA (NA7001)

<400> SEQUENCE: 39
```

```
gggagcggaa gagcgcccaa uacgcaaacc gccucuccccc gcgcguuggc cgauucauua      60
augcagcugg cacgacaggu ucccgacug gaaagcgggc agugagcgca acgcaauuaa     120
ugugaguuag cucacucauu aggcacccca ggcuuuacac uuuaugcuuc cggcucguau    180
guugugugga auugugagcg gauaacaauu ucacacagga aacagcuaug accaugauua    240
cgaacucguc cucgguuccc ggcgauccuc uggagauaau cguccacuug ccgucaugcu    300
ucuuuggcac uggccgucgu uuuacaacgu cgugacuggg aaaacccugg cguuacccaa    360
cuuaaucgcc uugcagcaca uccccuuuuc gccagcuggc guaauagcga agaggcccgc    420
accgaucgcc cuucccaaca guugcgcagc cugaauggcg aauggcgccu gaucgcguau    480
uuucuccuua cgcaucugug cgguauuuca caccgcauau ggugcacucu caguacaauc    540
ugcucugaug ccgcauaguu aagccagccc cgacacccgc caacacccgc ugacgcgccc    600
ugacgggcuu gucugcuccc ggcauccgcu uacagacaag cugugaccgu ucccgggagc    660
ugcauguguc agagguuuuc accgucauca ccgaaacgcg cgacccuaua gugagucgua    720
uua                                                                  723
```

```
<210> SEQ ID NO 40
<211> LENGTH: 823
<212> TYPE: RNA
<213> ORGANISM: Artificial Sequence
<220> FEATURE:
<223> OTHER INFORMATION: Synthetic Heterostructured RNA (NA8001)

<400> SEQUENCE: 40 ggguauccccc ugauucgugu gauaaccgua uuaccgccuu ugagugagcu gauaccgcuc    60
gccgcagccg aacgaccgag cgcagcgagu cagugagcga ggaagcggaa gagcgcccaa    120
uacgcaaacc gccucuccccc gcgcguuggc cgauucauua augcagcugg cacgacaggu   180 ucccgacug gaaagcgggc agugagcgca acgcaauuaa ugugaguuag cucacucauu    240
aggcacccca ggcuuuacac uuuaugcuuc cggcucguau guugugugga auugugagcg   300
gauaacaauu ucacacagga aacagcuaug accaugauua cgaacucguc cucgguuccc    360
ggcgauccuc uggagauaau cguccacuug ccgucaugcu ucuuuggcac uggccgucgu   420
uuuacaacgu cgugacuggg aaaacccugg cguuacccaa cuuaaucgcc uugcagcaca    480
uccccuuuuc gccagcuggc guaauagcga agaggcccgc accgaucgcc cuucccaaca    540
guugcgcagc cugaauggcg aauggcgccu gaucgcguau uuucuccuua cgcaucugug    600
cgguauuuca caccgcauau ggugcacucu caguacaauc ugcucugaug ccgcauaguu    660
aagccagccc cgacacccgc caacacccgc ugacgcgccc ugacgggcuu gucugcuccc    720
ggcauccgcu uacagacaag cugugaccgu ucccgggagc ugcauguguc agagguuuuc    780
accgucauca ccgaaacgcg cgacccuaua gugagucgua uua                      823
```

```
<210> SEQ ID NO 41
<211> LENGTH: 123
<212> TYPE: RNA
<213> ORGANISM: Artificial Sequence
<220> FEATURE:
<223> OTHER INFORMATION: Synthetic Heterostructured RNA (NA1002)

<400> SEQUENCE: 41
ggggaaaaug guuauggua guagauugaa gggagauggg guuaggcaau uaagcagaau     60
ggaguccaau gucagcuuca ccaaccaccu uuugucggaa uuccccuaua gugagucgua    120
uua                                                                  123
```

<210> SEQ ID NO 42
<211> LENGTH: 173
<212> TYPE: RNA
<213> ORGANISM: Artificial Sequence
<220> FEATURE:
<223> OTHER INFORMATION: Synthetic Heterostructured RNA (NA1502)

<400> SEQUENCE: 42 ggguucuug gaguuguuug aagaccaaau uguuuuuug agaaaauuuu gaagaaaaug    60
guuaugguag guagauugaa gggagauggg guuaggcaau uaagcagaau ggaguccaau   120
gucagcuuca ccaaccaccu uuugucggaa uuccccuaua gugagucgua uua          173

<210> SEQ ID NO 43
<211> LENGTH: 223
<212> TYPE: RNA
<213> ORGANISM: Artificial Sequence
<220> FEATURE:
<223> OTHER INFORMATION: Synthetic Heterostructured RNA (NA2002)

<400> SEQUENCE: 43
gggaucugug ccauuucuug ugaaaaacuu caguuuuucc acucucucuc uguuucuug    60 gaguguuug aagaccaaau uguuuuuug agaaaauuuu gaagaaaaug guuaugguag    120
guagauugaa gggagauggg guuaggcaau uaagcagaau ggaguccaau gucagcuuca  180
ccaaccaccu uuugucggaa uuccccuaua gugagucgua uua                    223

<210> SEQ ID NO 44
<211> LENGTH: 323
<212> TYPE: RNA
<213> ORGANISM: Artificial Sequence
<220> FEATURE:
<223> OTHER INFORMATION: Synthetic Heterostructured RNA (NA3002)

<400> SEQUENCE: 44
ggguccaaag aagagagaau uugaaacaag aggacccuuu uguguuuuag aaagauugga    60
ggaauucaga cuaagggucu guaucccuug ugccaugcua cuaaucugug ccauuucuug   120
ugaaaaacuu caguuuuucc acucucucuc uguuucuug gaguguuug aagaccaaau    180 uguuuuuug agaaaauuuu gaagaaaaug guuaugguag guagauugaa gggagauggg   240
guuaggcaau uaagcagaau ggaguccaau gucagcuuca ccaaccaccu uuugucggaa   300
uuccccuaua gugagucgua uua                                          323

<210> SEQ ID NO 45
<211> LENGTH: 423
<212> TYPE: RNA
<213> ORGANISM: Artificial Sequence
<220> FEATURE:
<223> OTHER INFORMATION: Synthetic Heterostructured RNA (NA4002)

<400> SEQUENCE: 45
gggaugcaga aauccuaaaa gaugacuucc ucaccacccu caaaacugaa ucuuucuuaa    60 acacccuaa ugauuuugcu gaaauuuggg uuaguuucuu ugauccaaag aagagagaau   120
uugaaacaag aggacccuuu uguguuuuag aaagauugga ggaauucaga cuaagggucu   180
guaucccuug ugccaugcua cuaaucugug ccauuucuug ugaaaaacuu caguuuuucc   240
acucucucuc uguuucuug gaguguuug aagaccaaau uguuuuuug agaaaauuuu    300 gaagaaaaug guuaugguag guagauugaa gggagauggg guuaggcaau uaagcagaau   360

```
ggaguccaau gucagcuuca ccaaccaccu uuugucggaa uuccccuaua gugagucgua    420
uua                                                                 423

<210> SEQ ID NO 46
<211> LENGTH: 523
<212> TYPE: RNA
<213> ORGANISM: Artificial Sequence
<220> FEATURE:
<223> OTHER INFORMATION: Synthetic Heterostructured RNA (NA5002)

<400> SEQUENCE: 46
gggcgauugg aaagggauuu cgaaccgggu aauuuaacag uaccagauau aucuuugaug     60
gguucuagca caaucucaug ggguuucucu gcaguagcca cugaugcaga aauccuaaaa    120
gaugacuucc ucaccacccu caaaacugaa ucuuucuuaa acaccccuaa ugauuuugcu    180
gaaauuuggg uuaguuucuu ugauccaaag aagagagaau uugaaacaag aggacccuuu    240
uguguuuuag aaagauugga ggaaucagac uaagggucu guaucccuug ugccaugcua    300
cuaaucugug ccauuucuug ugaaaaacuu caguuuuucc acucucucuc uguguucuug    360
gaguuguuug aagaccaaau uguuuuuuug agaaaauuuu gaagaaaaug guuaugguag    420
guagauugaa gggagauggg guuaggcaau uaagcagaau ggaguccaau gucagcuuca    480
ccaaccaccu uuugucggaa uuccccuaua gugagucgua uua                     523

<210> SEQ ID NO 47
<211> LENGTH: 623
<212> TYPE: RNA
<213> ORGANISM: Artificial Sequence
<220> FEATURE:
<223> OTHER INFORMATION: Synthetic Heterostructured RNA (NA6002)

<400> SEQUENCE: 47
gggaaguguu uucaacgcac caagcaugua augaaugucg ucacuacuca guaaauuguc     60
aacaacaguc cuucccucag aaagggcagc aagaaggaga aucgauuggg aaagggauuu    120
cgaaccgggu aauuuaacag uaccagauau aucuuugaug gguucuagca caaucucaug    180
ggguuucucu gcaguagcca cugaugcaga aauccuaaaa gaugacuucc ucaccacccu    240
caaaacugaa ucuuucuuaa acaccccuaa ugauuuugcu gaaauuuggg uuaguuucuu    300
ugauccaaag aagagagaau uugaaacaag aggacccuuu uguguuuuag aaagauugga    360
ggaaucagac uaagggucu guaucccuug ugccaugcua cuaaucugug ccauuucuug    420
ugaaaaacuu caguuuuucc acucucucuc uguguucuug gaguuguuug aagaccaaau    480
uguuuuuuug agaaaauuuu gaagaaaaug guuaugguag guagauugaa gggagauggg    540
guuaggcaau uaagcagaau ggaguccaau gucagcuuca ccaaccaccu uuugucggaa    600
uuccccuaua gugagucgua uua                                           623

<210> SEQ ID NO 48
<211> LENGTH: 723
<212> TYPE: RNA
<213> ORGANISM: Artificial Sequence
<220> FEATURE:
<223> OTHER INFORMATION: Synthetic Heterostructured RNA (NA7002)

<400> SEQUENCE: 48
gggguuggau ucuuccuca gacuuuuuac cgacaggaaa cugcccacca caaccuucca     60
caauugcucg uugguuuuca uugucaucuu caacaugaag uccaaguguu uucaacgcac    120
caagcaugua augaaugucg ucacuacuca guaaauuguc aacaacaguc cuucccucag    180
```

| | |
|---|---:|
| aaagggcagc aagaaggaga auacgauugg aaagggauuu cgaaccgggu aauuuaacag | 240 |
| uaccagauau aucuuugaug gguucuagca caaucucaug ggguuucucu gcaguagcca | 300 |
| cugaugcaga aauccuaaaa gaugacuucc ucaccacccu caaaacugaa ucuuucuuaa | 360 |
| acaccccuaa ugauuuugcu gaaauuuggg uuaguuucuu ugauccaaag aagagagaau | 420 |
| uugaaacaag aggacccuuu uguguuuuag aaagauugga ggaaucaga cuaagggucu | 480 |
| guaucccuug ugccaugcua cuaaucugug ccauuucuug ugaaaaacuu caguuuuucc | 540 |
| acucucucuc uguguucuug gaguuguuug aagaccaaau uguuuuuug agaaaauuuu | 600 |
| gaagaaaaug guuaugguag guagauugaa gggagauggg guuaggcaau uaagcagaau | 660 |
| ggaguccaau gucagcuuca ccaaccaccu uuugucggaa uuccccuaua gugagucgua | 720 |
| uua | 723 |

<210> SEQ ID NO 49
<211> LENGTH: 823
<212> TYPE: RNA
<213> ORGANISM: Artificial Sequence
<220> FEATURE:
<223> OTHER INFORMATION: Synthetic Heterostructured RNA (NA8002)

<400> SEQUENCE: 49

| | |
|---|---:|
| gggauccuag gaacuccauc aagaacauau cuugaauguc cuccagcuac aguaacugcu | 60 |
| gcugucaacg gacgcauugc uguccugca uuccaagga auaguggau ucuuccuca | 120 |
| gacuuuuuac cgacaggaaa cugcccacca caaccuucca caauugccg uugguuuca | 180 |
| uugucaucuu caacaugaag uccaaguguu ucaacgcac caagcaugua augaaugucg | 240 |
| ucacuacuca guaaauuguc aacaacaguc cuucccucag aaagggcagc aagaaggaga | 300 |
| auacgauugg aaagggauuu cgaaccgggu aauuuaacag uaccagauau aucuuugaug | 360 |
| gguucuagca caaucucaug ggguuucucu gcaguagcca cugaugcaga aauccuaaaa | 420 |
| gaugacuucc ucaccacccu caaaacugaa ucuuucuuaa acaccccuaa ugauuuugcu | 480 |
| gaaauuuggg uuaguuucuu ugauccaaag aagagagaau uugaaacaag aggacccuuu | 540 |
| uguguuuuag aaagauugga ggaaucaga cuaagggucu guaucccuug ugccaugcua | 600 |
| cuaaucugug ccauuucuug ugaaaaacuu caguuuuucc acucucucuc uguguucuug | 660 |
| gaguuguuug aagaccaaau uguuuuuug agaaaauuuu gaagaaaaug guuaugguag | 720 |
| guagauugaa gggagauggg guuaggcaau uaagcagaau ggaguccaau gucagcuuca | 780 |
| ccaaccaccu uuugucggaa uuccccuaua gugagucgua uua | 823 |

<210> SEQ ID NO 50
<211> LENGTH: 336
<212> TYPE: RNA
<213> ORGANISM: Artificial Sequence
<220> FEATURE:
<223> OTHER INFORMATION: Synthetic Heterostructured RNA (R1)

<400> SEQUENCE: 50

| | |
|---|---:|
| gggcacaguu uaccguugug agagucuucc agcagguuaa cagaguggu aacgguaacg | 60 |
| uuuuuucca gaacgugucu aacguguucg guagaguugu uagcgguguua accgaugcag | 120 |
| augguguag cgucagcagc agccagagcg cacagcagaa ccagcagguu agcuucaug | 180 |
| agcucggcuc ccccggaacc gccaccggcc uucccucua gguaugccac cacgcugggu | 240 |
| uucuccagca gugaguuuac caucgacuu accguuaguu uugccuuguu uaggcaagcg | 300 |

```
ugcagguugu cgaggucccu auagugaguc guauua                      336
```

<210> SEQ ID NO 51
<211> LENGTH: 414
<212> TYPE: RNA
<213> ORGANISM: Artificial Sequence
<220> FEATURE:
<223> OTHER INFORMATION: Synthetic Heterostructured RNA (R2)

<400> SEQUENCE: 51

```
gggucgcauu ccggguuacc cagcagccaa ccagcgaugu ugcauuuacc cagcugcagc    60
ggagcgauac cuuucagacg gcacaguuua ccguugugag agucuuccag cagguuaaca   120
gaguggguaa cgguaacguu uuuuccaga acggugucaa cggugucggu agaguuguua   180
gcgugguaac cgaugcagau ggugucagcu cagcagcag ccagagcgca cagcagaacc   240
agcagguuag cuuucaugag cucggcuccc ccggaaccgc caccggccuu ucccucuagg   300
uaugccacca cgcugggUuu uccagcagu gauguuacca uccgacuuac cguuaguuuu   360
gccuuguuua ggcaagcgug caggUugucg aggucccuau agugagucgu auua         414
```

<210> SEQ ID NO 52
<211> LENGTH: 483
<212> TYPE: RNA
<213> ORGANISM: Artificial Sequence
<220> FEATURE:
<223> OTHER INFORMATION: Synthetic Heterostructured RNA (R3)

<400> SEQUENCE: 52

```
ggguagcaga uaccguuuuc agaguucggg guuuaacga uguaagacca agaacgaacc    60
ggcagcagcg ggucgcauuc cggguuaccc agcagccaac cagcgauguu gcauuuaccc   120
agcugcagcg gagcgauacc uuucagacgg cacaguuuac cguugugaga gucuuccagc   180
agguuaacag aguggguaac gguaacguuu uuuccagaa cggugucaac ggugucggua   240
gaguuguuag cgugguaacc gaugcagaug gugucagcgu cagcagcagc cagagcgcac   300
agcagaacca gcagguuagc uuucaugagc ucggcucccc cggaaccgcc accggccuuu   360
cccucuaggu augccaccac gcuggguuuc uccagcagug auguuaccau ccgacuuacc   420
guuaguuuug ccuuguuuag gcaagcgugc agguugucga ggucccuaua gugagucgua   480
uua                                                                 483
```

<210> SEQ ID NO 53
<211> LENGTH: 605
<212> TYPE: RNA
<213> ORGANISM: Artificial Sequence
<220> FEATURE:
<223> OTHER INFORMATION: Synthetic Heterostructured RNA (R4)

<400> SEQUENCE: 53

```
ggguaacacc guuggu guug uggu ucggcc aagaagauuc uuucgggaag auuucgaaac    60
guucgaaaga agaaacagaa gacagcuguu cacgcaguuc uucguagucg augaagucac   120
ccggguagca gauaccguuu ucagaguucg ggguucaac gauguaagac caagaacgaa   180
ccggcagcag cgggucgcau uccggguuac ccagcagcca accagcgaug uugcauuuac   240
ccagcugcag cggagcgaua ccuuucagac ggcacaguuu accguuguga gagucuucca   300
gcagguuaac agagugggua acgguaacgu uuuuuccag aacggguguca acggugucgg   360
uagaguuguu agcgugguaa ccgaugcaga uggugucagc gucagcagca gccagagcgc   420
acagcagaac cagcagguua gcuuucauga gcucggcucc cccggaaccg ccaccggccu   480
```

```
uccccucuag guaugccacc acgcuggguu ucuccagcag ugauguuacc auccgacuua        540
ccguuaguuu ugccuuguuu aggcaagcgu gcagguuguc gaggucccua uagugagucg        600
uauua                                                                    605
```

<210> SEQ ID NO 54
<211> LENGTH: 681
<212> TYPE: RNA
<213> ORGANISM: Artificial Sequence
<220> FEATURE:
<223> OTHER INFORMATION: Synthetic Heterostructured RNA (R5)

<400> SEQUENCE: 54

```
ggguaagaac cuucuuuuuc ggucagccac agcagguuac gguagaaaga agauuuaccu         60
ucgugagagc aagcagcggu aacaccguug guguuguggu ucggccaaga agauucuuuc        120
gggaagauuu cgaaacguuc gaaagaagaa acagaagaca gcuguucacg caguucuucg        180
uagucgauga agucacccgg guagcagaua ccguuucag aguucggggu ucaacgaug         240 uaagaccaag aacgaaccgg cagcagcggg ucgcauuccg gguacccag cagccaacca        300 gcgauguugc auuuacccag cugcagcgga gcgauaccuu ucagacggca caguuuaccg        360
uugugagagu cuuccagcag guuaacagag uggguaacgg uaacguuuuu uccagaacg         420 gugucaacgg ugucgguaga guuguuagcg gguaaccga ugcagauggu ucagcguca          480 gcagcagcca gagcgcacag cagaaccagc agguuagcuu caugagcuc ggcuccccg          540 gaaccgccac cggccuuucc cucuagguau gccaccacgc uggguuucuc cagcagugau        600
guuaccaucc gacuuaccgu uaguuugcc uuguuaggc aagcgugcag guugucgagg          660
ucccuauagu gagucguauu a                                                  681
```

<210> SEQ ID NO 55
<211> LENGTH: 750
<212> TYPE: RNA
<213> ORGANISM: Artificial Sequence
<220> FEATURE:
<223> OTHER INFORMATION: Synthetic Heterostructured RNA (R6)

<400> SEQUENCE: 55

```
ggguggugga uaccccacag aaccagaacu ucuuuaccuu uuuuguuaac guaagaguuu         60
uucaguuucg gguaagaacc uucuuuuucg gucagccaca gcagguuacg guagaaagaa        120
gauuuaccuu cgugagagca agcagcggua acaccguugg uguuggguu cggccaagaa         180 gauucuuucg gaagauuuc gaaacguucg aaagaagaaa cagaagacag cuguucacgc         240
aguucuucgu agucgaugaa gucacccggg uagcagauac cguuucaga guucggggu          300 ucaacgaugu aagaccaaga acgaaccggc agcagcgggu cgcauuccgg guacccagc         360 agccaaccag cgauguugca uuuacccagc ugcagcggag cgauaccuuu cagacggcac        420
aguuuaccgu ugugagaguc uuccagcagg uuaacagagu ggguaacggu aacguuuuu         480 uccagaacgg ugucaacggu gucgguagag uuguuagcgu gguaaccgau gcagaugug         540 ucagcgucag cagcagccag agcgcacagc agaaccagca gguuagcuuu caugagcucg        600 gcuccccgg aaccgccacc ggccuuuccc ucuagguaug ccaccacgcu ggguuucucc         660
agcagugaug uuaccauccg acuuaccguu aguuugccu uguuaggca agcgugcagg          720 uugucgaggu cccuauagug agucguauua                                         750
```

<210> SEQ ID NO 56

<211> LENGTH: 839
<212> TYPE: RNA
<213> ORGANISM: Artificial Sequence
<220> FEATURE:
<223> OTHER INFORMATION: Synthetic Heterostructured RNA (R7)

<400> SEQUENCE: 56
gggugaaacg acgguuguag uuagagguaa caacagaaac guaagcguuu ucguucuggu 60
acagguucug cuguucuuua gaguucggcg ggugguggau accccacaga accagaacuu 120
cuuuaccuuu uuuguuaacg uaagaguuuu ucaguuucgg guaagaaccu ucuuuuucgg 180
ucagccacag cagguuacgg uagaaagaag auuuaccuuc gugagagcaa gcagcgguaa 240
caccguuggu guugugguuc ggccaagaag auucuuucgg gaagauuucg aaacguucga 300
aagaagaaac agaagacagc uguucacgca guucuucgua gucgaugaag ucacccgggu 360
agcagauacc guuuucagag uucgggguuu caacgaugua agaccaagaa cgaaccggca 420
gcagcggguc gcauuccggg uuacccagca gccaaccagc gauguugcau uuacccagcu 480
gcagcggagc gauaccuuuc agacggcaca guuuaccguu gugagagucu uccagcaggu 540
uaacagagug gguaacggua acguuuuuuu ccagaacggu gucaacggug ucgguagagu 600
uguuagcgug guaaccgaug cagauggugu cagcgucagc agcagccaga gcgcacagca 660
gaaccagcag guuagcuuuc augagcucgg cucccccgga accgccaccg gccuuucccu 720
cuagguaugc caccacgcug gguuucucca gcagugaugu uaccauccga cuuaccguua 780
guuuugccuu guuuaggcaa gcgugcaggu ugucgagguc ccuauaguga gucguauua 839

<210> SEQ ID NO 57
<211> LENGTH: 902
<212> TYPE: RNA
<213> ORGANISM: Artificial Sequence
<220> FEATURE:
<223> OTHER INFORMATION: Synthetic Heterostructured RNA (R8)

<400> SEQUENCE: 57
ggguccagua guaguucaua cgaccagccu ggucacgaac uuucggacgu ucagcgauuu 60
ccggggugaa acgacgguug uaguuagagg uaacaacaga aacguaagcg uuuucguucu 120
gguacagguu cugcuguucu uuagaguucg gcggguggug gauaccccac agaaccagaa 180
cuucuuuacc uuuuuuguua acguaagagu uuuucaguuu cggguaagaa ccuucuuuuu 240
cggucagcca cagcagguua cgguagaaag aagauuuacc uucgugagag caagcagcgg 300
uaacaccguu gguguugugg uucggccaag aagauucuuu cgggaagauu ucgaaacguu 360
cgaaagaaga aacagaagac agcuguucac gcaguucuuc guagucgaug aagucacccg 420
gguagcagau accguuuuca gaguucgggg uuucaacgau guaagaccaa gaacgaaccg 480
gcagcagcgg gucgcauucc ggguuaccca gcagccaacc agcgauguug cauuuaccca 540
gcugcagcgg agcgauaccu uucagacggc acaguuuacc guugugagag ucuuccagca 600
gguuaacaga gugggUaacg guaacguuuu uuuccagaac ggugucaacg gugucgguag 660
aguuguuagc gugguaaccg augcagaugg ugucagcguc agcagcagcc agagcgcaca 720
gcagaaccag cagguuagcu uucaugagcu cggcuccccc ggaaccgcca ccggccuuuc 780
ccucuaggua ugccaccacg cuggguuucu ccagcaguga uguuaccauc cgacuuaccg 840
uuaguuuugc cuuguuuagg caagcgugca gguugucgag gucccuauag ugagucguau 900
ua 902

<210> SEQ ID NO 58
<211> LENGTH: 1049
<212> TYPE: RNA
<213> ORGANISM: Artificial Sequence
<220> FEATURE:
<223> OTHER INFORMATION: Synthetic Heterostructured RNA (R9)

<400> SEQUENCE: 58

| | |
|---|---:|
| gggucuggca uuuggguguug cauucgugca uagaagcguu agaggugaug auaccagaac | 60 |
| cgaaaccacg agacagagcg aaagcguaca ucggagcgau cagguuaccg uuagcuucga | 120 |
| agaugauggu gucacccggu uucagcaggg uccaguagua guucauacga ccagccuggu | 180 |
| cacgaacuuu cggacguuca gcgauuuccg gggugaaacg acgguuguag uuagagguaa | 240 |
| caacagaaac guaagcguuu cguucuggu acagguucug cuguucuuua gaguucggcg | 300 |
| ggugguggau accccacaga accagaacuu cuuuaccuuu uuuguuaacg uaagaguuuu | 360 |
| ucaguuucgg guaagaaccu ucuuuuucgg ucagccacag cagguuacgg uagaaagaag | 420 |
| auuuaccuuc gugagagcaa gcagcgguaa caccguuggu guuguggguuc ggccaagaag | 480 |
| auucuuucgg gaagauuucg aaacguucga aagaagaaac agaagacagc uguucacgca | 540 |
| guucuucgua gucgaugaag ucacccggu agcagauacc guuucagag ucgggguuu | 600 |
| caacgaugua agaccaagaa cgaaccggca gcagcgggc gcauuccggg uucccagca | 660 |
| gccaaccagc gauguugcau uuacccagcu gcagcggagc gauaccuuuc agacggcaca | 720 |
| guuuaccguu gugagagucu uccagcaggu uaacagagug gguaacggua acguuuuuuu | 780 |
| ccagaacggu gucaacggug ucgguagagu uguuagcgug guaaccgaug cagauggugu | 840 |
| cagcgucagc agcagccaga gcgcacagca gaaccagcag guuagcuuuc augagcucgg | 900 |
| cuccccccgga accgccaccg gccuuucccu cagguuaugc caccgcugu gguuucucca | 960 |
| gcagugaugu uaccauccga cuuaccguua guuuugccuu guuuaggcaa gcgugcaggu | 1020 |
| ugucgagguc ccuauaguga gucguauua | 1049 |

<210> SEQ ID NO 59
<211> LENGTH: 1170
<212> TYPE: RNA
<213> ORGANISM: Artificial Sequence
<220> FEATURE:
<223> OTHER INFORMATION: Synthetic Heterostructured RNA (R10)

<400> SEQUENCE: 59

| | |
|---|---:|
| gggauguuac gcagaccggu aaccauacgc aguuuagcag aacgaacgua uuucgggcau | 60 |
| ucaccgaugu uaaccgggug gauguucugg uacggcagag aagaguugau agcacccagc | 120 |
| ggggucuggc auuggguguu gcauucgugc auagaagcgu uagaggugau gauaccagaa | 180 |
| ccgaaaccac gagacagagc gaaagcguac aucggagcga ucagguuacc guuagcuucg | 240 |
| aagaugaugg ugucacccgg uuucagcagg guccaguagu aguucauacg accagccugg | 300 |
| ucacgaacuu ucgacguuc agcgauuccc ggguggaaac gacgguugua guugagggua | 360 |
| acaacagaaa cguaagcguu uucguucugg uacagguucu gcuguucuuu agaguucggc | 420 |
| ggguggugga uacccacag aaccagaacu ucuuuaccuu uuuguuaac guaagaguuuu | 480 |
| uucaguuucg gguaagaacc ucuuuuucg gucagccaca gcagguuacg guagaaagaa | 540 |
| gauuuaccuu cgugagagca agcagcggua acaccguugg uguguggguu cggccaagaa | 600 |
| gauucuuucg ggaagauuuc gaaacguucg aagaagaaa cagaagacag cuguucacgc | 660 |
| aguucuucgu agucgaugaa gucacccggg uagcagauac cguuucaga guucggguu | 720 |

| | |
|---|---|
| ucaacgaugu aagaccaaga acgaaccggc agcagcgggu cgcauuccgg guuacccagc | 780 |
| agccaaccag cgauguugca uuuacccagc ugcagcggag cgauaccuuu cagacggcac | 840 |
| aguuuaccgu ugugagaguc uuccagcagg uuaacagagu ggguaacggu aacguuuuuu | 900 |
| uccagaacgg ugucaacggu gucgguagag uguuagcgu gguaaccgau gcagauggug | 960 |
| ucagcgucag cagcagccag agcgcacagc agaaccagca gguuagcuuu caugagcucg | 1020 |
| gcuccccgg aaccgccacc ggccuuuccc ucuagguaug ccaccacgcu ggguuucucc | 1080 |
| agcagugaug uuaccauccg acuuaccguu aguuugccu uguuaggca agcgugcagg | 1140 |
| uugucgaggu cccuauagug agucguauua | 1170 |

<210> SEQ ID NO 60
<211> LENGTH: 1665
<212> TYPE: RNA
<213> ORGANISM: Artificial Sequence
<220> FEATURE:
<223> OTHER INFORMATION: Synthetic Heterostructured RNA (R11)

<400> SEQUENCE: 60

| | |
|---|---|
| ggguagucgu agguaccguu acgaacagau uccaugcauu cguugcgca uuugugguag | 60 |
| aauucgaagc aaccguuacc gauuucuuua gcguuguuu ucagcugaga uuuaacuuuu | 120 |
| ucguacaggu uuuuaacguu agagucgugg aaguccaggg uacguucguu uuccagcaga | 180 |
| accagcaguu cagcguugua gguccagaug uccaggaaac cgucgucaac uuuuuguuc | 240 |
| agguuuucca uacguuuuuc caguuuguug aauucuuuac caacagcggu gaacuggaug | 300 |
| uucauuuuuu cgauaacggu guuaacuuug uggugauac cguugauagc guucggua | 360 |
| gauuucuggu cagcagcgua accagaaccc uguucguucu ggugguggua accguaccaa | 420 |
| ccgucgauca uaccggucca accaccuucg augaaaccag cgauagcacc gaacagacca | 480 |
| cgagacugga uagacgggau guuacgcaga ccgguaacca uacgcaguuu agcagaacga | 540 |
| acguauuucg ggcauucacc gaugguaacc ggguggaugu ucgguacgg cagagaagag | 600 |
| uugauagcac ccagcggggu cuggcauuug uguugcauu cgugcauaga agcguuagag | 660 |
| gugaugauac cagaaccgaa accacgagac agagcgaaag cguacaucgg agcgaucagg | 720 |
| uuaccguuag cuucgaagau gauggugca cccgguuuca gcagguucca guaguaguuc | 780 |
| auacgaccag ccuggucacg aacuuucgga cguucagcga uuccggggu gaaacgacgg | 840 |
| uuguaguuag agguaacaac agaaacguaa gcguuuucgu ucugguacag guucugcugu | 900 |
| ucuuuagagu ucggcgggug guggauaccc acagaaccaa gaacuucuuu accuuuuuug | 960 |
| uuaacguaag aguuuucag uucggguaa gaaccuucuu uuucggucag ccacagcagg | 1020 |
| uuacggauaga aagaagauuu accuucguga gagcaagcag cgguaacacc guugguguug | 1080 |
| ugguucggcc aagaagauuc uuucgggaag auuucgaaac guucgaaaga agaaacagaa | 1140 |
| gacagcuguu cacgcaguuc uucguagucg augaagucac ccgguagca gauaccguu | 1200 |
| ucagaguucg ggguuucaac gauguaagac caagaacgaa ccgcagcag cggucgcau | 1260 |
| uccggguuac ccagcagcca accagcgaug uugcauuuac ccagcugcag cggagcgaua | 1320 |
| ccuuucagac ggcacaguuu accguuguga gaguccuucca gcagguuaac agaguggua | 1380 |
| acguaacgu uuuuuccag aacguguca acggugucgg uagaguuguu agcggguaa | 1440 |
| ccgaugcaga uggugucagc gucagcagca gccagagcgc acagcagaac cagcagguua | 1500 |
| gcuuucauga gcucgcucc cccggaaccg ccaccggccu uucccucuag guaugccacc | 1560 |
| acgcugggu ucuccagcag ugauguuacc auccgacuua ccguuaguuu ugccuuguuu | 1620 | aggcaagcgu gcagguuguc gagguccua uagugagucg uauua         1665

<210> SEQ ID NO 61
<211> LENGTH: 475
<212> TYPE: RNA
<213> ORGANISM: Artificial Sequence
<220> FEATURE:
<223> OTHER INFORMATION: Synthetic Heterostructured RNA (NA,NVT,VP1,
      VP10)

<400> SEQUENCE: 61
gggcgaucuc acuucacuc ucauuuaga uucugcucua auccccguag ccugcgcccu    60
acuaacauua ucugccuuau cauaaucagu uaccgguaaa uaggcgcuag ccguauuucu   120
ccgcauaaca guaucauaua uauaaggcac agugaaaugu acugauuuuu guucucccaa   180
guggaacguu uaguauaag uugaguguga cugacacuca uccguauuag uagaugaucg    240
auuauacucc gcugauauaa ucacuguucc agugugaaac gcauugaaa caaaaucaaa    300 acguaacucu auuggcccug accaaaaguu auacaaccca guuacauauu ccauggggu    360 uauuuguccu ucauaguccu gaucauaaaa ucucacaccu gaguccaaaa cuguauuauc   420
gcccuauagu gagucguauu aggauccgau aucuagaugc auucgcgagg uaccg        475

<210> SEQ ID NO 62
<211> LENGTH: 499
<212> TYPE: RNA
<213> ORGANISM: Artificial Sequence
<220> FEATURE:
<223> OTHER INFORMATION: Synthetic Heterostructured RNA (NVT IV,NVT 4,
      VP20)

<400> SEQUENCE: 62
gggcgaucuc acuucacuc ucauuuaga uucugcucua auccccguag ccugcgcccu    60
acuaacauua ucugccuuau cauaaucagu uaccgguaaa uaggcgcuag ccguauuucu   120
ccgcauaaca guaucauaua uauaaggcac agugaaaugu acugauuuuu guucucccaa   180
guggaacguu uaguauaag uugaguguga cugacacuca uccguauuag uagaugaucg    240
auuauacucc gcugauauaa ucacuguucc agugugaaac gcauugaaa caaaaucaaa    300 acguaacucu auuggcccug accaaaaguu auacaaccca guuacauauu ccauggggu    360 uauuuguccu ucauaguccu gaucauaaaa ucucacaccu gaguccaaaa cuguauuauc   420
gcccuauagu gagucguauu aggauccgau aucuagaugc auucgcgagg uaccguuguu   480
guuguuguug uuguuguug                                                499

<210> SEQ ID NO 63
<211> LENGTH: 106
<212> TYPE: RNA
<213> ORGANISM: Artificial Sequence
<220> FEATURE:
<223> OTHER INFORMATION: Synthetic Heterostructured RNA (NA1001)

<400> SEQUENCE: 63 ggguccgcgcg uuucggugau gacggugaaa acccucgaca caugcagcuc ccggagacgg    60
ucacagcuug ucuguaagcg gaugccggga gcagacaagc ccgccc                   106

<210> SEQ ID NO 64
<211> LENGTH: 156
<212> TYPE: RNA
<213> ORGANISM: Artificial Sequence
<220> FEATURE:

<223> OTHER INFORMATION: Synthetic Heterostructured RNA (NA1501)

<400> SEQUENCE: 64
gggucgcgcg uuucggugau gacggugaaa accucugaca caugcagcuc ccggagacgg     60
ucacagcuug ucuguaagcg gaugccggga gcagacaagc ccgucagggc gcgucagcgg    120
guguuggcgg gugucggggc uggcuuaacu augccc                              156

<210> SEQ ID NO 65
<211> LENGTH: 206
<212> TYPE: RNA
<213> ORGANISM: Artificial Sequence
<220> FEATURE:
<223> OTHER INFORMATION: Synthetic Heterostructured RNA (NA2001)

<400> SEQUENCE: 65
gggucgcgcg uuucggugau gacggugaaa accucugaca caugcagcuc ccggagacgg     60
ucacagcuug ucuguaagcg gaugccggga gcagacaagc ccgucagggc gcgucagcgg    120
guguuggcgg gugucggggc uggcuuaacu augcggcauc agagcagauu guacugagag    180
ugcaccauau gcggugugaa auaccc                                         206

<210> SEQ ID NO 66
<211> LENGTH: 306
<212> TYPE: RNA
<213> ORGANISM: Artificial Sequence
<220> FEATURE:
<223> OTHER INFORMATION: Synthetic Heterostructured RNA (NA3001)

<400> SEQUENCE: 66
gggucgcgcg uuucggugau gacggugaaa accucugaca caugcagcuc ccggagacgg     60
ucacagcuug ucuguaagcg gaugccggga gcagacaagc ccgucagggc gcgucagcgg    120
guguuggcgg gugucggggc uggcuuaacu augcggcauc agagcagauu guacugagag    180
ugcaccauau gcggugugaa auaccgcaca gaugcguaag gagaaaauac cgcaucaggc    240
gccauucgcc auucaggcug cgcaacuguu gggaagggcg aucggugcgg gccucuucgc    300
uauccc                                                               306

<210> SEQ ID NO 67
<211> LENGTH: 406
<212> TYPE: RNA
<213> ORGANISM: Artificial Sequence
<220> FEATURE:
<223> OTHER INFORMATION: Synthetic Heterostructured RNA (NA4001)

<400> SEQUENCE: 67
gggucgcgcg uuucggugau gacggugaaa accucugaca caugcagcuc ccggagacgg     60
ucacagcuug ucuguaagcg gaugccggga gcagacaagc ccgucagggc gcgucagcgg    120
guguuggcgg gugucggggc uggcuuaacu augcggcauc agagcagauu guacugagag    180
ugcaccauau gcggugugaa auaccgcaca gaugcguaag gagaaaauac cgcaucaggc    240
gccauucgcc auucaggcug cgcaacuguu gggaagggcg aucggugcgg gccucuucgc    300
uauuacgcca gcuggcgaaa ggggaugug cugcaaggcg auuaaguugg guaacgccag    360
gguuuuccca gucacgacgu uguaaaacga cggccagugc caaccc                   406

<210> SEQ ID NO 68
<211> LENGTH: 506
<212> TYPE: RNA
<213> ORGANISM: Artificial Sequence

```
<220> FEATURE:
<223> OTHER INFORMATION: Synthetic Heterostructured RNA (NA5001)

<400> SEQUENCE: 68
gggucgcgcg uuucggugau gacggugaaa accucugaca caugcagcuc ccggagacgg      60
ucacagcuug ucuguaagcg gaugccggga gcagacaagc ccgucagggc gcgucagcgg     120
guguuggcgg gugucggggc uggcuuaacu augcggcauc agagcagauu guacugagag     180
ugcaccauau gcggugugaa auaccgcaca gaugcguaag gagaaaauac cgcaucaggc     240
gccauucgcc auucaggcug cgcaacuguu gggaagggcg aucggugcgg gccucuucgc     300
uauuacgcca gcuggcgaaa gggggaugug cugcaaggcg auuaaguugg guaacgccag     360
gguuuuccca gucacgacgu uguaaaacga cggccagugc caaagaagca ugacggcaag     420
uggacgauua ucuccagagg aucgccggga accgaggacg aguucguaau cauggucaua     480
gcuguuuccu gugugaaauu guuccc                                          506

<210> SEQ ID NO 69
<211> LENGTH: 606
<212> TYPE: RNA
<213> ORGANISM: Artificial Sequence
<220> FEATURE:
<223> OTHER INFORMATION: Synthetic Heterostructured RNA (NA6001)

<400> SEQUENCE: 69
gggucgcgcg uuucggugau gacggugaaa accucugaca caugcagcuc ccggagacgg      60
ucacagcuug ucuguaagcg gaugccggga gcagacaagc ccgucagggc gcgucagcgg     120
guguuggcgg gugucggggc uggcuuaacu augcggcauc agagcagauu guacugagag     180
ugcaccauau gcggugugaa auaccgcaca gaugcguaag gagaaaauac cgcaucaggc     240
gccauucgcc auucaggcug cgcaacuguu gggaagggcg aucggugcgg gccucuucgc     300
uauuacgcca gcuggcgaaa gggggaugug cugcaaggcg auuaaguugg guaacgccag     360
gguuuuccca gucacgacgu uguaaaacga cggccagugc caaagaagca ugacggcaag     420
uggacgauua ucuccagagg aucgccggga accgaggacg aguucguaau cauggucaua     480
gcuguuuccu gugugaaauu guuauccgcu cacaauucca cacaacauac gagccggaag     540
cauaaagugu aaagccuggg gugccuaaug agugagcuaa cucacauuaa uugcguugcg     600
cucccc                                                                606

<210> SEQ ID NO 70
<211> LENGTH: 706
<212> TYPE: RNA
<213> ORGANISM: Artificial Sequence
<220> FEATURE:
<223> OTHER INFORMATION: Synthetic Heterostructured RNA (NA7001)

<400> SEQUENCE: 70
gggucgcgcg uuucggugau gacggugaaa accucugaca caugcagcuc ccggagacgg      60
ucacagcuug ucuguaagcg gaugccggga gcagacaagc ccgucagggc gcgucagcgg     120
guguuggcgg gugucggggc uggcuuaacu augcggcauc agagcagauu guacugagag     180
ugcaccauau gcggugugaa auaccgcaca gaugcguaag gagaaaauac cgcaucaggc     240
gccauucgcc auucaggcug cgcaacuguu gggaagggcg aucggugcgg gccucuucgc     300
uauuacgcca gcuggcgaaa gggggaugug cugcaaggcg auuaaguugg guaacgccag     360
gguuuuccca gucacgacgu uguaaaacga cggccagugc caaagaagca ugacggcaag     420
```

| | |
|---|---|
| uggacgauua ucuccagagg aucgccggga accgaggacg aguucguaau caugguccaua | 480 |
| gcuguuuccu gugugaaauu guuauccgcu cacaauucca cacaacauac gagccggaag | 540 |
| cauaaagugu aaagccuggg gugccuaaug agugagcuaa cucacauuaa uugcguugcg | 600 |
| cucacugccc gcuuuccagu cgggaaaccu gucgugccag cugcauuaau gaaucggcca | 660 |
| acgcgcgggg agaggcgguu ugcguauugg gcgcucuucc gcuccc | 706 |

<210> SEQ ID NO 71
<211> LENGTH: 806
<212> TYPE: RNA
<213> ORGANISM: Artificial Sequence
<220> FEATURE:
<223> OTHER INFORMATION: Synthetic Heterostructured RNA (NA8001)

<400> SEQUENCE: 71

| | |
|---|---|
| gggucgcgcg uuucggugau gacggugaaa accucugaca caugcagcuc ccggagacgg | 60 |
| ucacagcuug ucuguaagcg gaugccggga gcagacaagc ccgucagggc cgucagcgg | 120 |
| guguuggcgg gugucgggc uggcuuaacu augcggcauc agagcagauu guacugagag | 180 |
| ugcaccauau gcggugugaa uaccgcaca gaugcguaag gagaaaauac cgcaucaggc | 240 |
| gccauucgcc auucaggcug cgcaacuguu gggaagggcg aucggugcgg gccucuucgc | 300 |
| uauuacgcca gcuggcgaaa gggggaugug cugcaaggcg auuaaguugg guaacgccag | 360 |
| gguuuuccca gucacgacgu uguaaaacga cggccagugc caagaagca ugacggcaag | 420 |
| uggacgauua ucuccagagg aucgccggga accgaggacg aguucguaau caugguccaua | 480 |
| gcuguuuccu gugugaaauu guuauccgcu cacaauucca cacaacauac gagccggaag | 540 |
| cauaaagugu aaagccuggg gugccuaaug agugagcuaa cucacauuaa uugcguugcg | 600 |
| cucacugccc gcuuuccagu cgggaaaccu gucgugccag cugcauuaau gaaucggcca | 660 |
| acgcgcgggg agaggcgguu ugcguauugg gcgcucuucc gcuccucgc ucacugacuc | 720 |
| gcugcgcucg gucguucggc ugcggcgagc gguaucagcu cacucaaagg cgguaauacg | 780 |
| guuauccaca gaaucagggg auaccc | 806 |

<210> SEQ ID NO 72
<211> LENGTH: 106
<212> TYPE: RNA
<213> ORGANISM: Artificial Sequence
<220> FEATURE:
<223> OTHER INFORMATION: Synthetic Heterostructured RNA (NA1002)

<400> SEQUENCE: 72

| | |
|---|---|
| ggggaauucc gacaaaaggu gguuggugaa gcugacauug gacuccauuc ugcuuaauug | 60 |
| ccuaacccca ucuccuuca aucuaccuac cauaaccauu uccccc | 106 |

<210> SEQ ID NO 73
<211> LENGTH: 156
<212> TYPE: RNA
<213> ORGANISM: Artificial Sequence
<220> FEATURE:
<223> OTHER INFORMATION: Synthetic Heterostructured RNA (NA1502)

<400> SEQUENCE: 73

| | |
|---|---|
| ggggaauucc gacaaaaggu gguuggugaa gcugacauug gacuccauuc ugcuuaauug | 60 |
| ccuaacccca ucuccuuca aucuaccuac cauaaccauu ucuucaaaa uuuucucaaa | 120 |
| aaaacaauuu ggucuucaaa caacuccaag aacccc | 156 |

```
<210> SEQ ID NO 74
<211> LENGTH: 206
<212> TYPE: RNA
<213> ORGANISM: Artificial Sequence
<220> FEATURE:
<223> OTHER INFORMATION: Synthetic Heterostructured RNA (NA2002)

<400> SEQUENCE: 74
ggggaauucc gacaaaaggu gguuggugaa gcugacauug gacuccauuc ugcuuaauug    60
ccuaacccca ucucccuuca aucuaccuac cauaaccauu uucuucaaaa uuuucucaaa   120
aaaacaauuu ggucuucaaa caacuccaag aacacagaga gagaguggaa aaacugaagu   180
uuuucacaag aaauggcaca gauccc                                        206

<210> SEQ ID NO 75
<211> LENGTH: 306
<212> TYPE: RNA
<213> ORGANISM: Artificial Sequence
<220> FEATURE:
<223> OTHER INFORMATION: Synthetic Heterostructured RNA (NA3002)

<400> SEQUENCE: 75
ggggaauucc gacaaaaggu gguuggugaa gcugacauug gacuccauuc ugcuuaauug    60
ccuaacccca ucucccuuca aucuaccuac cauaaccauu uucuucaaaa uuuucucaaa   120
aaaacaauuu ggucuucaaa caacuccaag aacacagaga gagaguggaa aaacugaagu   180
uuuucacaag aaauggcaca gauuaguagc auggcacaag ggauacagac ccuuagucug   240
aauuccucca aucuuucuaa aacacaaaag gguccucuug uuucaaauuc ucucuucuuu   300
ggaccc                                                              306

<210> SEQ ID NO 76
<211> LENGTH: 406
<212> TYPE: RNA
<213> ORGANISM: Artificial Sequence
<220> FEATURE:
<223> OTHER INFORMATION: Synthetic Heterostructured RNA (NA4002)

<400> SEQUENCE: 76
ggggaauucc gacaaaaggu gguuggugaa gcugacauug gacuccauuc ugcuuaauug    60
ccuaacccca ucucccuuca aucuaccuac cauaaccauu uucuucaaaa uuuucucaaa   120
aaaacaauuu ggucuucaaa caacuccaag aacacagaga gagaguggaa aaacugaagu   180
uuuucacaag aaauggcaca gauuaguagc auggcacaag ggauacagac ccuuagucug   240
aauuccucca aucuuucuaa aacacaaaag gguccucuug uuucaaauuc ucucuucuuu   300
ggaucaaaga aacuaaccca aauuucagca aaaucauuag ggguguuuaa gaaagauuca   360 guuugaggg uggugaggaa gucaucuuuu aggauuucug cauccc                   406

<210> SEQ ID NO 77
<211> LENGTH: 506
<212> TYPE: RNA
<213> ORGANISM: Artificial Sequence
<220> FEATURE:
<223> OTHER INFORMATION: Synthetic Heterostructured RNA (NA5002)

<400> SEQUENCE: 77
ggggaauucc gacaaaaggu gguuggugaa gcugacauug gacuccauuc ugcuuaauug    60
ccuaacccca ucucccuuca aucuaccuac cauaaccauu uucuucaaaa uuuucucaaa   120
aaaacaauuu ggucuucaaa caacuccaag aacacagaga gagaguggaa aaacugaagu   180
```

| | |
|---|---|
| uuuucacaag aaauggcaca gauuaguagc auggcacaag ggauacagac ccuuagucug | 240 |
| aauuccucca aucuuucuaa aacacaaaag gguccucuug uuucaaauuc ucucuucuuu | 300 |
| ggaucaaaga aacuaaccca aauuucagca aaaucauuag ggguguuuaa gaaagauuca | 360 |
| guuuugaggg uggugaggaa gucaucuuuu aggauuucug caucaguggc uacugcagag | 420 |
| aaaccccaug agauugugcu agaacccauc aaagauauau cugguacugu uaaauuaccc | 480 |
| gguucgaaau cccuuuccaa ucgccc | 506 |

<210> SEQ ID NO 78
<211> LENGTH: 606
<212> TYPE: RNA
<213> ORGANISM: Artificial Sequence
<220> FEATURE:
<223> OTHER INFORMATION: Synthetic Heterostructured RNA (NA6002)

<400> SEQUENCE: 78

| | |
|---|---|
| ggggaauucc gacaaaaggu gguuggugaa gcugacauug gacuccauuc ugcuuaauug | 60 |
| ccuaacccca ucucccuuca aucuaccuac cauaaccauu uucuucaaaa uuuucucaaa | 120 |
| aaaacaauuu ggucuucaaa caacuccaag aacacagaga gagaguggaa aaacugaagu | 180 |
| uuuucacaag aaauggcaca gauuaguagc auggcacaag ggauacagac ccuuagucug | 240 |
| aauuccucca aucuuucuaa aacacaaaag gguccucuug uuucaaauuc ucucuucuuu | 300 |
| ggaucaaaga aacuaaccca aauuucagca aaaucauuag ggguguuuaa gaaagauuca | 360 |
| guuuugaggg uggugaggaa gucaucuuuu aggauuucug caucaguggc uacugcagag | 420 |
| aaaccccaug agauugugcu agaacccauc aaagauauau cugguacugu uaaauuaccc | 480 |
| gguucgaaau cccuuuccaa ucguauucuc cuucuugcug cccuuucuga gggaaggacu | 540 |
| guuguugaca auuuacugag uagugacgac auucauuaca ugcuuggugc guugaaaaca | 600 |
| cuuccc | 606 |

<210> SEQ ID NO 79
<211> LENGTH: 706
<212> TYPE: RNA
<213> ORGANISM: Artificial Sequence
<220> FEATURE:
<223> OTHER INFORMATION: Synthetic Heterostructured RNA (NA7002)

<400> SEQUENCE: 79

| | |
|---|---|
| ggggaauucc gacaaaaggu gguuggugaa gcugacauug gacuccauuc ugcuuaauug | 60 |
| ccuaacccca ucucccuuca aucuaccuac cauaaccauu uucuucaaaa uuuucucaaa | 120 |
| aaaacaauuu ggucuucaaa caacuccaag aacacagaga gagaguggaa aaacugaagu | 180 |
| uuuucacaag aaauggcaca gauuaguagc auggcacaag ggauacagac ccuuagucug | 240 |
| aauuccucca aucuuucuaa aacacaaaag gguccucuug uuucaaauuc ucucuucuuu | 300 |
| ggaucaaaga aacuaaccca aauuucagca aaaucauuag ggguguuuaa gaaagauuca | 360 |
| guuuugaggg uggugaggaa gucaucuuuu aggauuucug caucaguggc uacugcagag | 420 |
| aaaccccaug agauugugcu agaacccauc aaagauauau cugguacugu uaaauuaccc | 480 |
| gguucgaaau cccuuuccaa ucguauucuc cuucuugcug cccuuucuga gggaaggacu | 540 |
| guuguugaca auuuacugag uagugacgac auucauuaca ugcuuggugc guugaaaaca | 600 |
| cuuggacuuc auguugaaga ugacaaugaa aaccaacgag caauugugga agguuguggu | 660 |
| gggcaguuuc cugucgguaa aaagucugag gaagaaaucc aacccc | 706 |

<210> SEQ ID NO 80
<211> LENGTH: 806
<212> TYPE: RNA
<213> ORGANISM: Artificial Sequence
<220> FEATURE:
<223> OTHER INFORMATION: Synthetic Heterostructured RNA (NA8002)

<400> SEQUENCE: 80

| | | | | | |
|---|---|---|---|---|---|
| ggggaauuccc | gacaaaaggu | gguuggugaa | gcugacauug | gacuccauuc | ugcuuaauug | 60 |
| ccuaacccca | ucucccuuca | aucuaccuac | cauaaccauu | uucuucaaaa | uuuucucaaa | 120 |
| aaaacaauuu | ggucuucaaa | caacuccaag | aacacagaga | gagaguggaa | aaacugaagu | 180 |
| uuuucacaag | aaauggcaca | gauuaguagc | auggcacaag | ggauacagac | ccuuagucug | 240 |
| aauuccucca | aucuuucuaa | aacacaaaag | gguccucuug | uuucaaauuc | ucucuucuuu | 300 |
| ggaucaaaga | aacuaaccca | aauuucagca | aaaucauuag | ggguguuuaa | gaaagauuca | 360 |
| guuugaggg | uggugaggaa | gucaucuuuu | aggauuucug | caucaguggc | uacugcagag | 420 |
| aaacccaug | agauugugcu | agaacccauc | aaagauauau | cugguacugu | uaaauuaccc | 480 |
| gguucgaaau | cccuuuccaa | ucguauucuc | cuucuugcug | cccuuucuga | gggaaggacu | 540 |
| guuguugaca | auuuacugag | uagugacgac | auucauuaca | ugcuuggugc | guugaaaaca | 600 |
| cuuggacuuc | auguugaaga | ugacaaugaa | aaccaacgag | caauugugga | agguuguggu | 660 |
| gggcaguuuc | cugucgguaa | aaagucgag | gaagaaaucc | aacuauuccu | uggaaaugca | 720 |
| ggaacagcaa | ugcguccguu | gacagcagca | guuacguag | cuggaggaca | uucaagauau | 780 |
| guucuugaug | gaguuccuag | gauccc | | | | 806 |

<210> SEQ ID NO 81
<211> LENGTH: 319
<212> TYPE: RNA
<213> ORGANISM: Artificial Sequence
<220> FEATURE:
<223> OTHER INFORMATION: Synthetic Heterostructured RNA (R1)

<400> SEQUENCE: 81

| | | | | | |
|---|---|---|---|---|---|
| gggaccucga | caaccugcac | gcuugccuaa | acaaggcaaa | acuaacggua | agucggaugg | 60 |
| uaacaucacu | gcuggagaaa | cccagcgugg | uggcauaccu | agagggaaag | gccgguggcg | 120 |
| guuccggggg | agccgagcuc | augaaagcua | accugcuggu | ucugcugugc | gcucuggcug | 180 |
| cugcugacgc | ugacaccauc | ugcacgguu | accgcuaa | caacucuacc | gacaccguug | 240 |
| acaccguucu | ggaaaaaaac | guuaccguua | cccacucugu | uaaccugcug | gaagacucuc | 300 |
| acaacgguaa | acugugccc | | | | | 319 |

<210> SEQ ID NO 82
<211> LENGTH: 397
<212> TYPE: RNA
<213> ORGANISM: Artificial Sequence
<220> FEATURE:
<223> OTHER INFORMATION: Synthetic Heterostructured RNA (R2)

<400> SEQUENCE: 82

| | | | | | |
|---|---|---|---|---|---|
| gggaccucga | caaccugcac | gcuugccuaa | acaaggcaaa | acuaacggua | agucggaugg | 60 |
| uaacaucacu | gcuggagaaa | cccagcgugg | uggcauaccu | agagggaaag | gccgguggcg | 120 |
| guuccggggg | agccgagcuc | augaaagcua | accugcuggu | ucugcugugc | gcucuggcug | 180 |
| cugcugacgc | ugacaccauc | ugcacgguu | accgcuaa | caacucuacc | gacaccguug | 240 |
| acaccguucu | ggaaaaaaac | guuaccguua | cccacucugu | uaaccugcug | gaagacucuc | 300 | acaacgguaa acugugccgu cugaaaggua ucgcuccgcu gcagcugggu aaaugcaaca        360 ucgcugguug gcugcugggu aacccggaau gcgaccc                                 397

<210> SEQ ID NO 83
<211> LENGTH: 466
<212> TYPE: RNA
<213> ORGANISM: Artificial Sequence
<220> FEATURE:
<223> OTHER INFORMATION: Synthetic Heterostructured RNA (R3)

<400> SEQUENCE: 83
gggaccucga caaccugcac gcuugccuaa acaaggcaaa acuaacggua agucggaugg         60
uaacaucacu gcuggagaaa cccagcgugg uggcauaccu agagggaaag gccgguggcg        120
guuccggggg agccgagcuc augaaagcua accugcuggu ucugcugugc gcucuggcug        180
cugcugacgc ugacaccauc ugcaucgguu accacgcuaa caacucuacc gacaccguug        240
acaccguucu ggaaaaaaac guuaccguua cccacucugu uaaccugcug gaagacucuc        300
acaacgguaa acugugccgu cugaaaggua ucgcuccgcu gcagcugggu aaaugcaaca        360
ucgcugguug gcugcugggu aacccggaau gcgaccc gcu gcgccgguu cguucuuggu       420 cuuacaucgu ugaaaccccg aacucugaaa acgguaucug cuaccc                      466

<210> SEQ ID NO 84
<211> LENGTH: 588
<212> TYPE: RNA
<213> ORGANISM: Artificial Sequence
<220> FEATURE:
<223> OTHER INFORMATION: Synthetic Heterostructured RNA (R4)

<400> SEQUENCE: 84
gggaccucga caaccugcac gcuugccuaa acaaggcaaa acuaacggua agucggaugg         60
uaacaucacu gcuggagaaa cccagcgugg uggcauaccu agagggaaag gccgguggcg        120
guuccggggg agccgagcuc augaaagcua accugcuggu ucugcugugc gcucuggcug        180
cugcugacgc ugacaccauc ugcaucgguu accacgcuaa caacucuacc gacaccguug        240
acaccguucu ggaaaaaaac guuaccguua cccacucugu uaaccugcug gaagacucuc        300
acaacgguaa acugugccgu cugaaaggua ucgcuccgcu gcagcugggu aaaugcaaca        360
ucgcugguug gcugcugggu aacccggaau gcgaccc gcu gcgccgguu cguucuuggu       420 cuuacaucgu ugaaaccccg aacucugaaa acgguaucug cuacccgggu gacuucaucg        480
acuacgaaga acugcgugaa cagcugucuu cuguuucuuc uuucgaacgu uucgaaaucu        540
ucccgaaaga aucuucuugg ccgaaccaca acaccaacgg uguuaccc                    588

<210> SEQ ID NO 85
<211> LENGTH: 664
<212> TYPE: RNA
<213> ORGANISM: Artificial Sequence
<220> FEATURE:
<223> OTHER INFORMATION: Synthetic Heterostructured RNA (R5)

<400> SEQUENCE: 85
gggaccucga caaccugcac gcuugccuaa acaaggcaaa acuaacggua agucggaugg         60
uaacaucacu gcuggagaaa cccagcgugg uggcauaccu agagggaaag gccgguggcg        120
guuccggggg agccgagcuc augaaagcua accugcuggu ucugcugugc gcucuggcug        180
cugcugacgc ugacaccauc ugcaucgguu accacgcuaa caacucuacc gacaccguug        240
acaccguucu ggaaaaaaac guuaccguua cccacucugu uaaccugcug gaagacucuc        300

| | |
|---|---|
| acaacgguaa acugugccgu cugaaaggua ucgcuccgcu gcagcugggu aaaugcaaca | 360 |
| ucgcugguug gcugcugggu aacccggaau gcgacccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuu cuguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaagguucuu | 660 |
| accc | 664 |

<210> SEQ ID NO 86
<211> LENGTH: 733
<212> TYPE: RNA
<213> ORGANISM: Artificial Sequence
<220> FEATURE:
<223> OTHER INFORMATION: Synthetic Heterostructured RNA (R6)

<400> SEQUENCE: 86

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accgcuaa caacucuacc gacaccguug | 240 |
| acaccguucu ggaaaaaaac guuaccguua cccacucugu uaaccugcug aagacucuc | 300 |
| acaacgguaa acugugccgu cugaaaggua ucgcuccgcu gcagcugggu aaaugcaaca | 360 |
| ucgcugguug gcugcugggu aacccggaau gcgacccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuu cuguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaagguucuu | 660 |
| acccgaaacu gaaaaacucu uacguuaaca aaaagguaa agaaguucug guucuguggg | 720 |
| guauccacca ccc | 733 |

<210> SEQ ID NO 87
<211> LENGTH: 822
<212> TYPE: RNA
<213> ORGANISM: Artificial Sequence
<220> FEATURE:
<223> OTHER INFORMATION: Synthetic Heterostructured RNA (R7)

<400> SEQUENCE: 87

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accgcuaa caacucuacc gacaccguug | 240 |
| acaccguucu ggaaaaaaac guuaccguua cccacucugu uaaccugcug aagacucuc | 300 |
| acaacgguaa acugugccgu cugaaaggua ucgcuccgcu gcagcugggu aaaugcaaca | 360 |
| ucgcugguug gcugcugggu aacccggaau gcgacccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuu cuguuucuuc uuucgaacgu uucgaaaucu | 540 |

| | |
|---|---|
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaagguucuu | 660 |
| acccgaaacu gaaaaacucu uacguuaaca aaaagguaa agaaguucug guucuguggg | 720 |
| guauccacca cccgccgaac ucuaaagaac agcagaaccu guaccagaac gaaaacgcuu | 780 |
| acguuucugu uguuaccucu aacuacaacc gucguuucac cc | 822 |

<210> SEQ ID NO 88
<211> LENGTH: 885
<212> TYPE: RNA
<213> ORGANISM: Artificial Sequence
<220> FEATURE:
<223> OTHER INFORMATION: Synthetic Heterostructured RNA (R8)

<400> SEQUENCE: 88

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accgcuaa caacucuacc gacaccguug | 240 |
| acaccguucu ggaaaaaaac guuaccguua cccacucugu uaaccugcug gaagacucuc | 300 |
| acaacgguaa acugugccgu cugaaaggua ucgcuccgcu gcagcugggu aaaugcaaca | 360 |
| ucgcugguug gcugcugggu aacccggaau gcgacccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuu cuguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaagguucuu | 660 |
| acccgaaacu gaaaaacucu uacguuaaca aaaagguaa agaaguucug guucuguggg | 720 |
| guauccacca cccgccgaac ucuaaagaac agcagaaccu guaccagaac gaaaacgcuu | 780 |
| acguuucugu uguuaccucu aacuacaacc gucguuucac cccggaaauc gcugaacguc | 840 |
| cgaaaguucg ugaccaggcu ggucguauga acuacuacug gaccc | 885 |

<210> SEQ ID NO 89
<211> LENGTH: 1032
<212> TYPE: RNA
<213> ORGANISM: Artificial Sequence
<220> FEATURE:
<223> OTHER INFORMATION: Synthetic Heterostructured RNA (R9)

<400> SEQUENCE: 89

| | |
|---|---|
| gggaccucga caaccugcac gcuugccuaa acaaggcaaa acuaacggua agucggaugg | 60 |
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accgcuaa caacucuacc gacaccguug | 240 |
| acaccguucu ggaaaaaaac guuaccguua cccacucugu uaaccugcug gaagacucuc | 300 |
| acaacgguaa acugugccgu cugaaaggua ucgcuccgcu gcagcugggu aaaugcaaca | 360 |
| ucgcugguug gcugcugggu aacccggaau gcgacccgcu gcugccgguu cguucuuggu | 420 |
| cuuacaucgu ugaaaccccg aacucugaaa acgguaucug cuacccgggu gacuucaucg | 480 |
| acuacgaaga acugcgugaa cagcugucuu cuguuucuuc uuucgaacgu uucgaaaucu | 540 |
| ucccgaaaga aucuucuugg ccgaaccaca acaccaacgg uguuaccgcu gcuugcucuc | 600 |

```
acgaagguaa aucuucuuuc uaccguaacc ugcuguggcu gaccgaaaaa gaagguucuu      660
acccgaaacu gaaaaacucu uacguuaaca aaaagguaa agaaguucug guucuguggg      720
guauccacca cccgccgaac ucuaaagaac agcagaaccu guaccagaac gaaaacgcuu      780
acguuucugu guuaccucu aacuacaacc gucguuucac cccggaaauc gcugaacguc      840
cgaaaguucg ugaccaggcu ggucguauga acuacuacug gacccugcug aaaccggguc      900
acaccaucau cuucgaagcu aacguaacc ugaucgcucc gauguacgcu uucgcucugu      960 cucguggcuuu cgguucuggu aucaucaccu cuaacgcuuc uaugcacgaa ugcaacacca     1020
aaugccagac cc                                                          1032
```

<210> SEQ ID NO 90
<211> LENGTH: 1153
<212> TYPE: RNA
<213> ORGANISM: Artificial Sequence
<220> FEATURE:
<223> OTHER INFORMATION: Synthetic Heterostructured RNA (R10)

<400> SEQUENCE: 90

```
gggaccucga caaccugcac gcuugccuaa acaaggcaaa acuaacggua agucggaugg       60
uaacaucacu gcuggagaaa cccagcgugg uggcauaccu agagggaaag gccgguggcg      120
guuccggggg agccgagcuc augaaagcua accugcuggu ucugcugugc gcucuggcug      180
cugcugacgc ugacaccauc ugcaucgguu accacgcuaa caacucuacc gacaccguug      240
acaccguucu ggaaaaaaac guuaccguua cccacucugu uaaccugcug gaagacucuc      300
acaacgguaa acugugccgu cugaaaggua ucgcuccgcu gcagcugggu aaaugcaaca      360
ucgcugguug gcugcugggu aaccggaau gcgaccgcu gcugccgguu cguucuuggu      420
cuuacaucgu ugaaaccccg aacucugaaa acgguaucug cuacccgggu gacuucaucg      480
acuacgaaga acugcgugaa cagcugucuu cuguuucuuc uuucgaacgu uucgaaaucu      540
ucccgaaaga aucuucuugg ccgaaccaca acaccaacgg uguuaccgcu gcuugcucuc      600
acgaagguaa aucuucuuuc uaccguaacc ugcuguggcu gaccgaaaaa gaagguucuu      660
acccgaaacu gaaaaacucu uacguuaaca aaaagguaa agaaguucug guucuguggg      720
guauccacca cccgccgaac ucuaaagaac agcagaaccu guaccagaac gaaaacgcuu      780
acguuucugu guuaccucu aacuacaacc gucguuucac cccggaaauc gcugaacguc      840
cgaaaguucg ugaccaggcu ggucguauga acuacuacug gacccugcug aaaccggguc      900
acaccaucau cuucgaagcu aacguaacc ugaucgcucc gauguacgcu uucgcucugu      960 cucguggcuuu cgguucuggu aucaucaccu cuaacgcuuc uaugcacgaa ugcaacacca     1020
aaugccagac cccgcugggu gcuaucaacu cuucucugcc guaccagaac auccaccgg      1080 uuaccaucgg ugaaugcccg aaauacguuc guucugcuaa acugcguaug guuaccgguc     1140
ugcguaacau ccc                                                        1153
```

<210> SEQ ID NO 91
<211> LENGTH: 1648
<212> TYPE: RNA
<213> ORGANISM: Artificial Sequence
<220> FEATURE:
<223> OTHER INFORMATION: Synthetic Heterostructured RNA (R11)

<400> SEQUENCE: 91

```
gggaccucga caaccugcac gcuugccuaa acaaggcaaa acuaacggua agucggaugg       60
```

| | | |
|---|---|---|
| uaacaucacu gcuggagaaa cccagcgugg uggcauaccu agagggaaag gccgguggcg | 120 |
| guuccggggg agccgagcuc augaaagcua accugcuggu ucugcugugc gcucuggcug | 180 |
| cugcugacgc ugacaccauc ugcaucgguu accacgcuaa caacucuacc gacaccguug | 240 |
| acaccguucu ggaaaaaaac guuaccguua cccacucugu uaaccugcug gaagacucuc | 300 |
| acaacgguaa acugugccgu cugaaaggua ucgccccgcu gcagcuggu aaaugcaaca | 360 |
| ucgcugguug gcugcugggu aacccggaau gcgaccccgcu gcugccgguu cguucuuggu | 420 |
| cuuacaucgu ugaaaccccg aacucugaaa acgguaucug cuaccccgggu gacuucaucg | 480 |
| acuacgaaga acugcgugaa cagcugucuu cuguuucuuc uuucgaacgu uucgaaaucu | 540 |
| ucccgaaaga aucuucuugg ccgaaccaca acaccaacgg uguuaccgcu gcuugcucuc | 600 |
| acgaagguaa aucuucuuuc uaccguaacc ugcuguggcu gaccgaaaaa gaagguucuu | 660 |
| acccgaaacu gaaaaacucu uacguuaaca aaaagguaa agaaguucug guucuguggg | 720 |
| guauccacca cccgccgaac ucuaaagaac agcagaaccu uaccagaac gaaaacgcuu | 780 |
| acguucugu uguuaccucu aacuacaacc gucguuucac cccggaaauc gcugaacguc | 840 |
| cgaaaguucg ugaccaggcu ggucguauga acuacuacug gacccugcug aaaccgggug | 900 |
| acaccaucau cuucgaagcu aacgguaacc ugaucgcucc gaaguacgcu uucgcucugu | 960 |
| cucgugguuu cgguucuggu aucauccaccu cuaacgcuuc uaugcacgaa ugcaacacca | 1020 |
| aaugccagac cccgcugggu gcuaucaacu cuucucugcc guaccagaac auccacccgg | 1080 |
| uuaccaucgg ugaaugcccg aaauacguuc guucugcuaa acugcguaug guuaccgguc | 1140 |
| ugcguaacau cccgucuauc cagucucgug ucuguucgg ugcuaucgcu gguuucaucg | 1200 |
| aagguggguug gaccgguaug aucgacgguu gguacgguua ccaccaccag aacgaacagg | 1260 |
| guucugguua cgcugcugac cagaaaucua cccagaacgc uaucaacggu uccaccaaca | 1320 |
| aaguuaacac cguuaucgaa aaaugaaca uccaguucac cgcuguuggu aaagaauuca | 1380 |
| acaaacugga aaaacguaug gaaaaccuga caaaaaaagu ugacgacggu uccuggaca | 1440 |
| ucuggaccua caacgcugaa cugcuгguuc ugcuggaaaa cgaacguacc cuggacuucc | 1500 |
| acgacucuaa cguuaaaaac cuguacgaaa aaguuaaauc ucagcugaaa acaacgcua | 1560 |
| aagaaaucgg uaacgguugc uucgaauucu accacaaaug cgacaacgaa ugcauggaau | 1620 |
| cuguucguaa cgguaccuac gacuacccc | 1648 |

<210> SEQ ID NO 92
<211> LENGTH: 424
<212> TYPE: RNA
<213> ORGANISM: Artificial Sequence
<220> FEATURE:
<223> OTHER INFORMATION: Synthetic Heterostructured RNA (NA,NVT,VP1, VP10)

<400> SEQUENCE: 92

| | | |
|---|---|---|
| gggcgauaau acaguuuugg acucaggugu gagauuuuau gaucaggacu augaaggaca | 60 |
| aauaacccca augaauaug uaacuggguu guauaacuuu ggucagggc caauagaguu | 120 |
| acguuuugau uuuguuucaa augcguuuca cacuggaaca gugauuauau cagcggagua | 180 |
| uaaucgauca ucuacuaaua cggaugagug ucagucacac ucaacuuaua cuaaaacguu | 240 |
| ccacuuggga gaacaaaaau caguacauuu cacugugccu uauauauaug auacuguuau | 300 |
| gcggagaaau acggcuagcg ccuauuuacc gguaacugau uauguaaagg cagauaaugu | 360 |
| uaguagggcg caggcuacgg ggauuagagc agaaucuaaa augagaguga agugagauc | 420 | gccc                                                                      424

<210> SEQ ID NO 93
<211> LENGTH: 424
<212> TYPE: RNA
<213> ORGANISM: Artificial Sequence
<220> FEATURE:
<223> OTHER INFORMATION: Synthetic Heterostructured RNA (NVT IV, NVT 4,
      VP20)

<400> SEQUENCE: 93
gggcgauaau acaguuuugg acucaggugu gagauuuuau gaucaggacu augaaggaca      60
aauaacccca auggaauaug uaacuggguu guauaacuuu uggucagggc caauagaguu     120
acguuuugau uuuguuucaa augcguuuca cacuggaaca gugauuauau cagcggagua     180
uaaucgauca ucuacuaaua cggaugagug ucagucacac ucaacuuaua cuaaaacguu     240
ccacuuggga gaacaaaaau caguacauuu cacgugccu auauauaug auacuguuau      300 gcggagaaau acggcuagcg ccuauuuacc gguaacugau uauguaagg cagauaaugu      360 uaguagggcg caggcuacgg ggauuagagc agaaucuaaa augagaguga agugagauc      420 gccc                                                                      424

<210> SEQ ID NO 94
<211> LENGTH: 2860
<212> TYPE: PRT
<213> ORGANISM: Unknown
<220> FEATURE:
<223> OTHER INFORMATION: Chinese Sacbrood virus strain BJ 2012

<400> SEQUENCE: 94

Met Asp Met Ile Ser Pro Leu Phe Tyr Gly Tyr Val Arg Ser Thr Asn
1               5                   10                  15

Arg Phe Pro Arg Ser Gly Gly Ile Arg Arg Asp Leu Ser Ala Glu Tyr
            20                  25                  30

Ser Ser Arg Ala Arg Thr Tyr Lys Thr Lys Leu Glu Ala Arg Asn Cys
        35                  40                  45

Gly Val Glu Arg Leu Ser Thr Ile Leu Thr Ser Cys Lys Lys Thr Phe
    50                  55                  60

Asp Thr Val Asp Ser Tyr Thr Asp Leu Phe Asn Gly Trp Val Ser Gly
65                  70                  75                  80

Lys Tyr Val Asp Lys Asn Val His Tyr Thr Glu Val Ser Ser Asp Glu
                85                  90                  95

Ser Gly Arg Arg Ile Trp Asn Val Arg Arg Ala Val Ser Ile Lys Thr
            100                 105                 110

Ala Glu Gly Ile Ile Val Trp Arg Lys Val Ile Thr Ser Tyr Ser Cys
        115                 120                 125

Arg Val Ala Ser Glu Leu Ala Ala Lys Ser Ile Leu Val Gln Phe Val
    130                 135                 140

Gly Pro Val Arg Thr Gln Ser Asp Glu Val Pro Ser Lys Glu Ser Ile
145                 150                 155                 160

Gln Gly Asp Ala Thr Gln Gln Ser Ser Lys Glu Glu Asn Thr Ile Ile
                165                 170                 175

Thr Arg Asp Gln Gln Gln Thr Val Ser Glu Lys Ile Pro Ser Thr Val
            180                 185                 190

Gly Asp Leu Ala Ile Ala Ser Ser Glu Pro Thr Gln Gln Phe Arg Ser
        195                 200                 205

Leu Thr Asn Arg Trp Leu Pro Ile Asn Ser Ile Arg Val Thr Val Asn

```
                210                 215                 220
Ser Lys Arg Asn Asp Ile Leu Ala Gln Tyr Tyr Ile Pro Glu Asp Phe
225                 230                 235                 240

Leu Leu His Tyr Ala Lys Cys Ala Pro Asn Thr Ile Pro Phe Glu Thr
                245                 250                 255

Tyr Val Tyr Gly Lys Tyr Glu Leu Glu Leu Lys Phe Val Ala Asn Gly
                260                 265                 270

Asn Lys Phe Gln Cys Gly Lys Val Ile Ile Ser Val Lys Phe Asp Ser
                275                 280                 285

Tyr Gln Ala Asp Asn Ile Asn Thr Gly Phe Gln Ala Ala Leu Ser Arg
                290                 295                 300

Pro His Val Met Leu Asp Leu Ser Thr Asn Asn Glu Gly Val Leu Lys
305                 310                 315                 320

Ile Pro Phe Arg Tyr His Arg Ala Phe Val Arg Asn Gln Thr His Lys
                325                 330                 335

Thr Ala Thr Val Gly Ile Arg Pro Gly Lys Phe Ala Ser Ile Tyr Val
                340                 345                 350

Gln Val Leu Ser Pro Leu Gln Thr Gly Glu Gly Cys Ala Asn Asp Thr
                355                 360                 365

Phe Ile Arg Pro Phe Tyr Arg Tyr Thr Arg Ala Glu Phe Ala Gly Thr
                370                 375                 380

Ser Asp Lys Val Pro Leu Thr Gln Thr Asp Val Ile Gly Thr Leu Leu
385                 390                 395                 400

Ser Gly Gly Pro Thr Pro Ala Leu Lys Asp Ile Leu Val Gly Val Glu
                405                 410                 415

Arg Thr Leu Asp Gln Leu Gly Arg Gly Asn Asn Gln Asp Lys Pro Lys
                420                 425                 430

Asp Ile Ser Ser Ile Thr Ile Ile Pro Lys Pro Arg Leu Gly Ser Pro
                435                 440                 445

His Gly Lys Gly Lys Ser Asp Ala Val Ala Met Arg Val Asn Pro Val
                450                 455                 460

Ala Leu Thr Ser Phe Gln Asp Val Asn Ala Tyr Ser Asp Glu Pro Arg
465                 470                 475                 480

Thr Thr Leu Asp Ile Ala Arg Ile Trp Gly Leu Arg Ser Thr Phe Asn
                485                 490                 495

Trp Gly Ser Gly Asp Ala His Gly Lys Glu Leu Phe Asn Thr Val Leu
                500                 505                 510

Asp Ser Gly Val Arg Phe Tyr Asp Gln Asp Tyr Glu Gly Gln Ile Thr
                515                 520                 525

Pro Met Glu Tyr Val Thr Gly Leu Tyr Asn Phe Trp Ser Gly Pro Ile
                530                 535                 540

Glu Leu Arg Phe Asp Phe Val Ser Asn Ala Phe His Thr Gly Thr Val
545                 550                 555                 560

Ile Ile Ser Ala Glu Tyr Asn Arg Ser Ser Thr Asn Thr Asp Glu Cys
                565                 570                 575

Gln Ser His Ser Thr Tyr Thr Lys Thr Phe His Leu Gly Glu Gln Lys
                580                 585                 590

Ser Val His Phe Thr Val Pro Tyr Ile Tyr Asp Thr Val Met Arg Arg
                595                 600                 605

Asn Thr Ala Ser Ala Tyr Leu Pro Val Thr Asp Tyr Asp Lys Ala Asp
                610                 615                 620

Asn Val Ser Arg Ala Gln Ala Thr Gly Ile Arg Ala Glu Ser Lys Met
625                 630                 635                 640
```

```
Arg Val Lys Val Arg Val Asn Val Leu Arg Pro Val Ala Ser Thr
            645                 650                 655

Thr Ser Thr Ile Glu Val Leu Val Tyr Met Arg Gly Gly Lys Asn Tyr
            660                 665                 670

Ala Leu His Gly Leu Lys Gln Ser Thr Tyr Trp Pro Ser Arg Ser Val
            675                 680                 685

Val Pro Ile Asp Ser Phe Pro Pro Asp Gly Tyr Asp Pro Val Lys Pro
            690                 695                 700

Thr Asn Arg Pro Thr Arg Gly Val Gly Ser Pro Asp Ser Asn Gly Gly
705                 710                 715                 720

Lys Gly Gln Ser Thr Val Ala Val Ser Asp Asn Pro His Arg Phe Leu
                725                 730                 735

Pro Ala Asn Val Ser Asn Arg Trp Asn Glu Tyr Ser Ser Ala Tyr Leu
            740                 745                 750

Pro Arg Val Gln Met Asp Thr Gly Asp Lys Glu Asp Glu Asp Glu Thr
            755                 760                 765

Ala Asn Phe Ser Asp Gly Val Thr Ala Met Gly Phe Gln Ser Leu Asp
            770                 775                 780

Thr Gln Val Leu Ile Lys Asp Ile Leu Arg Arg Pro Val Leu Leu Phe
785                 790                 795                 800

Asn His Val Gln Leu Asp Pro Gly Tyr Thr Gly Phe Phe Ile Pro Ile
                805                 810                 815

Met Pro Pro Ser Arg Met Met Gln Tyr Lys Ser Gly Asp Arg Glu Thr
            820                 825                 830

Ser Phe Gln Arg Leu Ile Gly Arg Thr Pro Gln Ala Ala Ile Met Asn
            835                 840                 845

Leu Phe Arg Phe Trp Arg Gly Ser Leu Arg Tyr Thr Ile Ile His
            850                 855                 860

Ser Thr Asp Gly His Pro Ile Tyr Val Thr His Val Pro His Thr Gly
865                 870                 875                 880

Asn Arg Val Tyr Gly Leu Met Lys Val Asn Asn Leu His Glu Tyr Thr
                885                 890                 895

Lys Val Pro Ile Phe Gly Ser Gly Leu Thr Thr Glu Met Ile Ile Pro
            900                 905                 910

Ser Val Asn Pro Ser Ile Cys Val Glu Val Pro Phe Asp Thr Glu Asn
            915                 920                 925

Asn Trp Ala Val Thr Phe Glu Glu Asp Ala Gln Arg Asn Tyr Ser Trp
930                 935                 940

Arg Asp Lys Gly Asp Thr Val Thr Gly His Leu Val Val Thr Pro Val
945                 950                 955                 960

Val Pro Val Tyr Met Ser Val Trp Val Glu Ala Glu Asp Asp Phe Glu
                965                 970                 975

Val Ser Asn Phe Cys Gly Pro Pro Thr Val Lys Thr Asn Asp Trp Asn
            980                 985                 990

Tyr Ala Phe Ser Asp Glu His Ala Arg Val Gln Met Asp Asp Ser Val
            995                 1000                1005

Glu Arg Val Tyr Asp Glu Gly Thr Gln Thr Tyr Tyr Tyr Pro Ala Pro
            1010                1015                1020

Lys Pro Glu Gly Phe Ser Leu Asn Asn Val Arg Thr Ser Val Ser Thr
1025                1030                1035                1040

Leu Cys Asn Met Leu Gly Lys Val Val Thr Pro Glu Arg Ala Met Lys
                1045                1050                1055
```

```
Thr Ala Leu Cys Ala Thr Pro Tyr Phe Gly Ser Ala Tyr Met Thr Ala
            1060                1065                1070

Thr Thr Leu Asp Ala Ile Gly Ser Met Gln Asn Thr Val Thr Gly Ala
        1075                1080                1085

Ala His Gln Leu Thr Ala Ser Val Asp Ala Arg Leu Glu Gln Leu Ser
        1090                1095                1100

Ala Lys Phe Gly Asp Ser Ile Asp Val Ile Thr Thr Ala Val Lys Glu
1105                1110                1115                1120

Ala Ile Gly Lys Ile Ser Ser Gly Met Phe Asn Met Val Asn Tyr Thr
                1125                1130                1135

Gly Tyr Cys Ile Asp Val Ile Leu Asp Ile Leu Val Ala Trp Ile Asp
            1140                1145                1150

Arg Ser Trp Thr Ala Val Gly Val Gly Ile Ile Arg Phe Val Thr Lys
        1155                1160                1165

Val Leu Gly Leu Gly Ala Ile Ser Lys Val Met Asn Met Ala Thr Thr
    1170                1175                1180

Phe Gly Gln Leu Ile Ala Arg Val Tyr Glu Pro Pro Arg Pro Val Val
1185                1190                1195                1200

Gln Ala Pro Pro Thr Glu Ala Thr Leu Thr Gly Ala Leu Ala Gly
        1205                1210                1215

Ile Leu Gly Thr Leu Met Gly Val Tyr Ile Ser Pro Leu Ser Gly Gly
            1220                1225                1230

Ser Tyr Phe Lys Asn Leu Met Leu Arg Met Thr Ser Ser Ala Gly Pro
            1235                1240                1245

Ser Tyr Leu Val Gly Val Leu Arg Phe Val Glu Ala Thr Phe Asn Thr
    1250                1255                1260

Val Lys Asp Met Ile Leu Asn Ala Leu Gly Tyr Val Ser Pro Glu Asn
1265                1270                1275                1280

Ala Ala Leu Lys Met Leu Ser Gly Thr Ser Ala Thr Ile Gln Asn Phe
                1285                1290                1295

Ile Thr Asp Ala Gln Leu Ile Thr Thr Glu Ala Asn Ala Ala Leu Val
            1300                1305                1310

Gly His Pro Ser Phe Arg Ala Lys Tyr Trp Asn Thr Val Met Gln Ala
        1315                1320                1325

Tyr Gln Ile Gln Lys Leu Leu Leu Thr Val Pro Gln Ser Ser Ala Ser
    1330                1335                1340

Pro Ile Leu Ser Arg Leu Cys Ser Asp Val Ile Arg Asn Ser Asn Glu
1345                1350                1355                1360

Lys Phe Ile Asp Ile Ser Ser Ser Pro Val Arg Tyr Glu Pro Phe Val
                1365                1370                1375

Ile Cys Ile Glu Gly Pro Ala Gly Ile Gly Lys Ser Glu Ile Val Glu
            1380                1385                1390

Thr Leu Ala Thr Ala Leu Leu Lys Gly Val Asn Leu Lys Arg Pro His
        1395                1400                1405

Ser Gly Ala Thr Tyr Phe Arg Met Pro Gly Ser Arg Phe Trp Ser Gly
    1410                1415                1420

Tyr Arg Asp Gln Pro Val Val Tyr Asp Asp Trp Ala Asn Leu Thr
1425                1430                1435                1440

Glu Pro Gln Ala Leu Met Gln Gln Ile Ser Glu Leu Tyr Gln Leu Lys
                1445                1450                1455

Ser Thr Ser Thr Phe Ile Pro Glu Met Ala His Leu Glu Glu Lys Lys
            1460                1465                1470

Ile Arg Gly Asn Pro Leu Ile Val Ile Leu Leu Cys Asn His Ala Phe
```

```
              1475                1480                1485

Pro Asp Ser Ala Val Thr Asn Met Ser Leu Glu Pro Ser Ala Ile Tyr
            1490                1495                1500

Arg Arg Arg Asp Val Leu Leu Tyr Ala Glu Arg Lys Pro Glu Tyr Glu
1505                1510                1515                1520

Gly Val Ser Leu Arg Asp Met Ser Val Asn Glu Gln Thr Thr Phe Ala
                1525                1530                1535

His Leu Asn Phe Tyr Lys Tyr Lys Asp Ser Thr Asn Ala Ser Ser Cys
            1540                1545                1550

Thr Ser Lys Pro Val Gly Tyr Glu Leu Thr Lys Glu Trp Leu Val Ala
        1555                1560                1565

Lys Phe Ala Lys Trp His Ala Gln Glu Gln Ile Lys Val Gln Arg Arg
    1570                1575                1580

Met Glu Asn Ile Arg Ala Gly Met Tyr Asp Ala Glu Val Gly Ser Leu
1585                1590                1595                1600

Arg Leu Glu Asp Pro Phe Ser Leu Tyr Tyr Ser Val Ser Ser Glu Val
                1605                1610                1615

Ile Glu Asn Asn Glu Asp Val Thr Thr Gly Phe Leu Pro Ser Glu Ile
            1620                1625                1630

Leu Ala Phe Glu Cys Lys Arg Ile Ala Asn Val Ile Asp Ala His Gln
        1635                1640                1645

Ser Ser Val Arg Glu Ile Val Ile Pro Asp Glu Pro Arg Asp Pro Phe
    1650                1655                1660

Val Thr Thr Gln Gly Asp Phe Ala Gly Val Phe Met Gly Ala Ala Leu
1665                1670                1675                1680

Gly Arg Val Val Leu Glu Lys Val Cys Ser Phe Ser Ser Glu Leu Ile
                1685                1690                1695

Asn Tyr Ala Ile Asp Trp Ile Ile Ser Lys His Asn Val Ile His Glu
            1700                1705                1710

Cys Cys Val Cys Lys Glu Thr Lys Gly Ile Ala Trp Tyr Cys Leu Asp
        1715                1720                1725

Ser Ala Gln Leu Ala Pro Gln Ser Thr His Tyr Met Cys Asn Gly Cys
    1730                1735                1740

Met Val Ala Ser Arg Ala Ala Asn Arg Glu Val Val Gln Cys Pro Met
1745                1750                1755                1760

Cys Arg Ser Pro Asn Phe Glu Arg Trp Gly Thr Tyr Gln Gln Met Thr
                1765                1770                1775

Gly Ile Thr Ile Val Gly Arg Ala Leu Ile Met Gly Leu Ile Thr Val
            1780                1785                1790

Asp Lys Gly Val Asn Val Leu Arg Arg Met Leu Gly Gly Thr Phe Gly
        1795                1800                1805

Ala Met Tyr Ala Ala Ile Met Arg Ile Ala Ala Thr Leu His Pro Ser
    1810                1815                1820

Met Ser Glu Arg Thr Ala Glu Leu Leu Arg Met Thr Gly Ala Leu Val
1825                1830                1835                1840

Asp Met Ser Glu Tyr Thr Val Arg Glu Leu Gln His Val Val Thr Gln
                1845                1850                1855

Ile Asp Asp Pro Phe Glu Ser Gly Asp Glu Asp Asp Val Gly Thr
            1860                1865                1870

Ser Lys Ile His Trp Arg Asp Ile Val Thr Phe Asp Phe Glu Glu Asp
        1875                1880                1885

Val Ala Arg Ser Leu Met Arg Glu Arg Glu Ile Thr Asn Ile Pro Cys
    1890                1895                1900
```

```
Leu His Ile Leu Leu Gly Gly Ala Leu His His Val Ser Tyr Arg Asp
1905                1910                1915                1920

Gly Gly Tyr Asn Val Pro Asn Gly Gly Thr Met Val Arg Val Pro Glu
            1925                1930                1935

Leu Pro Cys Thr Ser Asp Cys Tyr Phe Ser Asp Met Glu Ala Phe Lys
            1940                1945                1950

Ser Phe Ala Gln Arg Tyr Lys Glu Glu Lys Lys Ile Glu Ile Gln Ser
            1955                1960                1965

Tyr Leu Leu Gly Phe Ile Asn Asn Gln His Ser Gln Asp Tyr Tyr Arg
            1970                1975                1980

Lys Arg Val Pro Arg Val Phe Gln Pro Tyr Trp Met Arg Ala Asn Glu
1985                1990                1995                2000

Glu Leu Ala Leu Glu Ile His Asn Ile Thr Met Asp Asn Trp Tyr Gln
            2005                2010                2015

Arg Val Gly Asp Ser Phe Ala Asn Tyr Arg Thr Leu Ile Val Ala Ala
            2020                2025                2030

Ala Gly Leu Val Met Ala Val Gly Ser Ile Phe Gly Met Tyr Lys Phe
            2035                2040                2045

Phe Ser Ile Gly Thr Asn Pro Ala Arg Val Glu Phe Val Pro Ser Gly
            2050                2055                2060

Asp Glu Ile Thr Arg Asn Leu Lys Arg Thr Thr Arg Thr Leu Gln Arg
2065                2070                2075                2080

Thr Arg Thr Glu Arg Pro His Phe Gln Gln Val His Glu His Pro Ser
            2085                2090                2095

Leu Asp Ser Val Val Lys Lys Tyr Val Ala Arg Asn Tyr Ile Thr Ile
            2100                2105                2110

Ser Leu Tyr Lys Pro Ala Gly Arg Val Lys Val Asn Arg Met Trp Tyr
            2115                2120                2125

Leu Trp Asp Ser Gly Phe Ile Thr Glu Ala Leu Cys Ala Val Pro Ile
            2130                2135                2140

Lys Glu Ala Trp Glu Lys Ser Leu Lys Ile Thr Ile Thr Pro Ala Leu
2145                2150                2155                2160

Leu Glu His Glu Glu His Val Tyr Thr Tyr Asp Ala Ala Asp Phe Thr
            2165                2170                2175

Ile Ser Glu Ser Thr Asp Leu Ala Ile Trp Val Leu Ser Pro Ser Phe
            2180                2185                2190

Gly Met Phe Lys Asp Ile Arg Lys Phe Ile Ala Thr Asp Glu Asp Leu
            2195                2200                2205

Ser Lys Pro Ile Thr Thr Glu Gly Ser Leu Leu Leu Ala Pro Thr Asn
            2210                2215                2220

Arg Asn Pro Val Leu Lys Glu Gln Ser Ile Glu Ile Leu Gly Leu Gln
2225                2230                2235                2240

Asn Glu Met Gln Val Ser Glu Leu Asn Gly Thr Val Phe Tyr Ala Ser
            2245                2250                2255

Asp Val Ile Cys Tyr Asp Tyr Ser Gln Gln Gly Ala Cys Gly Ser Leu
            2260                2265                2270

Cys Phe Leu Ser Arg Ser Gln Arg Pro Ile Val Gly Met His Phe Ala
            2275                2280                2285

Gly Arg Gly Glu Gly Ser Cys Gly Glu Gly Tyr Gly Val Ile Leu Thr
            2290                2295                2300

Lys Glu Ala Ile Gly Asp Ile Leu Ala Leu Lys Ser Gln Pro Val Val
2305                2310                2315                2320
```

```
Gln Leu Glu Asp Trp Glu Gly Pro Ser Leu Glu Ala Lys Ile Ile
                    2325                2330                2335

Leu Pro Glu Thr Asn Val Ser Tyr Ile Gly Ala Val Thr Lys Glu Gln
                2340                2345                2350

Thr Pro Tyr Leu His Lys Lys Thr Lys Ile Arg Pro Ser Leu Ile Gln
            2355                2360                2365

Asn Val Gly Asp Leu His Pro Val Ser Glu Pro Cys Ile Leu Asp Lys
        2370                2375                2380

Thr Asp Ser Arg Tyr Gln His Asp Asp Thr Pro Leu Val Ala Gly Cys
2385                2390                2395                2400

Lys Lys His Gly Arg Leu Thr Thr Asp Phe Gly Thr Thr Arg Val Glu
                2405                2410                2415

Ser Ala Lys Glu Ala Leu Trp Asp Gly Trp Leu Ser Lys Met Lys Pro
                2420                2425                2430

Leu Val Val Lys Pro Lys Leu Leu Thr Pro Glu Glu Ala Ala Ser Gly
            2435                2440                2445

Phe Arg Asp Ile Pro Tyr Tyr Asp Pro Met Ile Leu Asn Thr Ser Ala
        2450                2455                2460

Gly Phe Pro Tyr Val Ala Thr Glu Lys Lys Arg Lys Glu Asp Tyr Ile
2465                2470                2475                2480

Val Phe Glu Arg Asn Glu Asn Glu Gln Pro Ile Gly Ala Thr Ile Asp
                2485                2490                2495

Pro Ser Val Leu Glu Glu Met Lys Arg Lys Ser Glu Leu Arg Arg Gln
                2500                2505                2510

Gly Val Gln Pro Ile Thr Pro Phe Ile Asp Thr Leu Lys Asp Glu Arg
            2515                2520                2525

Lys Leu Pro Glu Lys Val Arg Lys Tyr Gly Gly Thr Arg Val Phe Cys
        2530                2535                2540

Asn Pro Pro Ile Asp Tyr Ile Val Ser Met Arg Gln His Tyr Met His
2545                2550                2555                2560

Phe Val Ala Ala Phe Met Glu Gln Arg Phe Lys Leu Met His Ala Val
                2565                2570                2575

Gly Ile Asn Val Gln Ser Thr Glu Trp Thr Leu Leu Ala Ser Lys Leu
            2580                2585                2590

Leu Ala Lys Gly Asn Asn Ile Cys Thr Ile Asp Tyr Ser Asn Phe Gly
        2595                2600                2605

Pro Gly Phe Asn Ala Gln Ile Ala Lys Ala Ala Met Glu Leu Met Val
    2610                2615                2620

Arg Trp Thr Met Glu His Val Glu Gly Val Asn Glu Ile Glu Ala His
2625                2630                2635                2640

Thr Leu Leu His Glu Cys Leu Asn Ser Val His Leu Val Ser Asn Thr
                2645                2650                2655

Leu Tyr Gln Gln Lys Cys Gly Ser Pro Ser Gly Ala Pro Ile Thr Val
            2660                2665                2670

Val Ile Asn Thr Leu Val Asn Ile Leu Tyr Ile Phe Val Ala Trp Glu
        2675                2680                2685

Thr Gln Val Gly Ser Lys Glu Lys Gly Gln Thr Trp Glu Ser Phe Lys
    2690                2695                2700

Gln Asn Ile Glu Leu Phe Cys Tyr Gly Asp Asp Leu Ile Met Ser Val
2705                2710                2715                2720

Thr Asp Lys Tyr Lys Glu Thr Phe Asn Ala Leu Thr Ile Ser Gln Phe
                2725                2730                2735

Leu Ala Gln Tyr Gly Ile Val Ala Thr Asp Ala Asn Lys Gly Glu Glu
```

```
                 2740              2745              2750

Val Glu Ala Tyr Thr Thr Leu Leu Asp Ser Thr Phe Leu Lys His Gly
             2755              2760              2765

Phe Arg Pro His Glu Val Tyr Pro His Leu Trp Gln Ser Ala Leu Ala
         2770              2775              2780

Trp Ser Ser Ile Asn Asp Thr Thr Gln Trp Ile Trp Glu Cys Ala Asp
2785              2790              2795              2800

Leu Arg Leu Ala Thr Arg Glu Asn Cys Arg Ala Ala Leu Tyr Gln Ala
             2805              2810              2815

His Gly His Gly Ser Val Val Tyr Asn Arg Phe Lys Gln Gln Val Asn
             2820              2825              2830

Lys Ala Leu Ile Lys Arg Lys Ile Gln Pro Ile Ala Leu Ser Trp Lys
             2835              2840              2845

Glu Ile Asp Asp Leu Phe Tyr Pro Glu Ile Ser Tyr
             2850              2855              2860

<210> SEQ ID NO 95
<211> LENGTH: 8192
<212> TYPE: DNA
<213> ORGANISM: Unknown
<220> FEATURE:
<223> OTHER INFORMATION: Chinese Sacbrood virus strain BJ 2012

<400> SEQUENCE: 95
atggacatga tttctccttt gttttatgga tatgttagaa gtaccaaccg attccctagg      60
agtggaggaa tcagaagaga tttgtctgct gaatatagtt cacgcgcccg aacctataag    120
accaagttgg aggcgcgtaa ttgcggagtg gagagattat ctacaatcct tacctcttgt    180
aagaagacat tgatacagt ggactcttat accgatttgt ttaatggttg ggtttctggt     240
aagtatgttg acaagaatgt ccactacacc gaagtgtcca gtgatgagag tggacgaaga    300
atctggaatg ttagacgtgc agtgtcaatt aagaccgcag aaggaattat agtatggcga    360
aaagttatta cctcgtacag ttgcagggtg gcttcagaat tagctgctaa gagtatattg    420
gtgcaatttg taggtccagt aaggacccag agtgatgagg taccctcgaa agaatctatt    480 caggggacg ctacacagca aagttccaag gaagaaaata caataattac acgagatcag     540
caacagacag tttcggaaaa gataccatca acagttgggg acttggccat agcatcttct    600
gaaccaacgc aacagtttag gagtttaact aatcgttggt tgcctattaa ttcaattaga    660
gtaacagtaa atagtaaacg gaacgatatt ttggcacaat attatatccc agaagatttt    720
ctgttacatt atgctaagtg tgcgcctaat accataccat ttgagactta tgtgtacgga    780
aaatacgagt tagaattgaa gttcgtagct aatggtaata gtttcagtg tgggaaagtg     840 attatttctg taaaatttga cagttatcaa gctgataata taaatacagg gtttcaagca    900
gccttatcgc gaccgcacgt tatgctagat ttgtcaacta ataacgaagg agttcttaaa    960
ataccattta ggtatcaccg tgcctttgtt aggaatcaaa cgcacaaaac agctacggtg   1020
ggtataagac cagggaagtt tgctagtatt tatgtgcaag tgttgtcacc gttacagacg   1080
ggagagggat gtgcgaacga tacgtttata cgaccttttt atcggtatac acgagctgaa   1140
tttgcgggaa cgtcggataa agtcccattg acccagacgg atgttatagg tactttatta   1200
tctggagggc caacaccagc tcttaaggat attttagtag gtgtagagag aacactggac   1260
cagttgggcc gagtaataa tcaagataaa ccgaaggaca taagtagcat aactataatt    1320
ccgaaacctc gtttgggttc ccctcatggg aaaggtaaga gtgatgcagt agccatgcga   1380
```

-continued

```
gtaaatccgg tggcactaac atcatttcaa gatgtgaacg cttattccga tgagccccgt    1440
actacattgg atatagctcg tatatggggt ttgagaagta cgtttaattg gggatcagga    1500
gatgcacatg gcaaagagtt atttaataca gttttggact caggtgtgag attttatgat    1560
caggactatg aaggacaaat aaccccaatg gaatatgtaa ctggttgta taacttttgg     1620
tcagggccaa tagagttacg ttttgatttt gtttcaaatg cgtttcacac tggaacagtg    1680
attatatcag cggagtataa tcgatcatct actaatacgg atgagtgtca gtcacactca    1740
acttatacta aaacgttcca cttgggagaa caaaaatcag tacatttcac tgtgccttat    1800
atatatgata ctgttatgcg gagaaatacg gctagcgcct atttaccggt aactgattat    1860
gataaggcag ataatgttag tagggcgcag gctacgggga ttagagcaga atctaaaatg    1920
agagtgaaag tgagagtggt taacgtttta aggcctgtag cctctactac ctcaactata    1980
gaagttttgg tgtatatgcg aggaggaaag aactatgcat tgcatggttt aaaacagtca    2040
acgtattggc cgtcaaggag tgtggtaccg atagatagtt ttccacctga tggttatgat    2100
ccagttaagc caacaaatag accaacaagg ggggtgggt cgccagatag caatgggggt     2160
aagggacaat ctacggtagc cgtatcagat aatccacata gattcctgcc cgcgaatgta    2220
tctaatcgtt ggaatgagta ttcgagtgct tatttaccgc gggtacaaat ggatactggt    2280
gataaagaag atgaagatga aactgctaat ttcagtgatg gagttacagc gatgggttc     2340
caatctttgg atacccaggt attgattaag gatattttgc gaagaccagt gttgttgttt    2400
aatcacgtac aattggatcc tggctataca ggttttttta tacctataat gccgccttct    2460
agaatgatgc aatataaatc aggagatagg gaaacatcct ttcagcgatt gattggtcgt    2520
acgccccaag cagcaattat gaatttattt aggttttgga gagggtcatt gcggtatact    2580
attattatac acagtaccga tggtcatcct atatatgtaa cgcacgtacc ccatacggga    2640
aatagagtgt atggtttaat gaaagtaaat aatttacacg agtatacgaa ggttcctatt    2700
tttgggagtg gtttaacaac tgaaatgatt atccctagcg tgaatccgag tatatgtgta    2760
gaagtaccat ttgatactga aaataattgg gctgtgacat ttgaggaaga tgctcagcgg    2820
aattactcat ggagagataa aggggatact gtcaccggac acttggttgt aacacctgta    2880
gtgccagttt atatgtctgt gtgggtagaa gctgaggatg attttgaagt gtctaacttt    2940
tgtgggccac cgactgtaaa gacgaatgat tggaattatg cattttctga tgagcatgcg    3000
cgagttcaga tggatgatag tgtagaaaga gtatacgatg agggaaccca gacgtattac    3060
tatccggccc ctaagccgga gggttttagt ttgaacaatg tacggacttc ggttagtacg    3120
ttgtgtaata tgcttgggaa agtagtaact cccgagcgcg caatgaaaac agcgttgtgc    3180
gcaactccct attttgggtc agcttacatg acagctacta ctctggatgc tataggtagt    3240
atgcagaata ccgttacagg agcagcacat cagctgacgg catcagttga tgcgaggtta    3300
gagcaactgt cagctaagtt tggagattca atagatgtaa tcactacagc ggtgaaggag    3360
gctataggta aaatttcttc tggtatgttt aatatggtta attatactgg ttactgtata    3420
gacgtgattt tggatatatt agttgcttgg attgaccgaa gttggactgc agttggagta    3480
ggaattattc gattcgtgac taaggtcttg gggttgggtg caatttctaa agttatgaat    3540
atggctacaa cttttgggca gcttatagct agggtttatg agcctccacg cccagttgtg    3600
caagcaccac ctcctacgga agctacattg actggagctt tggcaggtat attgggtacg    3660
cttatggggg tttatatatc gccattgtct ggaggaagtt actttaaaaa tttgatgctg    3720
aggatgacta gttcggctgg gccgtcttat ttggtggggg tcttacgttt tgtagaggcg    3780
```

```
actttcaata cggtcaagga tatgatatta aatgctttgg gttatgtttc tccggagaat    3840
gcggctctga aaatgctatc gggaacatcg gctacgatac agaattttat aactgatgct    3900
cagctcatta ctacagaagc taatgcagca ttggtgggac accctagttt ccgtgctaag    3960
tattggaaca cggtaatgca agcatatcaa atacagaagt tattattgac cgttcctcag    4020
tctagtgcct ctccaatttt atctagattg tgtagtgatg tcatacgtaa tagtaatgaa    4080
aaatttattg atatctcttc ttcaccggta cgttatgaac cttttgtaat ttgtattgag    4140
ggtccagcag gtatcggtaa atcagaaata gtggagaccc tagccactgc attattgaaa    4200
ggagtcaatt taaaacgacc acatagtggg gctacgtatt ttcgaatgcc agggtctcgg    4260
ttttggtctg gttatagaga tcaaccagtg gtggtttatg atgattgggc taatttaacg    4320
gaacctcaag ctttaatgca gcaaatctca gaattatatc agctcaaatc aacttctact    4380
tttatcccgg aaatggctca tttagaagaa aagaagatta gaggtaatcc cctcattgtg    4440
atattattat gtaaccacgc ttttccggat agtgcagtta ctaacatgtc tcttgaaccc    4500
agtgcaattt accgtaggag agatgtgtta ttgtatgcag aaagaaaacc agaatatgag    4560
ggggttagtt taagagacat gagtgttaac gagcaaacta cgtttgctca tttgaatttt    4620
tataagtaca aggattctac taatgcatcc tcatgcacat caaaacctgt tggatatgag    4680
ttgactaagg agtggttggt cgcgaagttt gctaaatggc atgcgcagga acaaattaaa    4740
gtacaaagac gtatggagaa tatacgggca ggaatgtacg atgctgaggt gggatctttg    4800
cgtttggaag atccatttag tttatattac tcagtgtcta gtgaagttat tgaaaataat    4860
gaagatgtta cgactgggtt tcttcctagt gaaattttag cattcgaatg taagcgtata    4920
gcaaacgtga tagatgctca tcaatcctcg gtaaggagga ttgtgattcc agatgagcca    4980
agagacccat ttgttactac acagggtgat tttgcggggg tatttatggg agctgctttg    5040
ggtcgtgtgg tactgaaaaa agtgtgtagc ttttcatcgg aactcatcaa ttatgcgatt    5100
gattggataa ttagtaagca taatgtgatc catgagtgtt gtgtgtgtaa agagacgaag    5160
ggtatagcgt ggtactgcct ggattctgcg caacttgccc ctcaatctac gcattatatg    5220
tgcaatggtt gtatggtagc gtcgcgtgca gcaaatcgag aagtggtaca atgcccgatg    5280
tgtaggagtc caaattttga acgatggggc ataccaaca agatgacagg tataactatt    5340
gttgggcgcg cattgatcat gggattgata acagttgata agggagttaa tgtactccgt    5400
cgaatgttgg gaggtaccct tggcgctatg tatgcggcta taatgcgtat agctgctaca    5460
ctccacccct cgatgagtga gagaacacgc gagttgttaa ggatgacagg ggccttggtt    5520
gatatgagtg aatatactgt gcgagaattg caacatgtag taacccagat agatgatcca    5580
tttgagtcag gggatgaaga tgatgatgtt ggtactagta aaatacactg gcgtgatatt    5640
gtaacttttg atttcgagga agatgtggct cgctctctga tgcgagagag ggaaattact    5700 aatatacccct gccttcatat attgttgggg ggagctttac accacgtgtc ttatcgtgac    5760
gggggttata atgtacccaa cgggggaact atggtgagag tgccggagtt gccgtgtaca    5820
tcagattgtt acttttctga tatggaagct tttaagagtt ttgcccagcg gtataaggag    5880
gaaaagaaga ttgaaattca gtcctatttg ttaggtttta tcaataatca gcactctcaa    5940
gactattata ggaaacgggt tccacgtgtt tttcagcctt attggatgag agctaatgaa    6000
gagttagctt tagaaattca taatatcact atggataatt ggtatcagag agtcggtgat    6060
tcgtttgcga attacagaac tttgatagtg cagccgcag gtttagtgat ggcagtggga    6120
```

| | |
|---|---|
| agcatatttg gaatgtataa attcttttct attggtacga atccagcgcg tgtagagttc | 6180 |
| gttcctagtg gggatgaaat cactagaaat ttgaagcgaa caactagaac attgcaaagg | 6240 |
| acccgcacgg agagacctca ttttcaacaa gtacatgaac atccatccct tgattctgtg | 6300 |
| gtgaagaagt atgtggctcg taactatatc accattagtt tgtataagcc ggcaggacgt | 6360 |
| gtgaaagtta accgcatgtg gtatttatgg gacagtggct ttattaccga ggcattatgt | 6420 |
| gccgtgccta ttaaggaggc ctgggaaaag agcttaaaaa taaccataac tccagctctc | 6480 |
| ttggagcatg aggagcatgt ctacacttat gatgcagctg atttcactat atctgagtct | 6540 |
| acggatttgg ctatttgggt cctgtctcca tcatttggaa tgtttaagga tataaggaag | 6600 |
| tttatagcta cagatgagga cctatctaaa ccaattacta cggaagggtc cttattattg | 6660 |
| gccccaacta atcgtaaccc agtgcttaag aacagagta tagagatact gggcctacaa | 6720 |
| aatgaaatgc aagtatctga gttaaatggc acagtattct atgcgagtga tgtaatttgt | 6780 |
| tatgattatt cacaacaggg agcttgtgga tctctgtgct tcttgtcccg ctcccaaaga | 6840 |
| cctattgtgg gaatgcattt tgctggtcga ggtgagggc cctgtggaga aggttatggg | 6900 |
| gttattttaa ctaaagaggc tattggggat attttagcat tgaagtctca acctgtggta | 6960 |
| cagttggaag attgggaagg acccagttta gaagaagcaa aaataatttt gcctgaaaca | 7020 |
| aatgtatctt atattgggc ggtgacaaag gagcagactc cttatctcca caagaaaaca | 7080 |
| aagataagac cgagtcttat tcagaatgtc ggtgaccttc atccagtatc agaaccatgt | 7140 |
| atattggata aaacagattc taggtaccaa catgatgata ctcctttggt agcggggtgt | 7200 |
| aagaaacatg ggaggcttac cacagatttt ggcactacga gagtagaaag cgctaaagaa | 7260 |
| gcccttggg acgggtggct atcgaagatg aaacccttgg tggtaaaacc caagttatta | 7320 |
| acacctgagg aggctgctag tggctttcgt gatataccgt attatgatcc tatgattctc | 7380 |
| aatactagcg cgggtttcc ttatgtagca acggaaaaga agcgtaaaga agattatata | 7440 |
| gtatttgagc gcaatgaaaa tgagcaacct attggggcaa ctatagaccc cagcgttctg | 7500 |
| gaagagatga agcgaaaatc tgaattgaga aggcaagggg tgcagcctat tacaccattt | 7560 |
| atcgatacac ttaaggatga gaggaaatta ccagaaaaag tacgcaagta cggtggaact | 7620 |
| cgagtatttt gtaacccacc tattgattat attgtgtcga tgaggcaaca ctatatgcac | 7680 |
| tttgtggctg catttatgga acagcgtttt aaattaatgc atgctgtggg gattaatgtg | 7740 |
| caaagtacag aatggaccct cttggcttct aagttgcttg ctaaaggaaa taatatttgt | 7800 |
| actattgatt attcaaattt cggtccaggg tttaatgctc aaatagcaaa agctgctatg | 7860 |
| gaattaatgg tgcggtggac tatggagcat gttgagggtg taaatgagat agaagcacac | 7920 |
| accttattac atgagtgttt aaattcggtt cacttagtat ctaatacact gtaccaacag | 7980 |
| aagtgtggat cacctagtgg agcgcccatt accgtagtga taaatacttt agttaatatt | 8040 |
| ttatatattt ttgtagcttg ggagacgcaa gtaggaagta aagaaaaagg gcaaacttgg | 8100 |
| gaatctttca aacaaaatat tgaattgttt tgctacggtg atgatttgat aatgtcagtt | 8160 |
| acagataaat ataaggaaac ttttaatgcg tt | 8192 |

<210> SEQ ID NO 96
<211> LENGTH: 2693
<212> TYPE: DNA
<213> ORGANISM: Artificial Sequence
<220> FEATURE:
<223> OTHER INFORMATION: pDM-18T vector

<400> SEQUENCE: 96

```
tcgcgcgttt cggtgatgac ggtgaaaacc tctgacacat gcagctcccg gagacggtca    60
cagcttgtct gtaagcggat gccgggagca gacaagcccg tcagggcgcg tcagcgggtg   120
ttggcgggtg tcggggctgg cttaactatg cggcatcaga gcagattgta ctgagagtgc   180
accatatgcg gtgtgaaata ccgcacagat gcgtaaggag aaaataccgc atcaggcgcc   240
attcgccatt caggctgcgc aactgttggg aagggcgatc ggtgcgggcc tcttcgctat   300
tacgccagct ggcgaaaggg ggatgtgctg caaggcgatt aagttgggta acgccagggt   360
tttcccagtc acgacgttgt aaaacgacgg ccagtgccaa gaagcatga cggcaagtgg   420 acgattatct ccagaggatc gccgggaacc gaggacgagt tcgtaatcat ggtcatagct   480
gtttcctgtg tgaaattgtt atccgctcac aattccacac aacatacgag ccggaagcat   540
aaagtgtaaa gcctggggtg cctaatgagt gagctaactc acattaattg cgttgcgctc   600
actgcccgct ttccagtcgg gaaacctgtc gtgccagctg cattaatgaa tcggccaacg   660
cgcggggaga ggcggtttgc gtattgggcg ctcttccgct tcctcgctca ctgactcgct   720
gcgctcggtc gttcggctgc ggcgagcggt atcagctcac tcaaaggcgg taatacggtt   780
atccacagaa tcaggggata acgcaggaaa gaacatgtga gcaaaaggcc agcaaaaggc   840
caggaaccgt aaaaaggccg cgttgctggc gttttccat aggctccgcc cccctgacga   900
gcatcacaaa aatcgacgct caagtcagag gtggcgaaac ccgacaggac tataaagata   960
ccaggcgttt ccccctggaa gctccctcgt gcgctctcct gttccgaccc tgccgcttac  1020
cggatacctg tccgcctttc tcccttcggg aagcgtggcg ctttctcata gctcacgctg  1080
taggtatctc agttcggtgt aggtcgttcg ctccaagctg ggctgtgtgc acgaaccccc  1140
cgttcagccc gaccgctgcg ccttatccgg taactatcgt cttgagtcca acccggtaag  1200
acacgactta tcgccactgg cagcagccac tggtaacagg attagcagag cgaggtatgt  1260
aggcggtgct acagagttct tgaagtggtg gcctaactac ggctacacta agaacagt  1320 atttggtatc tgcgctctgc tgaagccagt taccttcgga aaaagagttg gtagctcttg  1380
atccggcaaa caaaccaccg ctggtagcgg tggttttttt gtttgcaagc agcagattac  1440
gcgcagaaaa aaaggatctc aagaagatcc tttgatcttt tctacggggt ctgacgctca  1500
gtggaacgaa aactcacgtt aagggatttt ggtcatgaga ttatcaaaaa ggatcttcac  1560
ctagatcctt ttaaattaaa aatgaagttt aaatcaatc taaagtatat atgagtaaac  1620
ttggtctgac agttaccaat gcttaatcag tgaggcacct atctcagcga tctgtctatt  1680
tcgttcatcc atagttgcct gactccccgt cgtgtagata actacgatac gggagggctt  1740
accatctggc cccagtgctg caatgatacc gcgagaccca cgctcaccgg ctccagattt  1800
atcagcaata aaccagccag ccggaagggc cgagcgcaga agtggtcctg caactttatc  1860
cgcctccatc cagtctatta attgttgccg ggaagctaga gtaagtagtt cgccagttaa  1920 tagtttcgc aacgttgttg ccattgctac aggcatcgtg gtgtcacgct cgtcgtttgg  1980
tatggcttca ttcagctccg gttcccaacg atcaaggcga gttacatgat cccccatgtt  2040
gtgcaaaaaa gcggttagct ccttcggtcc tccgatcgtt gtcagaagta agttggccgc  2100
agtgttatca ctcatggtta tggcagcact gcataattct cttactgtca tgccatccgt  2160
aagatgcttt tctgtgactg gtgagtactc aaccaagtca ttctgagaat agtgtatgcg  2220
gcgaccgagt tgctcttgcc cggcgtcaat acgggataat accgcgccac atagcagaac  2280
tttaaaagtg ctcatcattg gaaaacgttc ttcggggcga aaactctcaa ggatcttacc  2340
```

```
gctgttgaga tccagttcga tgtaacccac tcgtgcaccc aactgatctt cagcatcttt    2400
tactttcacc agcgtttctg ggtgagcaaa aacaggaagg caaaatgccg caaaaagggg    2460
aataagggcg acacggaaat gttgaatact catactcttc cttttttcaat attattgaag   2520 catttatcag ggttattgtc tcatgagcgg atacatattt gaatgtattt agaaaaataa    2580
acaaataggg gttccgcgca catttccccg aaaagtgcca cctgacgtct aagaaaccat    2640
tattatcatg acattaacct ataaaaatag gcgtatcacg aggcccttc gtc            2693

<210> SEQ ID NO 97
<211> LENGTH: 2045
<212> TYPE: DNA
<213> ORGANISM: Solanum lycopersicum
<220> FEATURE:
<221> NAME/KEY: misc_feature
<222> LOCATION: (440)..(440)
<223> OTHER INFORMATION: n is a, c, g, or t

<400> SEQUENCE: 97
gaattccgac aaaaggtggt tggtgaagct gacattggac tccattctgc ttaattgcct      60
aaccccatct cccttcaatc tacctaccat aaccattttc ttcaaaattt tctcaaaaaa     120
acaatttggt cttcaaacaa ctccaagaac acagagagag agtggaaaaa ctgaagtttt     180
tcacaagaaa tggcacagat tagtagcatg gcacaaggga tacagaccct tagtctgaat     240
tcctccaatc tttctaaaac acaaaagggt cctcttgttt caaattctct cttctttgga     300
tcaaagaaac taacccaaat ttcagcaaaa tcattagggg tgtttaagaa agattcagtt     360
ttgagggtgg tgaggaagtc atcttttagg atttctgcat cagtggctac tgcagagaaa     420
ccccatgaga ttgtgctagn acccatcaaa gatatatctg gtactgttaa attacccggt     480
tcgaaatccc tttccaatcg tattctcctt cttgctgccc tttctgaggg aaggactgtt     540
gttgacaatt tactgagtag tgacgacatt cattacatgc ttggtgcgtt gaaaacactt     600
ggacttcatg ttgaagatga caatgaaaac caacgagcaa ttgtggaagg ttgtggtggg     660
cagtttcctg tcggtaaaaa gtctgaggaa gaaatccaac tattccttgg aaatgcagga     720
acagcaatgc gtccgttgac agcagcagtt actgtagctg gaggacattc aagatatgtt     780
cttgatggag ttcctaggat gagagagaga ccaattggtg atttggttga tggtcttaag     840
cagcttggcg cagaggtaga ttgttcccct ggtacgaatt gtcccccagt tcgaattgtc     900
agcaagggag gtcttccagg agggaaggta aagctctctg gatccatcag cagccaatac     960
ctgactgctc tgcttatggc tgctcccctg gctctaggag atgtggagat tgaaataatt    1020
gacaaactga tatctgtgcc ttatgttgaa atgacactga agttgatgga gcgatttggt    1080
gtctttgtgg agcacagtag tggctgggac agattcttgg taaaggagg tcagaagtac     1140 aaatctcctg ggaaagcatt tgttgaagga gatgcctcaa gtgctagcta ttttttggcg    1200
ggggcagcag tcacaggtgg aaccgtcact gttgaaggtt gtggaacaag cagtttacag    1260
ggagatgtta agttcgctga ggtcctcgag aagatggggg cagaagttac atggacagag    1320
aacagtgtca cagttaaagg acctccgagg aactcttctg gaatgaaaca tttgcgtgcc    1380
attgacgtga acatgaacaa aatgccagat gtggccatga ctcttgccgt agttgcactt    1440
tttgctgatg gtcctactac cataagagac gttgctagct ggagagtaaa ggaaactgag    1500
cggatgattg ccatatgcac cgaacttagg aagttgggtg caacagttgt tgaagggtca    1560
gactactgca taatcacccc accagaaaag ttaaacgtaa cggagattga tacatatgat    1620
gaccacagaa tggctatggc tttctctctt gctgcttgtg ctgatgttcc agtcactatt    1680
```

| | |
|---|---:|
| aagaaccctg gctgtactcg caaaaccttc cccgactact tcgaggttct ccagaagtac | 1740 |
| tctaagcact aaaccacttc acatgtagaa ggaattattt tgtactacaa gagaaattat | 1800 |
| gcaccagttt gcaaccaaaa tggtgcccat accggaagag aaaaaagctt tccaactcct | 1860 |
| ttttatatgt ctatgtgaga tcatgttcat tgtatttgtt gaagttgagc ttctttttt | 1920 |
| gtttctcgtg tagaagacat gtatactata tagttaagta cacttccttg aagaatattt | 1980 |
| accattgatt atcaccgttt tagttattgc attttggtat tcaaaataaa tttgtttcca | 2040 |
| ggatt | 2045 |

<210> SEQ ID NO 98
<211> LENGTH: 2116
<212> TYPE: DNA
<213> ORGANISM: Artificial Sequence
<220> FEATURE:
<223> OTHER INFORMATION: Synthetic DNA (Group 3)

<400> SEQUENCE: 98

| | |
|---|---:|
| taactttaag aaggagatat accatgaaac accaccacca ccaccaccac cacggtggtc | 60 |
| tggttccgcg tggttcccat ggcggatccc aagcaaact cgcgctaatc caggaacttc | 120 |
| ccgaccgcat tcaaacggcg gtggaagcag ccatgggaat gagctaccaa gacgcaccga | 180 |
| acaacgtgcg cagggacctc gacaacctgc acgcttgcct aaacaaggca aaactaacgg | 240 |
| taagtcggat ggtaacatca ctgctggaga aacccagcgt ggtggcatac ctagagggaa | 300 |
| aggccggtgg cggttccggg ggagccgagc tcatgaaagc taacctgctg gttctgctgt | 360 |
| gcgctctggc tgctgctgac gctgacacca tctgcatcgg ttaccacgct aacaactcta | 420 |
| ccgacaccgt tgacaccgtt ctggaaaaaa acgttaccgt taccactct gttaacctgc | 480 |
| tggaagactc tcacaacggt aaactgtgcc gtctgaaagg tatcgctccg ctgcagctgg | 540 |
| gtaaatgcaa catcgctggt tggctgctgg gtaacccgga atgcgacccg ctgctgccgg | 600 |
| ttcgttcttg gtcttacatc gttgaaaccc cgaactctga aaacggtatc tgctacccgg | 660 |
| gtgacttcat cgactacgaa gaactgcgtg aacagctgtc ttctgtttct tctttcgaac | 720 |
| gtttcgaaat cttcccgaaa gaatcttctt ggccgaacca caacaccaac ggtgttaccg | 780 |
| ctgcttgctc tcacgaaggt aaatcttctt tctaccgtaa cctgctgtgg ctgaccgaaa | 840 |
| aagaaggttc ttacccgaaa ctgaaaaact cttacgttaa caaaaaaggt aaagaagttc | 900 |
| tggttctgtg gggtatccac caccccgccga actctaaaga acagcagaac ctgtaccaga | 960 |
| acgaaaacgc ttacgtttct gttgttacct ctaactacaa ccgtcgtttc acccccggaaa | 1020 |
| tcgctgaacg tccgaaagtt cgtgaccagg ctggtcgtat gaactactac tggaccctgc | 1080 |
| tgaaaccggg tgacaccatc atcttcgaag ctaacggtaa cctgatcgct ccgatgtacg | 1140 |
| cttttcgctct gtctcgtggt ttcggttctg gtatcatcac ctctaacgct tctatgcacg | 1200 |
| aatgcaacac caaatgccag accccgctgg gtgcatcaa ctcttctctg ccgtaccaga | 1260 |
| acatccaccc ggttaccatc ggtgaatgcc cgaaatacgt tcgttctgct aaactgcgta | 1320 |
| tggttaccgg tctgcgtaac atcccgtcta ccagtctcg tggtctgttc ggtgctatcg | 1380 |
| ctggtttcat cgaaggtggt tggaccggta tgatcgacgg ttggtacggt taccaccacc | 1440 |
| agaacgaaca gggttctggt tacgctgctg accagaaatc tacccagaac gctatcaacg | 1500 |
| gtatcaccaa caaagttaac accgttatcg aaaaaatgaa catccagttc accgctgttg | 1560 |
| gtaaagaatt caacaaactg gaaaaacgta tggaaaacct gaacaaaaaa gttgacgacg | 1620 |

-continued

```
gtttcctgga catctggacc tacaacgctg aactgctggt tctgctggaa aacgaacgta    1680
ccctggactt ccacgactct aacgttaaaa acctgtacga aaaagttaaa tctcagctga    1740
aaaacaacgc taaagaaatc ggtaacggtt gcttcgaatt ctaccacaaa tgcgacaacg    1800
aatgcatgga atctgttcgt aacggtacct acgactaccc gaaatactct gaagaatcta    1860
aactgaaccg tgaaaaagtt gacggtgtta aactggaatc tatgggtatc taccagatcc    1920
tggctatcta ctctaccgtt gcttcttctc tggttctgct ggtttctctg ggtgctatct    1980
ctttctggat gtgctctaac ggttctctgc agtgccgtat ctgcatctaa ggatccgaat    2040
tcgagctccg tcgacaagct tgcggccgca ctcgagcacc accaccacca ccactgagat    2100
ccggctgcta acaaag                                                    2116
```

<210> SEQ ID NO 99
<211> LENGTH: 18
<212> TYPE: DNA
<213> ORGANISM: Artificial Sequence
<220> FEATURE:
<223> OTHER INFORMATION: T7 promoter1 sequence

<400> SEQUENCE: 99

```
taatacgact cactatag                                                    18
```

HETERO-STRUCTURED RIBONUCLEIC ACID AND USE THEREOF

CROSS-REFERENCE TO RELATED APPLICATIONS

This application is a continuation-in-part of International Patent Application No. PCT/KR2020/008623, filed on Jul. 1, 2020, which claims the benefit of Korean Patent Application Nos. 10-2019-0079470, filed on Jul. 2, 2019, 10-2019-0153760, filed on Nov. 26, 2019, and 10-2020-0037711, filed on Mar. 27, 2020, in the Korean Intellectual Property Office, the disclosures of which are incorporated herein in their entirety.

SEQUENCE LISTING

The instant application contains a Sequence Listing which has been filed electronically in txt format and is hereby incorporated by reference in its entirety. Said txt copy, created on Jan. 24, 2022, is named 539624US_012422.txt and is 126 kb in size.

BACKGROUND

1. Field

The present disclosure relates to a hetero-structured ribonucleic acid having two 3'-overhangs and use thereof.

2. Description of the Related Art

Toll-like receptor 3 (TLR3) is a protein that in humans is encoded by the TLR3 gene. TLR3 is a member of the toll-like receptor family of pattern recognition receptors of the innate immune system. TLR 3 is usually expressed on endosomes and detects double-stranded RNA (dsRNA) released from viruses during an invasion or necrotic cells during inflammation. Immune cells such as dendritic cells (DCs), B cells, and macrophages express TLR3. A variety of cancer cells also have been reported to express TLR3. Upon recognizing the dsRNA, TLR 3 stimulates the secretion of type I interferons and proinflammatory cytokines and activates DCs into mature antigen-presenting cells (APCs). The activation of DC by a TLR3 initiates an innate immune response and contributes to an adaptive immune response.

Polyinosinic: polycytidylic acid (referred to as "PolyIC") is a dsRNA mimetics. PolyIC interacts with TLR3 on the endosomal membrane of B-cells, macrophages, and dendritic cells. PolyIC is structurally similar to dsRNA, present in some viruses, and is an "artificial" stimulant of TLR3. PolyIC may be considered a synthetic analog of dsRNA analog and is a standard tool for scientific research on the immune system. PolyIC is a mismatched double-stranded RNA, with one strand being a polymer of inosinic acid, the other a polymer of cytidylic acid.

PolyIC interaction with TLR3 leads to activate DCs. The significant disadvantages of PolyIC include high heterogeneity in length, thus less favorable pharmacokinetics, and increased toxicity. These weaknesses may have arisen during the manufacturing process.

Optimization of physicochemical properties of PolyIC has led to the generation of derivatives that have increased stability in body fluids such as PolyIC-L-lysine (PolyIC-L) or PolyIC-L-lysine-methylcellulose (PolyIC-LC), or reduced toxicity through reduced stability in body fluids such as Poly IC2U. Poly IC12U comprises Poly(I) and Poly(C) in which U is added to every 12 C. These PolyIC still has undefined chemical properties and very poor homogeneity, with subsequent unpredictable pharmacokinetics.

Thus, there is a need to develop a double-stranded RNA with more defined chemical properties and homogeneity with high immune-stimulating activity and the use thereof.

SUMMARY

Provided is a hetero-structured RNA comprising heteropolymeric double-stranded RNA region having a first strand and a second strand and two single-stranded RNA regions, wherein the ssRNA regions are positioned at 3'-end of the first strand and 3'-end of the second strand.

Also provided is a method of producing the hsRNA comprising providing a template DNA molecule including a double-stranded DNA region and two RNA polymerase promoter sequences, wherein a first RNA polymerase promoter sequence is positioned at one end of the DNA region and a second RNA polymerase promoter sequence is positioned at the other end of the DNA region and the two promoters are oriented in opposing direction so that transcription from the first promoter proceeds toward the second promoter and transcription from the second promoter proceeds toward the first promoter; and incubating the template DNA molecule with RNA polymerase to produce the hsRNA, wherein the hsRNA comprises a heteropolymeric double-stranded RNA region having a first strand and a second strand and two single-stranded RNA regions, wherein the ssRNA regions are positioned at 3'-end of the first strand and 3'-end of the second strand.

Also provided is a pharmaceutical composition comprising the hsRNA.

Also provided is a method of treating a disease or disorder comprising administering to a subject in need of such treatment a therapeutically effective amount of the hsRNA.

Also provided is a method of enhancing an immune response to an antigen in a subject comprising administering to a subject in need of such treatment a therapeutically effective amount of the hsRNA.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
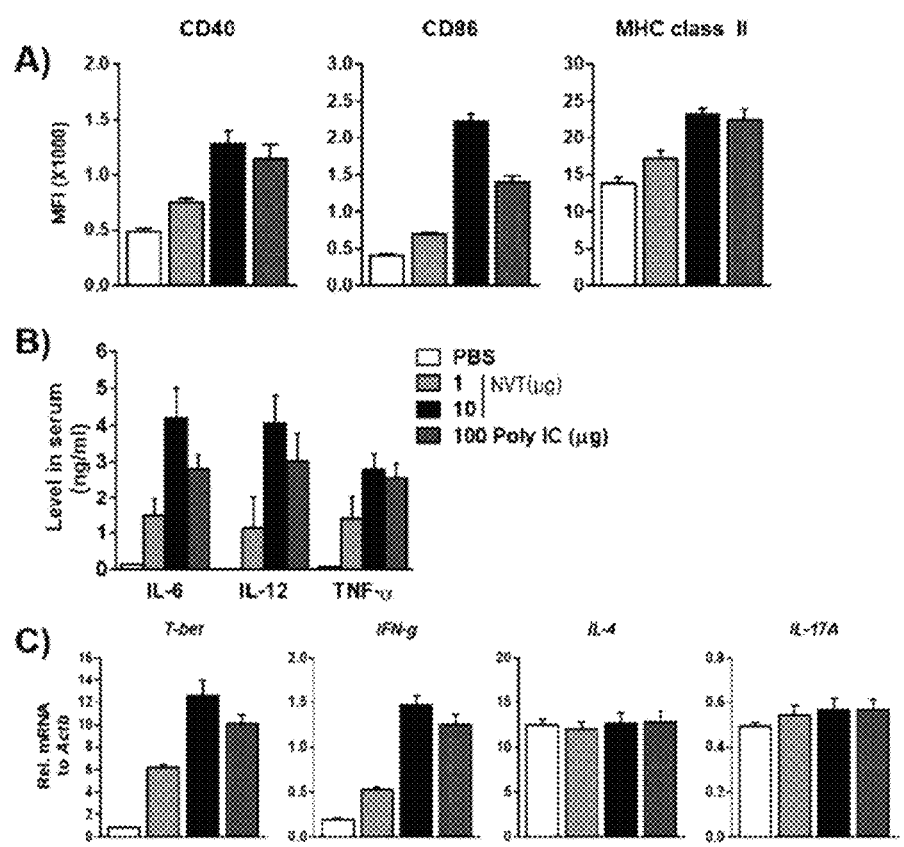
FIG. 1 shows an in vivo screening result of an RNA-based adjuvant for activating DCs.

Hereinafter, embodiments and examples of the present application will be described in detail regarding the accompanying figures so that one of ordinary skill in the art to which the present invention pertains can easily practice. However, the present application may be implemented in various forms and is not limited to the embodiments and examples described herein.

Throughout the present specification, when a particular part "includes" a specific component, it means that the part can further comprise other components, rather than excluding other components unless otherwise stated.

The term "overhang" as used herein, refers to terminal non-base pairing nucleotide(s) resulting from one strand or region extending beyond the terminus of the complementary strand to which the first strand or region forms a duplex. The single-stranded region extending beyond the 3'-end of the duplex is referred to as a 3'-overhang.

According to an aspect of the present invention, a heterostructured RNA (hsRNA) includes heteropolymeric double-stranded RNA (dsRNA) region having a first strand and a second strand and single-stranded RNA (ssRNA) regions, wherein the ssRNA regions are positioned at 3'-end of the first strand and 3'-end of the second strand. The hsRNA may be a set of the hsRNA comprising a plurality of the hsRNA molecules.

The hsRNA may act as a TLR3 ligand. The hsRNA may have 140 to 1682 nt, 200 to 1500 nt, 300 to 1000 nt, 400 to 900 nt, or 600 to 900 nt in length. The dsRNA region may act as a TLR 3 ligand. The dsRNA may have 106 to 1648 nt, 200 to 1500 nt, 300 to 1000 nt, 400 to 900 nt, or 600 to 900 nt in length.

The ssRNA region may have 1 to 100 nt, 1 to 90 nt, 1 to 80 nt, 1 to 70 nt, 1 to 60 nt, 1 to 50 nt, 1 to 40 nt, 1 to 30 nt, 1 to 20 nt, 1 to 20 nt, 1 to 15 nt, 1 to 10 nt, 1 to 8 nt, 1 to 6 nt, 2 to 100 nt, 2 to 90 nt, 2 to 80 nt, 2 to 70 nt, 2 to 60 nt, 2 to 50 nt, 2 to 40 nt, 2 to 30 nt, 2 to 20 nt, 2 to 10 nt, 2 to 8 nt, 2 to 6 nt, 3 to 100 nt, 3 to 90 nt, 3 to 80 nt, 3 to 70 nt, 3 to 60 nt, 3 to 50 nt, 3 to 40 nt, 3 to 30 nt, 3 to 20 nt, 3 to 10 nt, 3 to 8 nt, 3 to 6 nt, 15 to 80 nt, or 17 to 75 nt in length. For example, the ssRNA region may have 1 nt, 2 nt, 3 nt, 4 nt, 5 nt, 6 nt, 7 nt, 8 nt, 9 nt, or 10 nt in length.

Further, the hsRNA may not be a homo-polyribonucleotide. The hsRNA may not be a PolyIC, PolyIC-L-lysine, PolyIC-L-lysine-methylcellulose, poly (I:C12U), or combination thereof. The ssRNA regions may not or substantially not be complementary to each other.

In the hsRNA, the first strand may have a completely complementary nucleotide sequence with that of the second strand. The first strand may have completely complementary ribonucleotides without a gap with that of the second strand. The dsRNA region may not have a secondary structure such as stem-and-loop structure. The dsRNA region may not have a nick.

The hsRNA or dsRNA region is not designed to have RNAi or antisense inhibition activity. The hsRNA may comprise two strands of ssRNA, and each strand of the ssRNA may be a separate molecule.

The dsRNA region may have no more than 5%, 10%, 15%, 20%, 25%, 30%, 35%, or 40% sequence identity with a naturally-existing human gene. The hsRNA or dsRNA region may not encode a protein.

The dsRNA region may be derived from non-human organisms. The non-human organism may be a virus, prokaryotic cell, or eukaryotic cell. The prokaryotic cell may include bacterial cells. The dsRNA region may be derived from an artificial sequence, a vector sequence, a viral sequence, or a plant genome. The artificial sequence may consist of any partial sequences. The vector sequence may be the pDM-18T. The viral sequence may be a nucleotide sequence encoding Sacbrood virus VP1. The artificial sequence may be an arbitarily synthesized sequence. The plant genome may be a nucleotide sequence encoding tomato EPSP-1 protein. The eukaryotic cell may be a fungal cell such as yeast, plant cell, and animal cell. The hsRNA or dsRNA region may be an artificially synthesized or recombinant dsRNA. The hsRNA may be a dsRNA having two 3'-overhangs. The hsRNA may be an isolated dsRNA, which is not present in nature.

In the hsRNA, the ssRNA may be formed by contacting a pre-hsRNA with an endoribonuclease. The endoribonuclease may be an enzyme specifically cleaving the ssRNA region. The endoribonuclease may not be an enzyme cleaving dsRNA region. The endoribonuclease may be an enzyme specifically cleaving ssRNA region and does not or substantially not cleave dsRNA region. The ssRNA region may be formed by cleaving the ssRNA region with a longer length with endoribonuclease and has reduced length. The ssRNA region may be residual sequence after cleavage with the endoribonuclease. The endoribonuclease may be RNase 1. The RNase 1 is an endoribonuclease that specifically cleaves single-stranded RNA at G residues. It may cleave the phosphodiester bond between the 3'-guanylic residue and the 5'-OH residue of adjacent nucleotides. The reaction products may be 3'-GMP and oligonucleotides with a terminal 3'-GMP.

The ssRNA region may have UAUAG sequence at the 3'-end of each ssRNA region.

The hsRNA may be obtained by contacting a pre-hsRNA having two 3'-overhangs with endoribonuclease to reduce the length of the ssRNA region. The two ssRNA regions may have identical lengths.

The hsRNA may independently have triphosphate, diphosphate, or monophosphate at its 5'-end. For example, the hsRNA may have a triphosphate at its both 5'-ends. The hsRNA may independently have a hydroxyl group at its 3'-end. For example, the hsRNA may have hydroxyl groups at both 3'-ends. The first strand and the second strand are disposed on separate RNA molecules.

The hsRNA may further include a nucleotide sequence acting as a TLR7-like ligand or a TLR8-like ligand. The hsRNA may serve as a TLR7-like ligand or a TLR8-like ligand. The nucleotide sequence may be linked to the promoter sequence and positioned to form the nucleotide sequence-promoter-dsRNA region-promoter-the nucleotide sequence.

The hsRNA may be a double-stranded RNA comprising the following nucleotide sequence set, wherein one nucleotide sequence of the set base pairs with the other nucleotide sequence of the set to form a double-stranded RNA with two 3'-overhangs: SEQ ID NOs: 1 and 32, SEQ ID NOs: 2 and 33, SEQ ID NOs: 3 and 34, SEQ ID NOs: 4 and 35, SEQ ID NOs: 5 and 36, SEQ ID NOs: 6 and 37, SEQ ID NOs: 7 and 38, SEQ ID NOs: 8 and 39, SEQ ID NOs: 9 and 40, SEQ ID NOs: 10 and 41, SEQ ID NOs: 11 and 42, SEQ ID NOs: 12 and 43, SEQ ID NOs: 13 and 44, SEQ ID NOs: 14 and 45, SEQ ID NOs: 15 and 46, SEQ ID NOs: 16 and 47, SEQ ID NOs: 17 and 48, SEQ ID NOs: 18 and 49, SEQ ID NOs: 19 and 50, SEQ ID NOs: 20 and 51, SEQ ID NOs: 21 and 52, SEQ ID NOs: 22 and 53, SEQ ID NOs: 23 and 54, SEQ ID NOs: 24 and 55, SEQ ID NOs: 25 and 56, SEQ ID NOs: 26 and 57, SEQ ID NOs: 27 and 58, SEQ ID NOs: 28 and 59, SEQ ID NOs: 29 and 60, SEQ ID NOs: 30 and 61, or SEQ ID NOs: 31 and 62.

The hsRNA may be a double-stranded RNA obtained by contacting a dsRNA with two 3'-overhangs with endoribonuclease to cleave the dsRNA with two 3'-overhangs and thus reduce the length of the 3'-overhang. The endoribonuclease may be RNase T1.

The hsRNA may be a double-stranded RNA comprising the following nucleotide sequence set, wherein one nucleotide sequence of the set base pairs with the other nucleotide sequence of the set to form a double-stranded RNA with two 3'-overhangs: the nucleotide sequence of SEQ ID NO: 1 from nucleotide position 1 to 111 and the nucleotide sequence of SEQ ID NO: 32 from nucleotide position 1 to 111, the nucleotide sequence of SEQ ID NO: 2 from nucleotide position 1 to 161 and the nucleotide sequence of SEQ ID NO: 33 from nucleotide position 1 to 161, the nucleotide sequence of SEQ ID NO: 3 from nucleotide position 1 to 211 and the nucleotide sequence of SEQ ID NO: 34 from nucleotide position 1 to 211, the nucleotide sequence of SEQ ID NO: 4 from nucleotide position 1 to 311 and the nucleotide sequence of SEQ ID NO: 35 from nucleotide position 1 to 311, the nucleotide sequence of SEQ ID NO: 5 from nucleotide position 1 to 411 and the nucleotide sequence of SEQ ID NO: 36 from nucleotide position 1 to 411, the nucleotide sequence of SEQ ID NO: 6 from nucleotide position 1 to 511 and the nucleotide sequence of SEQ ID NO: 37 from nucleotide position 1 to 511, the nucleotide sequence of SEQ ID NO: 7 from nucleotide position 1 to 611 and the nucleotide sequence of SEQ ID NO: 38 from nucleotide position 1 to 611, the nucleotide sequence of SEQ ID NO: 8 from nucleotide position 1 to 711 and the nucleotide sequence of SEQ ID NO: 39 from nucleotide position 1 to 711, the nucleotide sequence of SEQ ID NO: 9 from nucleotide position 1 to 811 and the nucleotide sequence of SEQ ID NO: 40 from nucleotide position 1 to 811, the nucleotide sequence of SEQ ID NO: 10 from nucleotide position 1 to 111 and the nucleotide sequence of SEQ ID NO: 41 from nucleotide position 1 to 111, the nucleotide sequence of SEQ ID NO: 11 from nucleotide position 1 to 161 and the nucleotide sequence of SEQ ID NO: 42 from nucleotide position 1 to 161, the nucleotide sequence of SEQ ID NO: 12 from nucleotide position 1 to 211 and the nucleotide sequence of SEQ ID NO: 43 from nucleotide position 1 to 211, the nucleotide sequence of SEQ ID NO: 13 from nucleotide position 1 to 311 and the nucleotide sequence of SEQ ID NO: 44 from nucleotide position 1 to 311, the nucleotide sequence of SEQ ID NO: 14 from nucleotide position 1 to 411 and the nucleotide sequence of SEQ ID NO: 45 from nucleotide position 1 to 411, the nucleotide sequence of SEQ ID NO: 15 from nucleotide position 1 to 511 and the nucleotide sequence of SEQ ID NO: 46 from nucleotide position 1 to 511, the nucleotide sequence of SEQ ID NO: 16 from nucleotide position 1 to 611 and the nucleotide sequence of SEQ ID NO: 47 from nucleotide position 1 to 611, the nucleotide sequence of SEQ ID NO: 17 from nucleotide position 1 to 711 and the nucleotide sequence of SEQ ID NO: 48 from nucleotide position 1 to 711, the nucleotide sequence of SEQ ID NO: 18 from nucleotide position 1 to 811 and the nucleotide sequence of SEQ ID NO: 49 from nucleotide position 1 to 811, the nucleotide sequence of SEQ ID NO: 19 from nucleotide position 1 to 324 and the nucleotide sequence of SEQ ID NO: 50 from nucleotide position 1 to 324, the nucleotide sequence of SEQ ID NO: 20 from nucleotide position 1 to 402 and the nucleotide sequence of SEQ ID NO: 51 from nucleotide position 1 to 402, the nucleotide sequence of SEQ ID NO: 21 from nucleotide position 1 to 471 and the nucleotide sequence of SEQ ID NO: 52 from nucleotide position 1 to 471, the nucleotide sequence of SEQ ID NO: 22 from nucleotide position 1 to 593 and the nucleotide sequence of SEQ ID NO: 53 from nucleotide position 1 to 593, the nucleotide sequence of SEQ ID NO: 23 from nucleotide position 1 to 669 and the nucleotide sequence of SEQ ID NO: 54 from nucleotide position 1 to 669, the nucleotide sequence of SEQ ID NO: 24 from nucleotide position 24 to 738 and the nucleotide sequence of SEQ ID NO: 55 from nucleotide position 1 to 738, the nucleotide sequence of SEQ ID NO: 25 from nucleotide position 1 to 827 and the nucleotide sequence of SEQ ID NO: 56 from nucleotide position 1 to 827, the nucleotide sequence of SEQ ID NO: 26 from nucleotide position 1 to 890 and the nucleotide sequence of SEQ ID NO: 57 from nucleotide position 1 to 890, the nucleotide sequence of SEQ ID NO: 27 from nucleotide position 1 to 1037 and the nucleotide sequence of SEQ ID NO: 58 from nucleotide position 1 to 1037, the nucleotide sequence of SEQ ID NO: 28 from nucleotide position 1 to 1158 and the nucleotide sequence of SEQ ID NO: 59 from nucleotide position 1 to 1158, the nucleotide sequence of SEQ ID NO: 29 from nucleotide position 1 to 1653 and the nucleotide sequence of SEQ ID NO: 60 from nucleotide position 1 to 1653, the nucleotide sequence of SEQ ID NO: 30 from nucleotide position 1 to 429 and the nucleotide sequence of SEQ ID NO: 61 from nucleotide position 1 to 429, or the nucleotide sequence of SEQ ID NO: 31 from nucleotide position 1 to 429 and the nucleotide sequence of SEQ ID NO: 62 from nucleotide position 1 to 429.

The hsRNAs may be homogenous in length and structure. The hsRNA may be stable at room temperature.

According to another aspect of the present invention, a method of producing a hsRNA comprising providing a template DNA molecule including a double-stranded DNA region and two RNA polymerase promoter sequences, wherein a first RNA polymerase promoter sequence is positioned at one end of the DNA region and a second RNA polymerase promoter sequence is positioned at the other end of the DNA region and the two promoters are oriented in opposing direction so that transcription from the first promoter proceeds toward the second promoter and transcription from the second promoter proceeds toward the first promoter; and incubating the template DNA molecule with RNA polymerase to produce the hsRNA, wherein the hsRNA comprises a heteropolymeric double-stranded RNA region having a first strand and a second strand and single-stranded RNA regions, wherein the ssRNA regions are positioned at 3'-end of the first strand and 3'-end of the second strand.

Regarding the hsRNA, it is the same as described above.

In the step of providing, the double-stranded DNA region may have 106 to 1648 nt, 200 to 1500 nt, 300 to 1000 nt, 400 to 900 nt, or 600 to 900 nt in length. The template DNA molecule may have 140 to 1682 nt, 200 to 1500 nt, more 300 to 1000 nt, 400 to 900 nt, or 600 to 900 nt in length. The template DNA molecule may further comprise an additional sequence linked to the promoter. The additional sequence may be a ligand sequence such as TLR7 ligand-like sequence or TLR8 ligand-like sequence.

The template DNA molecule may be produced by a known method. The template DNA molecule may be produced by a nucleic acid amplification method such as PCR, by using a recombinant cell or artificial synthesis. The template DNA molecule may be produced by culturing a host cell comprising the template DNA molecules. The method may include introducing the template DNA molecule into a host cell, culturing the host cell in a medium, and isolating the template DNA molecule from the culture. The host cell may be a bacterial cell such as E. coli. The template DNA molecule may be introduced into the host cell in itself or via a vector such as a plasmid or viral vector. The template DNA molecule may be a double-stranded DNA with blunt ends and having double-stranded promoter sequences at both ends.

The first RNA polymerase promoter sequence may have an identical sequence with that of the second RNA polymerase promoter sequence. The RNA polymerase promoter may include a restriction site for endoribonuclease. The RNA polymerase may be an RNA polymerase of a bacteriophage. The RNA polymerase promoter may be T7 promoter, T3 promoter, SP6 promoter, K11 promoter, or B14 promoter. The promoter sequence may be a double-stranded RNA sequence. The promoter sequence may be a promoter recognized by single species of RNA polymerase.

In the step of transcription, single species of RNA polymerase may be used in the reaction. The reaction may be conducted in suitable conditions to allow the transcription reaction to proceed. The transcription may be in vitro transcription (IVT) or in vivo transcription. The in vitro transcription may be conducted by transforming an appropriate IVT template DNA into an E. coli cell expressing appropriate polymerases.

For in vitro transcription, the incubating may be performed in vitro. The incubation may result in vitro transcription of the template DNA molecule. The transcription may proceed bidirectionally from each of the two promoters, yielding two RNA strands, i.e., upper and lower strands, which are almost complementary to each other except a short stretch of non-complementary nucleotides at 3' ends. The two RNA strands may spontaneously simultaneously associate by base-pairing to form a double-stranded RNA with two 3'-overhangs during the in vitro transcription.

The template DNA molecule may not include a transcription termination sequence. The template DNA for PCR may be cut to be able to get linear template DNA. The transcription termination may be a run-off termination.

The method may further include incubation of the IVT product to DNase so as to cleave the residual template DNAs.

The method may further comprise incubating the IVT product with endoribonuclease to cleave a single-stranded RNA region. The endoribonuclease may be endoribonuclease specifically cleaves single-stranded RNA, but not substantially a double-stranded RNA. The endoribonuclease may be RNase T1.

The method may further comprise isolating the hsRNA from the reaction product. The isolated hsRNAs may be homogenous in length and may have defined physicochemical properties. The isolated hsRNAs may have an identical length of 3'-overhangs. The length of 3'-overhangs may be 1 to 10 nt, 2 to 8 nt, 3 to 7 nt, 2 to 6 nt, or 5 nt. The 3'-overhangs may have UAUAG sequences at their 3'-ends. The isolated hsRNAs may not have nicks. The isolated hsRNAs may have ligand sequences linked to the 3'-end of the promoter sequence. The ligand sequence may be TLR7 or TLR8-like ligand. TLR7 or TLR8-like ligand may include G or U nucleotide such as GUU repeat.

In an embodiment, template DNA molecules capable of directing transcription to a target RNA may be flanked by a T7 promoter at both 5' ends and be inserted into a vector. If necessary, an additional nucleic acid sequence such as a TLR7 or TLR8 ligand sequence may be added to the 5' end of the T7 promoter sequence. The template DNA molecules may be amplified by a method such as PCR to obtain template DNA molecules for transcription. Bidirectional in vitro transcription may generate two strands of heteropolymeric single-stranded RNAs with perfect complementarity regions at almost the same molar ratio during the transcription. The two stands may spontaneously form hsRNA at room temperature. Thus, hsRNAs with high homogeneity and defined structure may be obtained. The hsRNA may or may not encode a protein.

According to another aspect of the invention, a pharmaceutical composition comprising the hsRNA is provided.

The pharmaceutical composition may include a pharmaceutically acceptable carrier, excipient, or stabilizer.

The term "pharmaceutically acceptable" used herein refers that the respective material does not show any biological or otherwise undesirable effects when administered to an individual and does not interact in a deleterious manner with any of the other components of the pharmaceutical composition (such as e.g. the pharmaceutically active ingredient) in which it is contained.

The pharmaceutical composition may be formulated for parenteral administration, such as intravenous, intramuscular, subcutaneous injection or intravenous infusion may, for example, be sterile solutions, suspensions, dispersions, emulsions, or powders which comprise the active ingredient and which are suitable, optionally after a further dissolution or dilution step, for infusion or injection.

Suitable carriers or diluents may include sterile water and pharmaceutically acceptable aqueous buffers and solutions such as physiological phosphate-buffered saline, Ringer's solutions, dextrose solution, and Hank's solution; water oils; glycerol; ethanol; glycols such as propylene glycol, as well as mineral oils, animal oils and vegetable oils, for example, peanut oil, soybean oil, as well as suitable mixtures thereof.

The hsRNA is described as above.

The pharmaceutical composition may be for preventing or treating an infection, cancer, or cancer-related diseases.

The infection may be a viral or bacterial infection. The viral infection may be an infection with an influenza virus, human parainfluenza virus, coronavirus, betacoronavirus, respiratory syncytial virus, measles virus, human metapneumovirus, enteroviruses, rhinoviruses, polioviruses, coxsackieviruses, or echoviruses. The betacoronavirus may include MERS-CoV, SARS-CoV, SARS-CoV-2, HCoV-OC43, HCoV-229E, HCoV-NL63, HCoV-NL, HCoV-NH, HCoV-HKU1, or a combination thereof. SARS-CoV-2 is also called COVID-19. The influenza virus may include influenza viruses A, B, C, and D. The bacteria may include gram-negative and gram-positive bacteria. The bacteria may be of the following genus: Streptococcus, Escherichia, Staphylococcus, Klebsiella, Pseudomonas, or Neisseria. The bacteria may be E. coli, S. aureus, P. aeruginosa, S. pneumonia, K. pneumonia, or N. meningitides. The N. meningitidis may be of serotype A, B, C, W, Y, X, or a combination thereof. The serotype B also refers to Meningococcus Serogroup B (MenB). The serotype W may be serotype W-135.

Cancer may include a solid tumor or blood cancer. Cancer may include squamous cell carcinoma, myeloma, skin cancer, lung cancer, small cell lung cancer, non-small cell lung cancer, colorectal cancer, glioma, Hodgkin's lymphoma, non-Hodgkin's lymphoma, acute myeloid leukemia (AML), multiple myeloma, gastrointestinal cancer, kidney cancer, ovarian cancer, liver cancer, lymphoblastic leukemia, lymphocytic leukemia, colorectum cancer, endometrial cancer, kidney cancer, prostate cancer, thyroid cancer, melanoma, chondrosarcoma, neuroblastoma, pancreatic cancer, glioblastoma multiforme, cervical cancer, brain cancer, stomach cancer, bladder cancer, hepatocellular cancer, breast cancer, colon carcinoma, head and neck cancer, pancreas cancer, a combination thereof, or metastatic cancer thereof.

The pharmaceutical composition may be for providing an immune response to an antigen, alone or in combination with an antigen. Thus, the pharmaceutical composition may be an adjuvant composition. The pharmaceutical composition may be for providing an enhanced immune response to an antigen.

The pharmaceutical composition may further include an antigen or therapeutic agent, or adjuvant.

The antigen may be a known antigen. The antigen may be a protein of a pathogen, a recombinant protein, a subunit, a glycoprotein, a peptide, a polysaccharide, a lipopolysaccharide, a polynucleotide, an inactivated or live-attenuated organism, or a combination thereof. The antigen may be a viral antigen, bacterial antigen, or tumor-associated antigen, including an inactivated cancer cell. The antigen may include a live attenuated microorganism that causes known disease, an antigen that is an inactivated or killed microorganism that causes known diseases, an antigen that is an inactivated toxin that is produced by a microorganism that causes known diseases, or an antigen that is a subunit or a conjugate of a subunit of a microorganism that causes known diseases.

The therapeutic agent may be suitably selected in consideration of the disease and the conditions of the subject to be treated. The therapeutic agent may be an anti-cancer drug or immune stimulant. The therapeutic agent may be an immune checkpoint inhibitor. The immune checkpoint inhibitor may be a PD-1 antibody, PDL1 antibody, CTLA4 antibody, OX40 antibody, or a combination thereof.

The immune checkpoint inhibitor may be an agonist antibody. The OX40 antibody may be an OX40 agonist antibody, and the PD-1 antibody may be a PD-1 antagonist antibody. The OX40 antibody may be a monoclonal antibody or an antigen-binding fragment thereof, specifically binding to OX40. The PD-1 antibody may be a monoclonal antibody or an antigen-binding fragment thereof, specifically binding to PD-1. The OX40 antibody or PD-1 antibody may be human, a humanized antibody, a chimeric antibody, or a mouse antibody and may comprise a human constant region. The human constant region may be IgG1, IgG2, IgG3, or IgG4 constant region. The human constant region may be IgG1 or IgG4 constant region. In one embodiment, the antigen-binding fragment may be Fab, Fab'-SH, F(ab')2, scFv, or Fv fragment. Examples of anti-human PD-I monoclonal antibodies that may be used as the PD-I antagonist antibody include pembrolizumab, nivolumab, avelumab, and pidilizumab.

The adjuvant may be an oil-in-water emulsion adjuvant, aluminum salt, Freund adjuvant, 1,2-dioleoyl-3-trimethylammonium-propane (DOTAP), or a combination thereof. The oil-in-water emulsion adjuvant may be a squalene oil-in-water emulsion.

The pharmaceutical composition may be formulated as an oral or injectable solution. The pharmaceutical composition may be formulated in an oil-in-water emulsion. The pharmaceutical composition may be administered by intravenous injection, intratumoral injection, subcutaneous injection, intraperitoneal injection, intracranial injection, intrathecal injection, intrastriatal injection, intranasal injection, or intracerebroventricular injection.

The pharmaceutical composition may include the hsRNA in the amount of about 5 ug to 150 mg/single dose. The pharmaceutical composition may be aqueous solutions or suspensions. The pharmaceutical composition may be buffered nucleic acid solutions, such as solutions including the hsRNA in a suitable concentration for example, from 0.001 to 400 mg/ml, from 0.005 to 200 mg/ml, 0.01 to 200 mg/ml, 1.0-100 mg/ml, 1.0 mg/ml or 100 mg/ml and an aqueous buffer such as: phosphate-buffered saline.

The strongly negatively charged RNA such as the hsRNA might effectively receive many large antigens to make a nanocomplex comparable to a virus-like particle (VLP). The nanocomplex encapsulating the antigen in an appropriate formulation may be captured by dendritic cells or macrophages, resulting in an effective presentation of antigens to B cells and T cells.

According to another aspect of the invention, a method of treating a disease or disorder comprising administering to a subject in need of such treatment a therapeutically effective amount of the hsRNA is provided.

According to another aspect of the invention, a method of enhancing an immune response to an antigen in a subject comprising administering to a subject in need of such treatment a therapeutically effective amount of the hsRNA is provided.

The shRNA is described as above. The administering may include administering via oral or parenteral route. The parenteral route may include intravenous, intracranial, intrathecal, intrastriatal, intracerebroventricular, intranasal, intra-tumoral, intramuscular, intraperitoneal, or mucosal route.

The term "therapeutically effective amount" used herein may refer to an amount sufficient to enhance the immune response in the subject. The "therapeutically effective amount" may be 150 ug to 150 mg/kg body weight/day.

The disease or disorder may include infection, cancer, or cancer-related diseases. The infection may be a viral or bacterial infection. The viral infection may influenza virus, human parainfluenza virus, coronavirus, betacoronavirus, respiratory syncytial virus, measles virus, human metapneumovirus, enteroviruses, rhinoviruses, polioviruses, coxsackieviruses, or echoviruses. The betacoronavirus may include MERS-CoV, SARS-CoV, SARS-CoV-2, HCoV-OC43, HCoV-229E, HCoV-NL63, HCoV-NL, HCoV-NH, HCoV-HKU1, or a combination thereof. SARS-CoV-2 is also called COVID-19. The influenza virus may include influenza viruses A, B, C, and D.

The bacteria may include gram-negative and gram-positive bacteria. The bacteria may be of the following genus: *Streptococcus, Escherichia, Staphylococcus, Klebsiella, Pseudomonas*, or *Neisseria*. The bacteria may be *E. coli, S. aureus, P. aeruginosa, S. pneumonia, K. pneumonia*, or *N. meningitides*. The *N. meningitidis* may be of serotype A, B, C, W, Y, X, or a combination thereof. The serotype B also refers to Meningococcus Serogroup B (MenB). The serotype W may be serotype W-135.

Cancer may include squamous cell carcinoma, myeloma, skin cancer, lung cancer, small cell lung cancer, non-small cell lung cancer, colorectal cancer, glioma, Hodgkin's lymphoma, non-Hodgkin's lymphoma, acute myeloid leukemia (AML), multiple myeloma, gastrointestinal cancer, kidney cancer, ovarian cancer, liver cancer, lymphoblastic leukemia, lymphocytic leukemia, colorectum cancer, endometrial cancer, kidney cancer, prostate cancer, thyroid cancer, melanoma, chondrosarcoma, neuroblastoma, pancreatic cancer, glioblastoma multiforme, cervical cancer, brain cancer, stomach cancer, bladder cancer, hepatocellular cancer, breast cancer, colon carcinoma, head and neck cancer, pancreas cancer or metastatic cancer thereof.

The immune response may include increased expression of a stimulatory cofactor such as CD40, and CD86 and MHCII in cells such as CD11c+ DC cells, inducing secretion of IL-6, IL-12, TNF-α, inducing T-bet, and interferon-γ, increasing Th1 cell and Th2 cell response including inducing the production of IgG2a specific to an antigen and IgG1 specific to an antigen.

The method may further comprise administering an antigen or therapeutic agent to the subject.

The antigen may be a known antigen. The antigen may be a protein of a pathogen, a recombinant protein, a subunit, a glycoprotein, a peptide, a polysaccharide, a lipopolysaccharide, a polynucleotide, an inactivated or live-attenuated organism, or a combination thereof. The antigen may be a viral antigen, bacterial antigen, or tumor-associated antigen, including an inactivated cancer cell. The antigen may include a live attenuated microorganism that causes known disease, an antigen that is an inactivated or killed microorganism that causes known diseases, an antigen that is an inactivated toxin that is produced by a microorganism that causes known diseases, or an antigen that is a subunit or a conjugate of a subunit of a microorganism that causes known diseases. The antigen may be a trivalent seasonal influenza vaccine, a tetravalent seasonal influenza vaccine, an inactivated influenza vaccine, or a meningococcus vaccine. The meningococcus vaccine may include *Neisseria meningitidis* groups A, C, Y, and W-135. The hsRNA may exhibit a protective effect against viruses of allogeneic or heterologous subtypes.

Therapeutic agents may be suitably selected in consideration of the disease and the conditions of the subject to be treated. The therapeutic agent may be an anti-cancer drug or immune stimulant. The therapeutic agent may be a checkpoint inhibitor. The checkpoint inhibitor may be a PD-1 antibody, PDL1 antibody, CTLA4 antibody, OX40 antibody, or a combination thereof.

The subject may be a mammalian animal, including a human.

The hsRNA of the present invention may provide an improved immune response in a subject with high homogeneity and defined structure.

In addition, the antigen in complex with the hsRNA of the present invention may be delivered into the APCs to present the antigen to T cells and B cells efficiently. Furthermore, the hsRNA of the present invention may reduce antigen dose and induce protective immunity against viral or bacterial infection and cancer.

As a result, the hsRNA may enhance an adaptive immunity against an antigen, reduced the required amount of antigen in the vaccine, improved the antigen-specific Th1-polarized cross-protective response, enhance innate immunity, or a combination thereof. The hsRNA may be used alone or in combination with other antigens or therapeutic agents.

The hsRNA, alone or in combination with other anti-cancer drugs such as immune checkpoint inhibitors, may prevent or treat primary or secondary cancer. The immune checkpoint inhibitor may include antibodies to PD-1, PDL1, or OX40. The hsRNA may convert refractory cancer to an immune checkpoint inhibitor into responsive cancer.

Table 1 shows examples of hsRNAs. The hsRNA may include two single-stranded RNAs having the nucleotide sequence shown in Table 1 below, respectively. The two strands, i.e., two single-stranded RNA sequences, form a double-stranded RNA having two 3'-overhangs by base pairing between the first strand and the second strand. The nucleotide sequences of the double-stranded region of the hsRNA are also shown in

TABLE 1

| | Sequence of hsRNA | | |
|---|---|---|---|
| Name | The sequence of the first strand: SEQ ID NO | The sequence of the second strand: SEQ ID NO | The sequence of dsRNA region: SEQ ID NO |
| NA1001 | 1 | 32 | 63 |
| NA1501 | 2 | 33 | 64 |
| NA2001 | 3 | 34 | 65 |
| NA3001 | 4 | 35 | 66 |
| NA4001 | 5 | 36 | 67 |
| NA5001 | 6 | 37 | 68 |
| NA6001 | 7 | 38 | 69 |
| NA7001 | 8 | 39 | 70 |
| NA8001 | 9 | 40 | 71 |
| NA1002 | 10 | 41 | 72 |
| NA1502 | 11 | 42 | 73 |
| NA2002 | 12 | 43 | 74 |
| NA3002 | 13 | 44 | 75 |
| NA4002 | 14 | 45 | 76 |
| NA5002 | 15 | 46 | 77 |
| NA6002 | 16 | 47 | 78 |
| NA7002 | 17 | 48 | 79 |
| NA8002 | 18 | 49 | 80 |
| R1 | 19 | 50 | 81 |
| R2 | 20 | 51 | 82 |
| R3 | 21 | 52 | 83 |
| R4 | 22 | 53 | 84 |
| R5 | 23 | 54 | 85 |
| R6 | 24 | 55 | 86 |
| R7 | 25 | 56 | 87 |
| R8 | 26 | 57 | 88 |
| R9 | 27 | 58 | 89 |
| R10 | 28 | 59 | 90 |
| R11 | 29 | 60 | 91 |
| NVT | 30 | 61 | 92 |
| NVT4 | 31 | 62 | 93 |

The hsRNAs of NA1001, NA1501, NA2001, NA3001, NA4001, NA5001, NA6001, NA7001, and NA8001 are derived from the sequences of pDM-18T vector (group I), for example SEQ ID NO: 96. The hsRNAs of NA1002, NA1502, NA2002, NA3002, NA4002, NA5002, NA6002, NA7002, and NA8002 are derived from the sequences encoding tomato 5-enolpyruvylshikimate 3-phosphate synthase-1 (EPSP-1) protein (group 2), for example SEQ ID NO: 97. The hsRNAs of R1, R2, R3, R4, R5, R6, R7, R8, R9, R10, and R11 are derived from the sequences of an artificial sequence (group 3), for example SEQ ID NO: 98. The hsRNAs of NVT and NVT4 are derived from Chinese Sacbrood virus strain BJ 2012, VP1 gene (group 4), for example SEQ ID NO: 95. Table 2 shows the length of hsRNA, dsRNA region, first 3'-overhang and second 3'-overhang. The length of hsRNA includes the length of the dsRNA region, the length of the first 3'-overhang, and the length of the second 3'-overhang.

TABLE 2

| Name | Length (nt) | | | |
|---|---|---|---|---|
| | hsRNA | dsRNA | First 3'-overhang | Second 3'-overhang |
| NA1001 | 140 | 106 | 17 | 17 |
| NA1501 | 190 | 156 | 17 | 17 |
| NA2001 | 240 | 206 | 17 | 17 |
| NA3001 | 340 | 306 | 17 | 17 |
| NA4001 | 440 | 406 | 17 | 17 |
| NA5001 | 540 | 506 | 17 | 17 |
| NA6001 | 640 | 606 | 17 | 17 |
| NA7001 | 740 | 706 | 17 | 17 |
| NA8001 | 840 | 806 | 17 | 17 |
| NA1002 | 140 | 106 | 17 | 17 |
| NA1502 | 190 | 156 | 17 | 17 |
| NA2002 | 240 | 206 | 17 | 17 |
| NA3002 | 340 | 306 | 17 | 17 |
| NA4002 | 440 | 406 | 17 | 17 |
| NA5002 | 540 | 506 | 17 | 17 |
| NA6002 | 640 | 606 | 17 | 17 |
| NA7002 | 740 | 706 | 17 | 17 |
| NA8002 | 840 | 806 | 17 | 17 |
| R1 | 353 | 319 | 17 | 17 |
| R2 | 431 | 397 | 17 | 17 |
| R3 | 500 | 466 | 17 | 17 |
| R4 | 622 | 588 | 17 | 17 |
| R5 | 698 | 664 | 17 | 17 |
| R6 | 767 | 733 | 17 | 17 |
| R7 | 856 | 822 | 17 | 17 |
| R8 | 919 | 885 | 17 | 17 |
| R9 | 1066 | 1032 | 17 | 17 |
| R10 | 1187 | 1153 | 17 | 17 |
| R11 | 1682 | 1648 | 17 | 17 |
| NVT | 533 | 424 | 51 | 58 |
| NVT4 | 568 | 424 | 75 | 69 |

The hsRNA may activate immune cells, including dendritic cells, neutrophils, B cells, macrophages, T cells, mast cells, natural killer cells, or a combination thereof.

The hsRNA may enhance an immune response to an antigen. Thus, when the hsRNA is used in combination with an antigen as an adjuvant, the amount of the antigen to induce sufficient immune response may be reduced compared to that an antigen is used alone, i.e., without the hsRNA. A sufficient immune response may be an immune response to prevent or treat an infection or cancer. The amount of the antigen may be reduced ½ or less, ⅓ times or less, ⅕ or less, ⁄10 or less, ⁄25 or less, ⁄50 or less, or ⁄100 or less.

The hsRNA may enhance, maintain, or restore the antigenicity of an antigen when the antigen is used with the hsRNA.

Hereinafter, the present invention will be described in more detail through the working examples. However, the following examples are provided only for the purpose of illustration, and the scope of the present invention is not limited thereto.

Example 1. HsRNA Preparation and DC Activation by the hsRNA

1. Preparation of hsRNAs Having Two 3'-Overhangs

The hsRNAs shown in Tables 1 and 2 are prepared as follows.

A template DNA molecule comprising a template DNA region and T7 promoter sequences linked to both 5'-ends of the template DNA region was prepared. The template DNA region has the nucleotide sequence of SEQ ID NO: 96, 97, 95, and 98, respectively, which corresponds to the nucleotide sequence of pDM-18T vector, tomato EPSP-1 gene, Sacbrood virus VP1 gene, and an artificial sequence and T7 promoter has the nucleotide sequence of SEQ ID NO: 97. The template DNA molecule was ligated to PUC19 vector (Thermo Fisher, Cat SD0061) digested with SmaI, to form a recombinant vector comprising the template DNA molecule. The recombinant vector was introduced into E. coli DH5a by a transformation. The transformed cells were grown in LB/Amp medium. The cells were isolated from the supernatant of the culture. The cells were lysed by using an alkaline solution, and the recombinant vector was isolated by using Qiagen® midi prep kit.

The template DNA molecule was amplified by a PCR using the recombinant vector as a template. The obtained template DNA molecule was used in in vitro transcription (IVT) using T7 polymerase as a template. In the PCR, an oligonucleotide set, wherein each oligonucleotide has a complementary sequence to a target to be amplified and the T7 promoter sequence at its 5'-end was used as primer set. PCR was conducted at 95° C., and 5 minutes, and 35 thermal cycles of 95° C., and 30 seconds and 60° C., 30 seconds and 72° C., 1 minute. The reaction mixture was incubated at 72° C. and 5 minutes.

In vitro transcription was conducted using the MEGAscript$^{TM}$ T7 Transcription Kit (Thermo Fisher, cat AMB13345) according to the manufacturer's' protocols. The amplified template DNA molecule was used as a template. 1 ml reaction mixture comprising 10 ug linearized Template DNA, 75 mM NTP, 90 mM Tris base, 90 mM Boric acid, 2 mM EDTA, and T7 RNA polymerase 50 ul was incubated at 37° C. for 4 hours. The obtained reaction mixture was incubated at 80° C. for 20 minutes and cooled to room temperature for 30 minutes. The first single-strand RNA and the second single-strand RNA are simultaneously synthesized from each of the template DNA strands and hybridizes to form double-stranded RNAs having two 3'-overhangs.

The reaction mixture was centrifuged at 20° C., 4000 rpm for 3 minutes to remove white precipitation and obtain a supernatant solution. DNase I was added to the supernatant solution, and the resultant solution was incubated at 37° C. for 13 hours. The hsRNA was isolated from the reaction solution. As a result, 31 hsRNAs shown in Tables 1 and 2 were obtained. These hsRNAs have 3'-overhangs at both ends, 29 of these 31 hsRNA having 17 nt and in length at each 3'-end.

Further, RNase T1 was added to the DNase I-treated reaction mixture, and the resultant mixture was incubated at 37° C. for 2 hours. Then, the reaction mixture was incubated at 80° C. for 10 minutes and cooled to room temperature for 30 minutes. Then, the hsRNA having 3'-overhangs with reduced length was isolated by a nucleic acid precipitation method using isopropanol.

The isolated hsRNA has 3'-overhangs with 5 nt in length, which is shorter than 12 nt compared to the DNase I-treated hsRNA with 17 nt in length. These hsRNAs have UAUAG sequence at its 3'-end of the 3'-overhang. The hsRNA may have phosphate at its 5'-end and a hydroxyl group at its 3'-end. The phosphate may be triphosphate, diphosphate, or monophosphate. The hsRNA may not have 5'-cap.

2. Dendritic Cells Activation by the hsRNA

The present example demonstrates that the hsRNA activates an innate immunity in C57BL/6 mice when the hsRNA is injected via peritoneal injection. In this example, the hsRNA was solubilized in PBS (pH 7.2), and the hsRNA in PBS was injected into the mouse via peritoneal injection. PolyIC (invivoGen, Poly(I:C) (HMW) VacciGrade™, cat #, vac-pic) was used as a positive control.

FIG. 1 shows an in vivo screening result of an hsRNA for activating DCs. Each data refer to an average value of three independent experiments.

As shown in A of FIG. 1, the NVT comprising the sequences of SEQ ID NOs: 30 and 61 followed by RNase T1 treatment increases expression of stimulatory cofactors CD40, and CD86, and MHC II on cell surface of CD11c+ DC cells from spleen as measured by mean fluorescence intensity (MFI). MFI levels for CD40, CD86, and MHC II of the NVT 10 µg injection were equal or higher than that of the positive control, PolyIC 100 µg injection. This indicates that the NVT induces differentiation of DC maturation. The MFI was measured by flow cytometry analysis for DCs isolated from spleen.

As shown in B of FIG. 1, the NVT increases the serum level of IL-6, IL-12 and TNF-α compared to that of the positive control, PolyIC. This indicates that the NVT increases the secretion of IL-6, IL-12, and TNF-α in serum compared to that of the positive control. The serum level of IL-6, IL-12, and TNF-α was measured by a Sandwich ELISA methods.

As shown in C of FIG. 1, the NVT increases mRNA level of T-bet and IFN-γ, but does not increase expression of IL-4 and IL-17A compared to that of the positive control, PolyIC. T-bet and IFN-γ are known as Th1 cell markers and cytokine, respectively. IL-4 and IL-17A are known as Th2 and Th7 cell cytokine, respectively. Total RNA from indicated treatment was isolated using RNAzol® RT (Sigma Aldrich). The level of each mRNA was determined by qRT-PCR and relative abundance to beta actin mRNA was obtained.

These data indicate the hsRNA strongly activates naïve CD4 T cells to Th1 CD4 T cells as compared to that of the positive control.

Example 2. DC Activation Depends on the Length of the hsRNA

The hsRNAs having varying length dsRNA region and constant length two 3'-overhangs were injected into C57BL/6 mice via peritoneal injection as shown Example 1. 17 hsRNAs shown in Tables 1 and 2, i.e., NA1001, NA1501, NA2001, NA3001, NA4001, NA5001, NA6001, NA8001, NA1002, NA1502, NA2002, NA3002, NA4002, NA5002, NA6002, NA7002, and NA8002, were used. These hsRNAs were produced from identical templates via in vitro transcription as shown in Example 1, "1. Preparation of hsRNAs having two 3'-overhangs", and a longer hsRNA has identical sequence region and additional sequence region compared to a shorter hsRNA. For example, NA1501 has 140 nt identical sequence region and 50 nt additional sequence region compared to NA1001. The dsRNA region has 106 to 806 nt in length and two 3'-overhangs have constant length, i.e., 17 nt.

Figure 2:
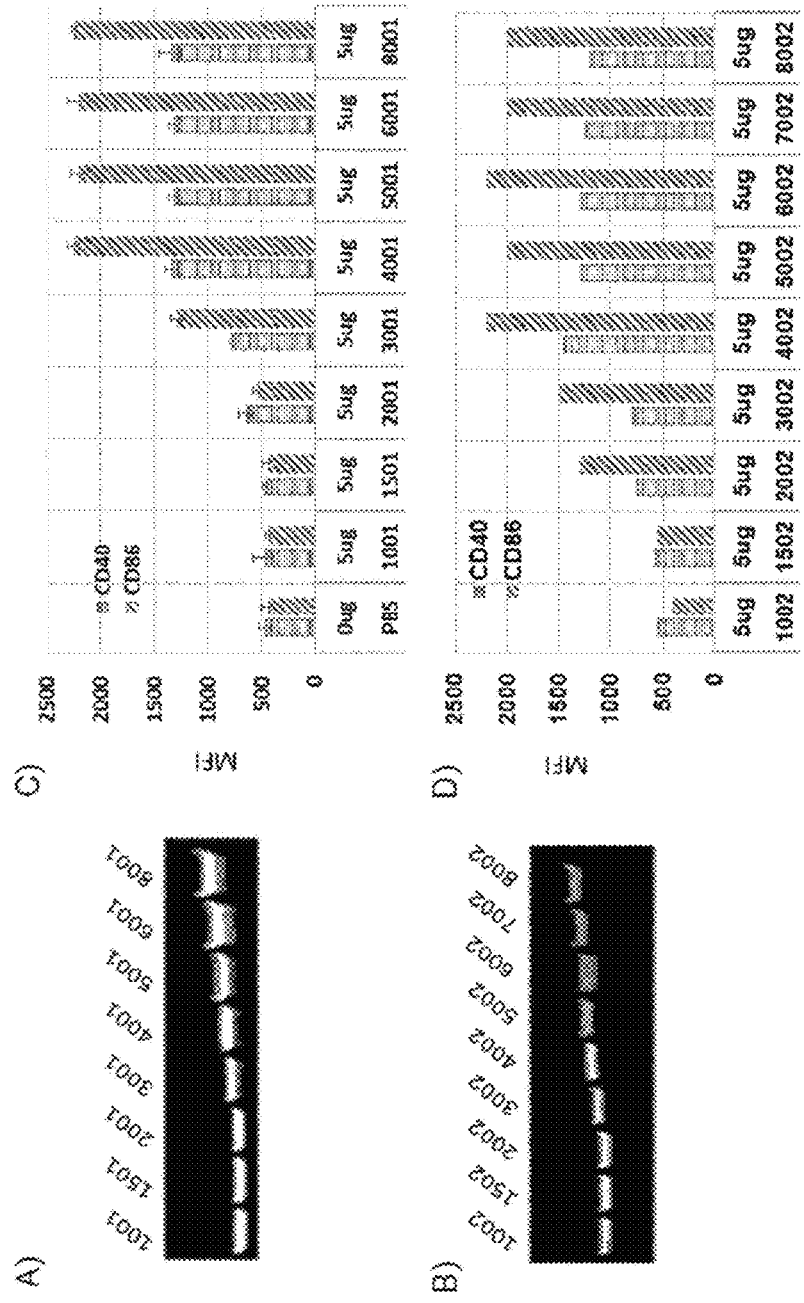
FIG. 2 shows the activity of DC in vivo according to the length of the hsRNA.

FIG. 2 shows an activity of DC according to the length of the hsRNA.

A and B of FIG. 2 are results of 1% agarose gel electrophoresis for 17 hsRNAs. NA1001, NA1501, NA2001, NA3001, NA4001, NA5001, NA6001, and NA8001 has 140 nt, 190 nt, 150 nt, 240 nt, 340 nt, 440 nt, 540 nt, 640 nt, and 840 nt in length, respectively. NA1002, NA1502, NA2002, NA3002, NA4002, NA5002, NA6002, NA7002, and NA8002, has 140 nt, 190 nt, 150 nt, 240 nt, 340 nt, 440 nt, 540 nt, 640 nt, 740 nt, and 840 nt in length, respectively.

As shown in C and D of FIG. 2, the NA2001, NA3001, NA4001, NA5001, NA6001, NA8001, NA2002, NA3002, NA4002, NA5002, NA6002, NA7002, and NA8002 increased expression of stimulatory cofactors CD40, and CD86 on the cell surface of CD11c+DC cells from spleen on 24 hours after treatment as measured by mean fluorescence intensity (MFI). MFI levels for CD40 and CD86 of the above-mentioned hsRNA injection were higher than that of the negative control, PBS injection. This indicates that the hsRNAs induce differentiation of DC maturation. The MFI was measured by flow cytometry for DCs isolated from spleen.

These data indicate that when two 3'-overhangs have 17 nt in length, respectively, and, thus, the length of single-stranded RNA regions is 34 nt, the hsRNA having dsRNA region with more than 156 nt in length increased cell surface expression of CD40, and CD86 on CD11c+ DC cells. The hsRNA may have dsRNA region with length 157 nt or longer, 206 nt or longer, 306 nt or longer, 406 nt or longer, 506 nt or longer, 606 nt or longer, 706 nt or longer, 806 nt or longer, 157 to 806 nt, 206 to 806 nt, 306 to 806 nt, 406 to 806 nt, 506 to 806 nt, 706 to 806 nt, 157 to 806 nt, 206 to 806 nt, 306 to 806 nt, 406 to 806 nt, 506 to 806 nt, 706 to 806 nt, 157 to 706 nt, 206 to 706 nt, 306 to 706 nt, 406 to 706 nt, 506 to 706 nt, 157 to 606 nt, 206 to 606 nt, 306 to 606 nt, 406 to 606 nt, 506 to 606 nt, 157 to 506 nt, 206 to 506 nt, 306 to 506 nt, 406 to 506 nt, 157 to 406 nt, 206 to 406 nt, 306 to 406 nt, or 366 to 866 nt.

The hsRNA may have 191 nt or longer, 240 nt or longer, 340 nt or longer, 440 nt or longer, 540 nt or longer, 640 nt or longer, 740 nt or longer, 840 nt or longer, 157 to 840 nt, 240 to 840 nt, 340 to 840 nt, 440 to 840 nt, 540 to 840 nt, 740 to 840 nt, 157 to 840 nt, 240 to 840 nt, 340 to 840 nt, 440 to 840 nt, 540 to 840 nt, 740 to 840 nt, 157 to 740 nt, 240 to 740 nt, 340 to 740 nt, 440 to 740 nt, 540 to 740 nt, 157 to 640 nt, 240 to 640 nt, 340 to 640 nt, 440 to 640 nt, 540 to 640 nt, 157 to 540 nt, 240 to 540 nt, 340 to 540 nt, 440 to 540 nt, 157 to 440 nt, 240 to 440 nt, 340 to 440 nt, or 400 to 900 nt.

Example 3. An Antigen-Specific Antibody Response Depends on the Length of hsRNA 12 hsRNAs, i.e., R1, R2, R3, R4, R5, R6, R7, R8, R9, R10, R11, and VP11 have an extensive length range from 353 to 1682 nt and were derived from a template DNA different from the other hsRNAs shown in Tables 1 and 2. VP11 is a hsRNA obtained by cleaving NVT with RNase T1. VP11 has a 424 bp dsRNA in the middle region flanked by 3'-overhanging UAUAG at both 3 ends. VP11 has the UAUAG sequence at both 3'-ends of the SEQ ID NO: 60.

Following the transient co-transfection into HEK 293 cells of these hsRNAs along with the IFN-β promoter-operatively linked a firefly luciferase and SV40 promoter-linked Renilla luciferase as a control, the relative level of firefly luciferase to Renilla was determined luciferase as a surrogate normalized IFN-β promoter by Firefly/Renilla Dual Luciferase® Assay (Merck cat # SCT152). The surrogate reporter level was increased proportionally to the length of the hsRNA, reaching a maximum at the range of 500 to 1066 nt. This indicates that the reporter gene expression depends on the length of the hsRNA and the nucleotide sequence of the hsRNAs has little effect to the reporter gene expression.

Figure 3:
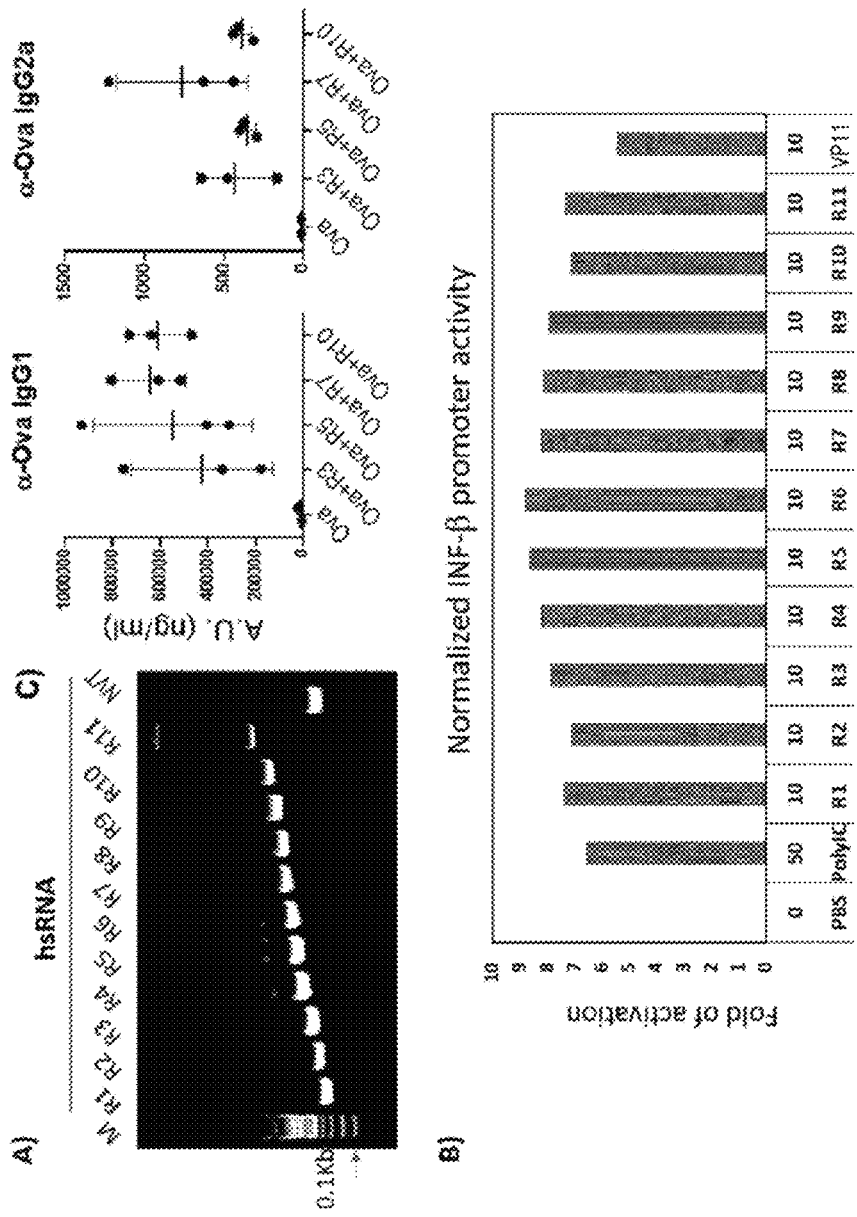
FIG. 3 shows the innate immunity activity marker and immune response result of the hsRNA.

FIG. 3 shows the innate immunity activity marker and immune response result of the hsRNA.

A of FIG. 3 is a photograph of the electrophoresis in 1% agarose gel for confirming the length after preparing the hsRNA.

B of FIG. 3 shows the IFN-β increases in response to transient co-transfection of the hsRNA and a vector comprising an interferon-beta promoter and luciferase gene operatively linked to the promoter in HEK 293. As shown in B of FIG. 3, the hsRNA, i.e., R1, R2, R3, R4, R5, R6, R7, R8, R9, R10, and R11 at 10 μg increased the IFN-β promoter activity compared to 50 μg of the positive control, PolyIC.

Several of these hsRNAs, i.e., R3, R5, R7, and R10, were mixed with a model antigen ovalbumin (OVA) in PBS, and the resultant mixture was injected into mice to test for their induction effect of anti-OVA IgG antibody in mice.

C of FIG. 3 shows that intramuscular administration of the hsRNA-adjuvanted ovalbumin in mice induced anti-OVA IgG1, i.e., Th2-polarized and IgG2a, i.e., Th1-polarized in serum. This indicates that the hsRNA enhances Th1 and Th2 cell responses in mice. The R7 hsRNA strongly enhanced the Th1 and Th2 cell response compared to R3, R5, and R10.

Consistent with the above, high levels of anti-OVA IgG1 and anti-OVA IgG2a were observed in the vicinity of R5, wherein hsRNA and dsRNA region have 698 nt and 664 nt in length, respectively.

Taken all together, the hsRNAs having 140 to 1682 nt in length, wherein dsRNA region having 106 to 1648 nt in length, exhibited excellent activation effects on innate and adaptive responses.

Therefore, the hsRNAs may have 112 to 2018 nt, for example, 140 to 1682 nt in length. The dsRNA region in the hsRNA may have 85 to 1977 nt, for example, 140 to 1682 nt in length.

Example 4. Analysis of Physicochemical Properties of the hsRNA

The physicochemical properties of hsRNA NVT having sequence of SEQ ID NOs: 30 and 61, were measured using HPLC analysis and an agarose gel electrophoresis.

Figure 4:
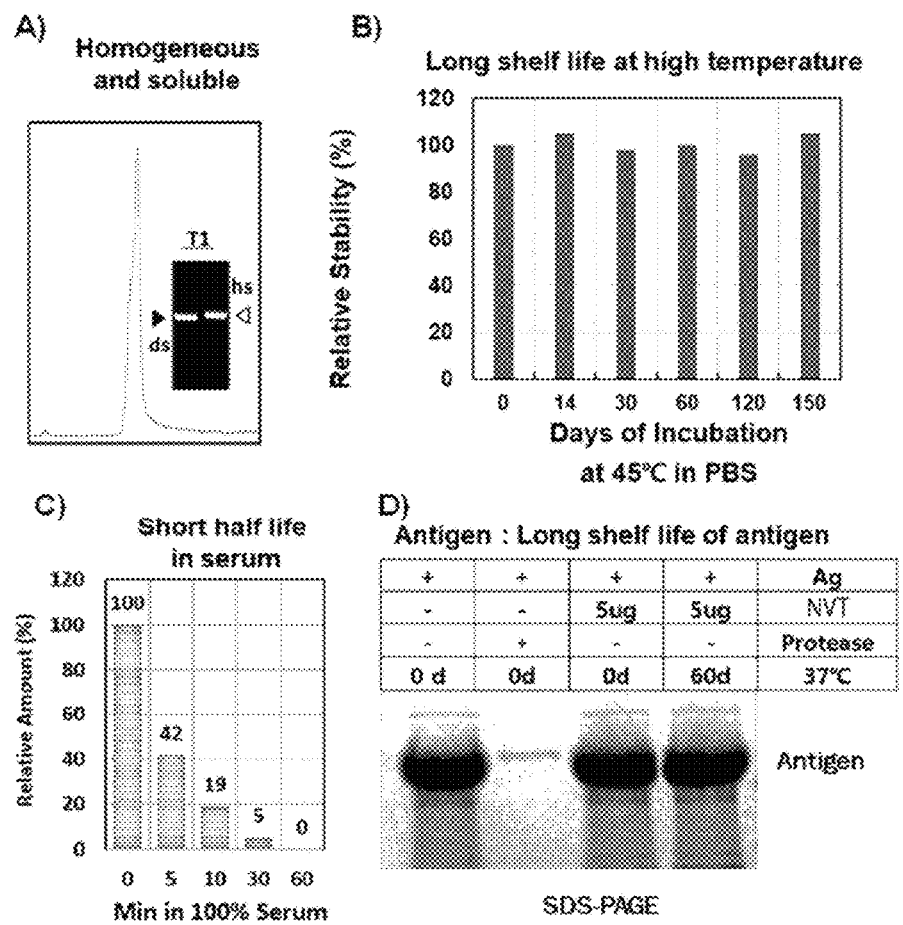
FIG. 4 shows the physicochemical properties of NVT, one of the hsRNA.

FIG. 4 shows the physicochemical properties of hsRNA NVT.

A of FIG. 4A is a photogram of 1% agarose electrophoresis, showing that the hsRNA NVT and the hsRNA NVT treated with RNase T1 have uniform length. In this experiment, the hsRNA NVT was resuspended in 1× PBS. For RP-HPLC analysis, 1 μg NVT solution in PBS was loaded to ion-pair RP-HPLC column (Waters® XBridge® OST C18 Column, 130A, 2.5 um, 4.6×50 mm) and eluted with Acetonitrile/0.1M TEAA (25/75, v/v). The NVT solution was mixed with 1~2 unit RNase T1 and incubated for 30 min. Then the solution was subjected to HPLC reanalysis in the same way.

B of FIG. 4 shows that the hsRNA NVT treated with RNase T1 is stable at 45° C. for 150 days or longer. In this experiment, the hsRNA NVT was treated with RNase T1 as above, and the obtained solution in PBS was incubated at 45° C. for 150 days or longer. The relative stability was determined by measuring A260 for the sample obtained at the indicated day.

C of FIG. 4 shows that NVT has a half-life of shorter than 10 minutes in 100% calf serum. The serum is abundant in the RNase A and may degrade the hsRNA.

D of FIG. 4 shows that the NVT adjuvanted antigen has a longer shelf life. The antigen complex to the NVT could be stored for an extended time at room temperature. In this experiment, the ovalbumin antigen and proteinase K (MERK, cat #RPROTKSOL-RO) were used, respectively.

Example 5. Immune Profiling Between the hsRNA and the hsRNA Treated with RNase T1

Following subcutaneous injection of (i) no RNase T1 treated-hsRNA (NVT4-T1), (ii) RNase T1-treated hsRNA (NVT4+T1) into BaIB/C mice, the innate immune markers were compared in vivo after 24 and 48 hours as follows using NVT4 comprising the sequences of SEQ ID NOs: 31 and 62.

Figure 5:
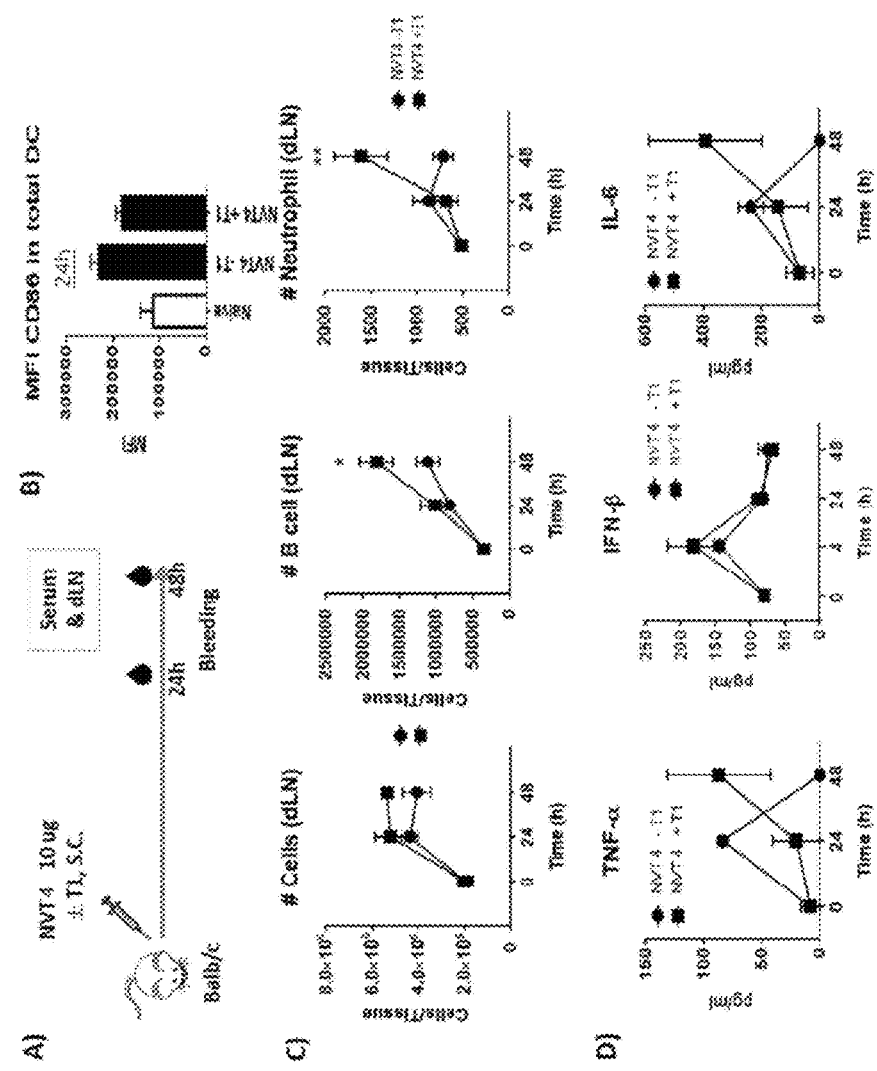
FIG. 5 shows the pattern of innate immunity activity markers after subcutaneous injection of the hsRNA.

FIG. 5 shows the pattern of innate immunity activity markers after subcutaneous injection of the hsRNA in a mouse. A of FIG. 5 is a schematic immunization protocol, in order to show that the hsRNA (NVT4-T1) elicits the lower proinflammatory cytokine responses than the RNase T1 treated-hsRNA (NVT4+T1). B of FIG. 5 shows that subcutaneous injection of the RNase T1 non treated hsRNA NVT4 stimulates higher DC activation, i.e., CD86 induction, than that of the RNase treated-hsRNA NVT4 at 24 hours.

C of FIG. 5 shows immune cell profiles in the drain lymph node (dLN) after 24 hours and 48 hours of the hsRNA injection. After 48 hours, the RNase T1 treated-hsRNA NVT4 was found to have a higher immune stimulation activity than that of the hsRNA NVT4, which was not treated with RNase T1. D of FIG. 5 shows that RNase T1 treated-hsRNA NVT4 highly induces TNF-α, IFN-β, and IL-6 as compared to that of hsRNA NVT4, which was not treated with RNase T1. It suggests that hsRNA NVT4, which was treated with RNase T1, more strongly induces innate immunity.

While both NVT4+T1 and NVT4-T1 strongly induced DC activation, NVT4+T1 increased more immune cells, especially B cells and neutrophils, as compared to NVT4-T1, which was further correlated with increases in TNF-α, IFN-β, and IL-6 in proportion thereto. Taken together, NVT4+T1 induces innate immunity more strongly. NVT4-T1 elicited neutrophil, IL-6, and TNF-α, at the lower level.

Example 6. Comparison of Th1 Polarized Immune Response Among NVT and Other Adjuvants The OVA was resuspended in PBS with NVT, Alum, squalene (SE), IFA, PolyIC and then administered intramuscularly into mice to compare an immune response induction.

Figure 6:
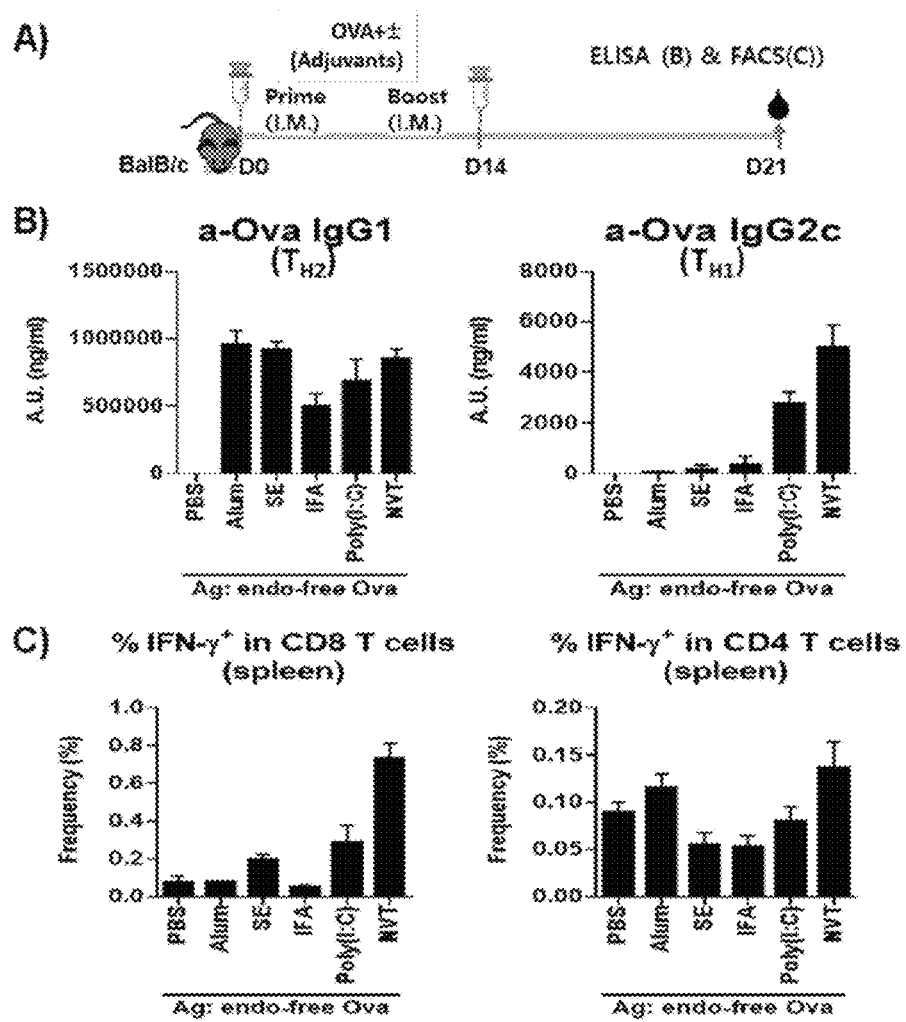
FIG. 6 shows that the NVT-adjuvanted OVA vaccine induces a Th1 polarized immune response more strongly than other adjuvants.

FIG. 6 shows that the NVT hsRNA-adjuvanted OVA vaccine induces a Th1 polarized immune response more strongly than other adjuvants. The NVT comprises the sequence of SEQ ID NOs: 30 and 61.

A of FIG. 6 shows an adjuvanted or non-adjuvanted vaccination intramuscularly at day 0 followed by boosting at day 14 in BaIB/c mouse. The peripheral blood and splenocytes are extracted on day 21 for flow cytometry and IgG quantitation via ELISA.

B and C of FIG. 6 shows that the NVT hsRNA activated Th1 response (IgG2c) to a higher level than other adjuvants and increased the number of CD8 T cells and CD4 T cells that secrete IFN-γ in the spleen, but not the Th2 immune response (IgG1).

Though the Th2 response (IgG1) was similar, a higher Th1 response (IgG2c) resulted from NVT hsRNA-adjuvanted OVA than others. In addition, more splenic CD8 and CD4 T cells that secret IFN-γ increased in response to NVT-adjuvanted OVA vaccine formats. When administered intranasally, NVT induced more strongly mucosal IgA and mucosal IgG in the body fluids (tear, nasal cavity, and drainage) and serum than other adjuvants (data not shown).

Example 7. Innate and Antigen-Specific Antibody Responses Between hsRNA and hsRNA Plus Additional Adjuvant Two formulations of (i) NVT; the hsRNA comprising the sequence of SEQ ID NOs: 30 and 61, (ii) NVT II; NVT+SE (squalene emulsion) was prepared. NVT was prepared by solubilizing the NVT hsRNA in PBS, and NVT II was prepared by mixing the 50% hsRNA NVT, 4,3% squalene, 0.5% Span 0.5% Tween® 80 in PBS.

Following intramuscular injection of NVT and NVT II into BalB/C mice, DC activity was measured by flow cytometry. DC stimulation in the inguinal lymph node (iLN) was higher in NVT II than in NVT.

In addition, model vaccines, including (i) OVA alone, (ii) OVA+NVT, (iii) OVA+NVT II were prepared and tested in the same mice for the anti-OVA IgG1, indicating Th2 response, and IgG2a, indicating Th1 response.

Figure 7:
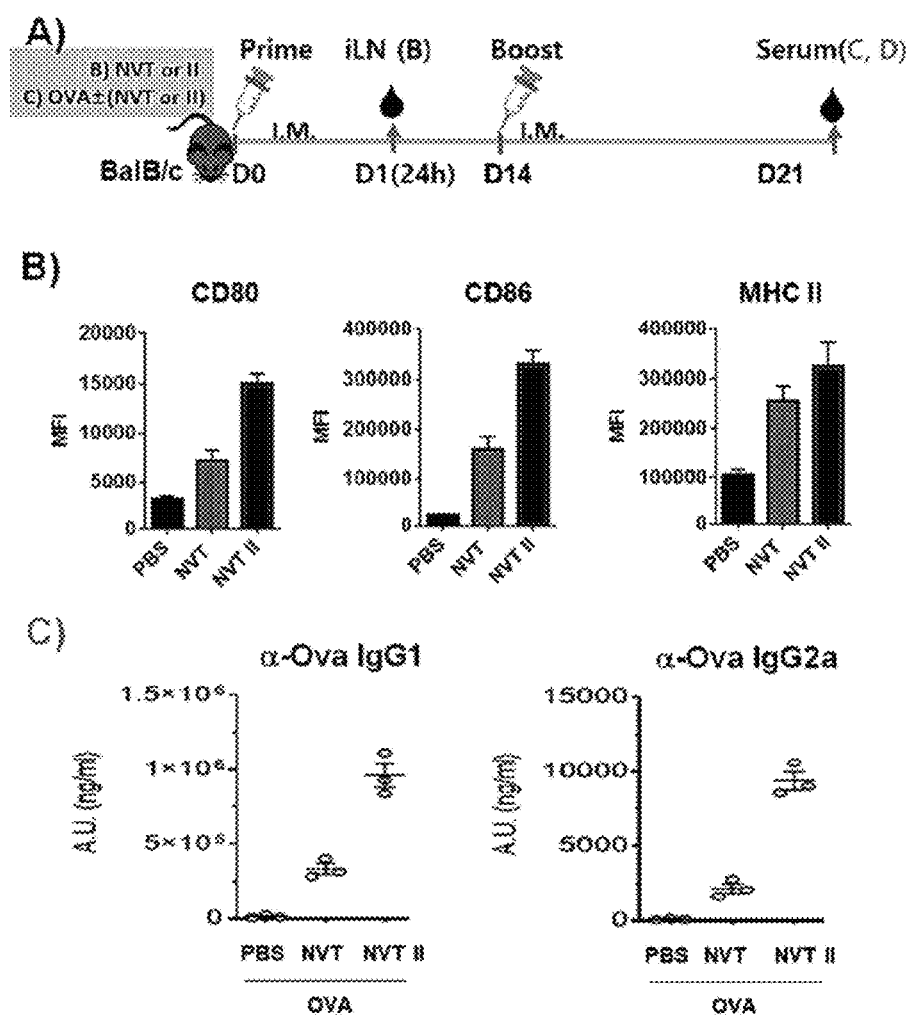
FIG. 7 shows the comparison of NVT and NVT II in an innate immune and adaptive immunity induction.

FIG. 7 shows the comparison of NVT and NVT II in an innate immune and adaptive immunity induction. A of FIG. 7 is a dosing regimen for immunization with the hsRNA.

B of FIG. 7 shows that NVT II more strongly induces the DC activity in inguinal lymph node (iLN) over NVT and PBS (phosphate-buffered saline) 24 hours after injection.

C of FIG. 7 shows the level of binding antibody to the ovalbumin antigen when injected with PBS, NVT, and NVT II.

As a result, OVA+NVT induced a stronger antibody response by about 100 times than OVA alone. The OVA+NVT II induced a stronger antibody response by 2 times or more than OVA+NVT.

Example 8. Homogeneity in Structure and Length of the hsRNA

The hsRNA has a dsRNA region and two ssRNA overhangs at both 3' ends. Both dsRNA region and overhangs have a non-homopolymeric, i.e., heteropolymeric sequence and can be defined as an exact length, preventing homopolymer-mediated chain slippage and extension.

Figure 8:
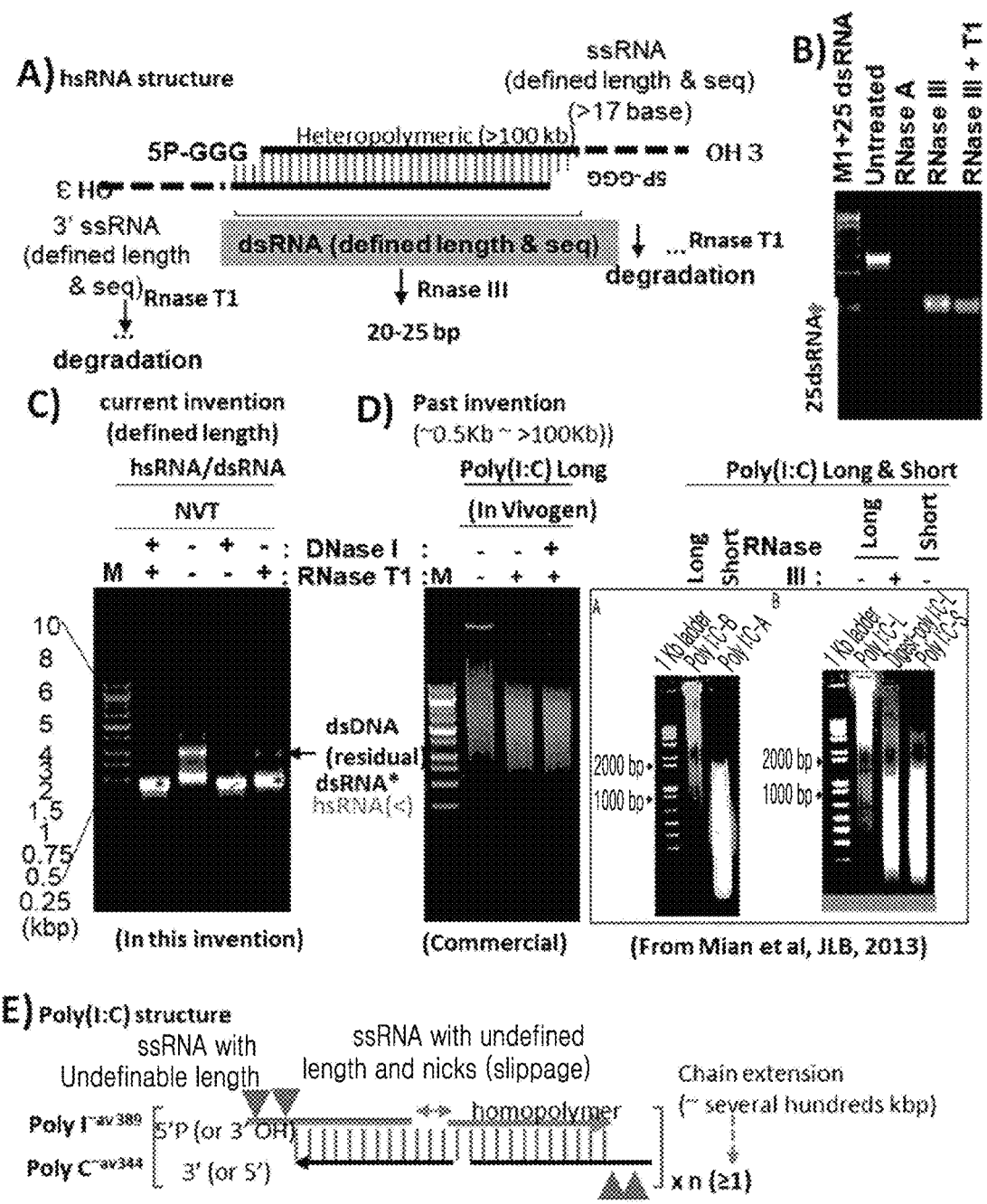
FIG. 8 shows the structure of the hsRNA.

FIG. 8 shows the structure of the hsRNA. Heteropolymeric dsRNA region is flanked by each ssRNA overhangs at the 3' ends.

A of FIG. 8 is a schematic diagram of the hsRNA. The heteropolymeric dsRNA region of the hsRNA has a certain length and any particular sequence with complete complementarity between single strands. The two ssRNA overhangs to both 3' ends of the dsRNA can be any certain length with no complementarity. The two overhangs may be capable of acting as a potential TLR7/8 ligand. The dsRNA region may be an artificial sequence or may be a naturally occurring sequence. The dsRNA region may not encode a protein. Upon RNase III treatment, the dsRNA region is cleaved into pieces of dsRNA of 20 to 25 nt on average. However, RNase T1, which does not act on dsRNA but acts only on ssRNA overhang. The RNase 1 may specifically cleave single-stranded RNA at G residues. It may cleave the phosphodiester bond between the 3'-guanylic residue and the 5'-OH of adjacent nucleotides. The reaction products may be 3'-GMP and oligonucleotides with a terminal 3'-GMP. The RNase I may reduce the length of ssRNA overhangs. The present invention provides the advantage in which hsRNA having a length can be mass-produced in vitro using a T7 RNA polymerase at a similar molar ratio of two complementary ssRNAs derived from both strands of DNA. The obtained hsRNA may have more than 100 nt in length.

In the present invention, the ssRNA overhang may have a specific length and sequence. For example, the overhang may have a sequence comprising a large number of GU sequences, a TLR7 ligand sequence. The overhang may be capable of acting as one particular TLR7/8 ligand. In addition, the overhang may have a function to prevent the end of the dsRNA region from being degraded.

Bidirectional transcription from the one template DNA generates two complementary two ssRNAs with almost the same molar ratio. During the IVT, two strands subsequently undergo spontaneous annealing to forms hsRNA with perfect dsRNA region and two ssRNA overhang in both 3' ends. Of particular importance, the two ssRNA overhangs are designed not to be complementary to each other to prevent base pairing or chain extension.

B of FIG. 8 shows a result of digesting hsRNA with RNase A, RNase III, and RNase III+RNase T1. RNase A can degrade both dsRNA and ssRNA degraded all RNAs. When treated with RNase III that can cleave dsRNA into 20 to 25 nt in length, the band of segments with a range of about 25 nt appeared most. The RNase III does not cleave ssRNA overhangs, which are 51 nt and 58 nt, respectively, of the hsRNA NVT4. So ssRNA overhangs remain undegraded, which overlapped around 25 nt. When treated with RNase III and RNase T1 at the same time, the ssRNA segments with 51 nt and 58 nt were completely degraded and disappeared, and only a single band of 25 nt appeared clearly.

C of FIG. 8 shows that NVT comprising the sequence of SEQ ID NOs: 30 and 61 and having 533 nt in length and dsRNA region with 424 nt in length was isolated in agarose gel before and after treatment with DNase I and RNase T1, and then a constant result appeared with a specific length. After IVT, residual DNA templates are removed with the treatment of DNase I, and then the only hsRNA remains. When the ssRNA overhang was present in hsRNA, its length was reduced by RNase T1. If there are one or more nicks within the dsRNA region, RNase T1 will cleave the nick site, resulting in two or more dsRNA segments. In contrast, only one band in agarose gel demonstrates that there are no nicks in the dsRNA sites and the ssRNA overhangs.

D of FIG. 8 shows that PolyIC, a commercially available positive control, has a heterogeneity due to the extreme length diversity which arises from the preparation stage, which cannot be overcome even after finishing the fractionation after preparation (Mian M F et al., (2013) J Leukoc Biol 94 (5):1025-36).

E of FIG. 8 shows the basic structure of PolyIC, a commercially available positive control, which can be represented only as an average length, not a specific length. For example, homopolymeric Poly(I) of about 389 bases on average and Poly(C) of 344 bases on average are synthesized respectively. They are allowed to complementarily anneal to each other, and then dsRNA is prepared. However, because chain slippage, i.e., random site base pairing, occurs in which complementary associations occur at unpredictable, non-specifiable sites, the formation of multiple nicks with a variable gap in unpredictable locations is unavoidable. Besides, the random site base-pairing should create the unspecifiable base stretch of Poly(I) and poly(C) tails at both places regardless of 5' or 3' ends, to which complementary strands associates again, leading to chain extension. Therefore the length is extended to several hundred kilobases or more (Mian M F et al., (2013) J Leukoc Biol 94 (5):1025-

36). In addition, since PNPase is used in the preparation process of PolyIC, a phosphate group (P) is always attached to 5' end, and thus the yield is low.

In contrast, the hsRNA can be designed to form dsRNA flanked by overhangs only at both 3' ends having a defined length with no complementary sequence each other that prevents chain extension, which is in contrast to PolyIC and its derivatives.

As another specific example, any particular single strand containing polyuridine (U) base can be added to both sides of the dsRNA region. In addition, a single strand can be designed to have stability by adding a specific sequence to form an internal dsRNA such as a hairpin structure or a palindrome ring structure or to act as a TLR7-like ligand.

In contrast, PolyIC, a competitive drug, has extreme length diversity and cannot be prepared at a constant length. Instead, it is artificial homopolymeric dsRNA with unspecifiable nicks insides and has no ssRNA tail in specified sites such as the 3' end of dsRNA. The length diversity of PolyIC is caused by slippage within the chain and chain extension. As a result, multiple nicks in unspecifiable sites in the dsRNA site are formed, which are cleaved by RNase T1 into various lengths (D of FIG. 8). In addition, the number of the upper and lower strands forming dsRNA cannot be specified due to uncontrolled chain extension in PolyIC. Thus PolyIC is easily digested by RNase T1. The extreme heterogeneity of PolyIC was published in one of the original articles (Mian M F et al., (2013) J Leukoc Biol 94 (5):1025-36).

RNase III digestion of PolyIC-L (long species) gave rise to small species similar to PolyIC-S (short species) (D of FIG. 8). This extreme heterogeneity was partially improved by reducing chain extension through complementary binding a short PolyC (P100 of 100 nts on average) to a long PolyI (P400 of 400 nts on average). Nonetheless, the length varies in a vastly diverse range from 100 nt to 100 knt.

The RNA has an essential difference from the existing invention in the following matters.

In contrast to PolyIC, the RNA 1) has a high homogeneity in length, is a non-homopolymer of sequence, and does not have nicks in dsRNA due to complete complementarity, and 2) may act as a TLR3 ligand and a TLR7-like ligand.

As compared to siRNA, the hsRNA 1) has an essential difference in the preparation process as compared to the synthesized siRNA, 2) does not have a function of target-suppressing a specific gene possessed by siRNA, and 3) can act as a TLR3 ligand exhibiting sufficient activity because the length of the hsRNA is 45 nt or more, whereas the range of siRNA is short as 21 to 25 nt, so siRNA cannot stimulate TLR3, and 4) the ssRNA of the present invention has a specific sequence of a particular length or more extended, for example, 1 nt or more, or 17 nt or more, and acts as TLR7/8-like ligand, whereas a very short 3'-overhang at the end of the siRNA corresponds to a simple residual sequence without function.

Example 9. Immune Response to dsRNA Adjuvanted-Whole Inactivated Influenza Vaccine (iPR8) Via Intranasal Administration When NVT was administered together with iPR8 to BalB/c mice, the number of mDC and rDC cells increased in the mediastinal lymph nodes after 24 hours, and DC (CD80, CD86) was activated and then declined to a baseline level after 96 hours (data not shown). In addition, total cells, alveolar macrophages, neutrophils, and natural killer cells in bronchoalveolar lavage fluid were increased (B of FIG. 9), which was proportional to the increase in IL-6, IL-12, and TNF-α, wherein NVT alone also showed a positive effect on the rise of those proinflammatory cytokines (C of FIG. 9). This increase in innate immunity marker was accompanied by an increase in germinal center B (GCB) cells, follicular helper T cells ($T_{FH}$), and IgG and IgA in serum and nasal lavage fluid (D and E of FIG. 9).

The NVT adjuvant alone also had a protective effect against a lethal live viral infection in the absence of an antigen. When the NVT was intranasally administered several times to the mice, the lifespan was extended by 4 days or more on average, and the mortality rate related to virus infection (viremia) was reduced by about 20% (data not shown). Again, the NVT adjuvant alone without an antigen exhibited a robust immune enhancement action.

Figure 9:
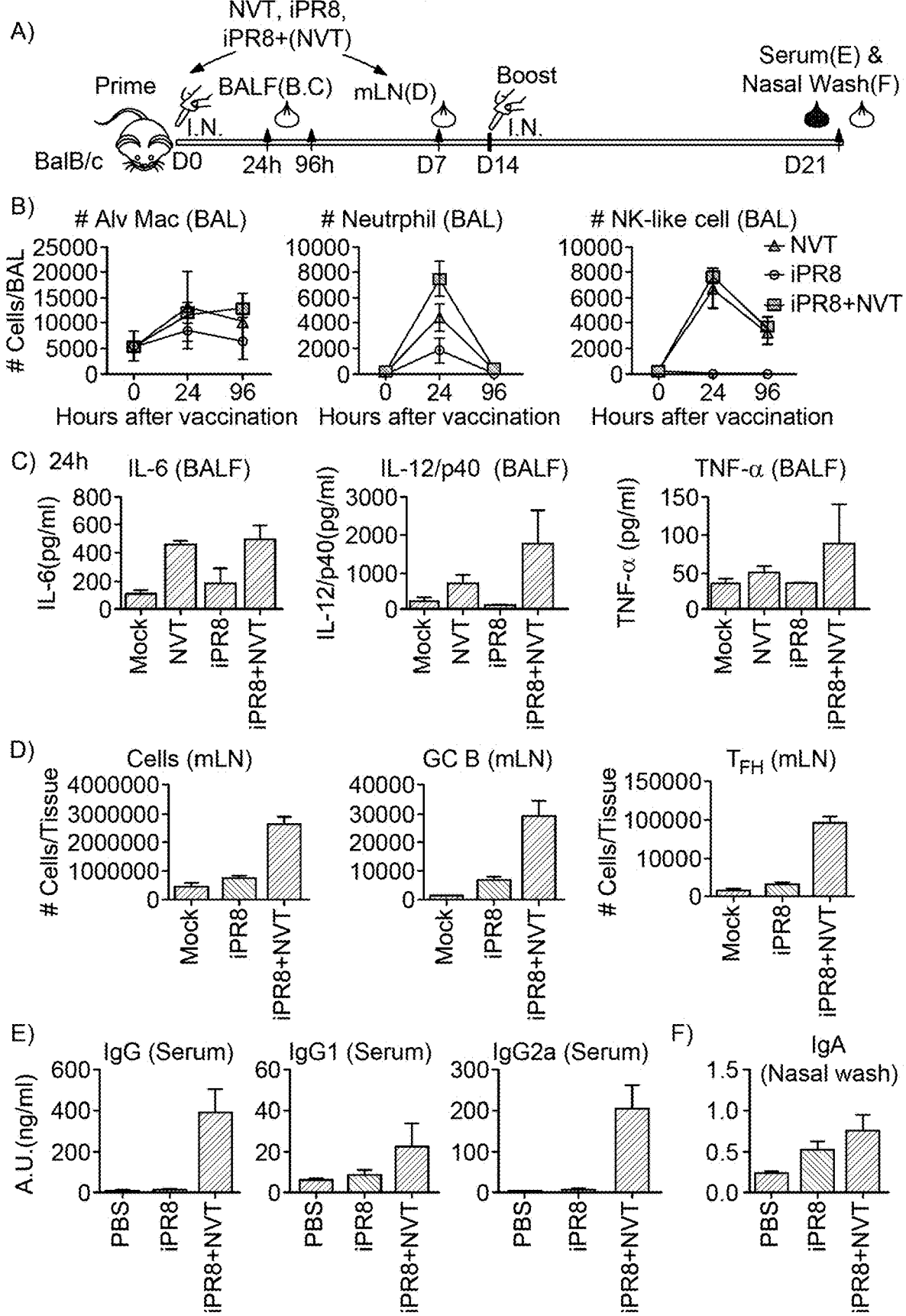
FIG. 9 shows the immune response after intranasal administration of the whole inactivated influenza vaccine adjuvanted with (iPR8+NVT) or without (iPR8) the NVT, or NVT alone.

FIG. 9 shows the immune response after intranasal administration of the whole inactivated influenza vaccine (iPR8) adjuvanted with (iPR8+NVT) or without (iPR8) the NVT or NVT alone.

A of FIG. 9 is a schematic diagram of the test method.

B of FIG. 9 shows profiles of alveolar macrophages, neutrophils, and natural killer cells in bronchoalveolar lavage fluid from n NVT, iPR8, and iPR8+NVT-treated group mice.

C of FIG. 9 shows a marked increase in IL-6, IL-12, and TNF-α after 24 hours.

D of FIG. 9 shows an increase in germinal center B (GCB) cells and follicular helper T cells ($T_{FH}$) in mediastinal lymph node (mLN) on day 7.

E of FIG. 9 shows that serum anti-iPR8 IgG increases after 21 days in the iPR8+NVT group.

F of FIG. 9 shows an increase in IgA in nasal lavage fluid on day 21.

Example 10. Effect of the hsRNA on Dose Sparing of Commercial Influenza Split Vaccine The adjuvant role in the commercial vaccine antigen was tested. Tested vaccines include (i) tetravalent inactivated influenza vaccine (411V, Vaxigrip®, Sanofi Pasteur), (ii) 411V+NVT, (iii) 411V+NVT 11. NVT II refers to (NVT+SE) formulation. Following intramuscular priming and boosting apart 2-weeks intervals in female Balb/c mice, IgG level and hemagglutination inhibition (HAI) titer were determined over the 18 weeks of post priming (A of FIG. 10).

Figure 10:
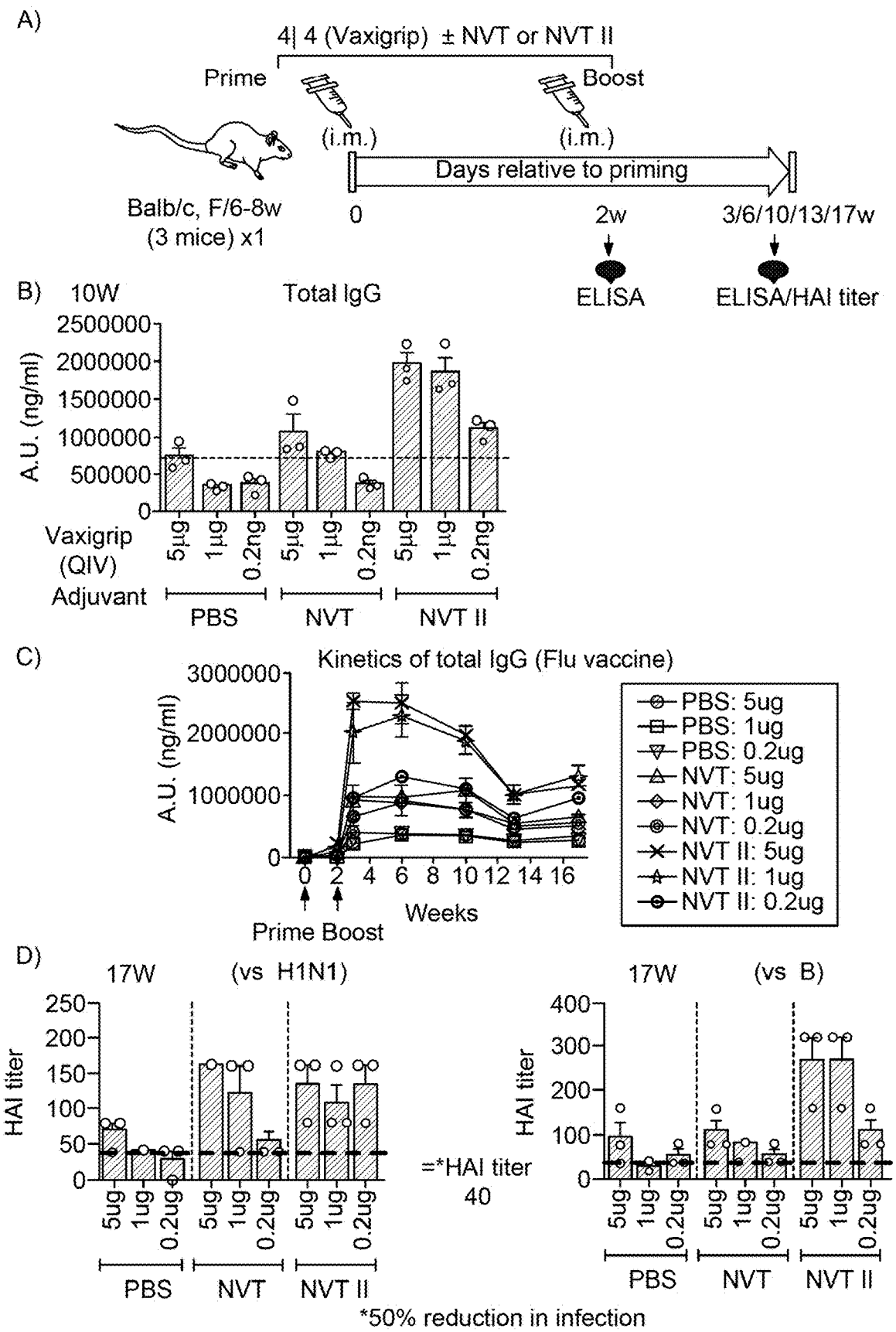
FIG. 10 relates to an effect of the adjuvant of the present invention on an efficacy and antigen dose saving of a commercial influenza vaccine (41V (Vaxigrip®)) by a hsRNA NVT.

FIG. 10 relates to an effect of the hsRNA adjuvant of this invention on an efficacy and antigen dose saving of a commercial influenza vaccine.

A of FIG. 10 is a schematic diagram of the test method.

B of FIG. 10 shows that NVT or NVT II adjuvants saved the amount of antigen required to induce IgG to about ⅕ and about ¹/₂₅ or less, respectively. Vaxigrip®, which is 2018/2019 seasonal tetravalent influenza vaccine 411V, was used as a model antigen C of FIG. 10 shows that the higher amount of total IgG in NVTI and NVT II groups was maintained until 17 weeks after vaccination.

D of FIG. 10 shows that the hemagglutination inhibition (HAI) titer 40 was maintained at least over 40 until week 17 in proportion to the amount of neutralizing antibodies. HAI≥40 is a correlate of protection (COP) in which at least 50% of vaccinated individuals are protected.

As a result, the antigen dose could be reduced to about ⅕ level in NVT- and about ¹/₂₅ in NVT II adjuvanted groups as compared to non-adjuvanted antigen alone (B of FIG. 10). This effect lasted for at least 17 weeks after injection (C of FIG. 10). NVT adjuvant in this invention could spare an antigen dose; the amount of vaccine antigen required to secure the needed immunity can be considerably reduced.

The increase in binding antibody was closely related to the rise in HAI titer of 40 or more, which is a correlate of protection (COP) against the influenza virus, likely capable of providing sufficient protective immunity to 50% of challenged or infected individuals. Though both adjuvants considerably increased HAI titer, NVT II especially elicited the HAI titer by 3 to 5-fold to both influenza A virus (IAV subtype H1N1) and influenza B virus (IBV) (D of FIG. 10).

Example 11. Dose Sparing Effect by hsRNA on Commercial Meningitis Vaccine

NVT was used as an adjuvant while administering the Menactra® vaccine to mice. The Menactra® vaccine is a CRM197-conjugate vaccine against *Neisseria meningitidis* groups A, C, Y, and W-135. Specifically, vaccine antigens were covalently linked to the diphtheria toxin-derived carrier protein CRM197.

Figure 11:
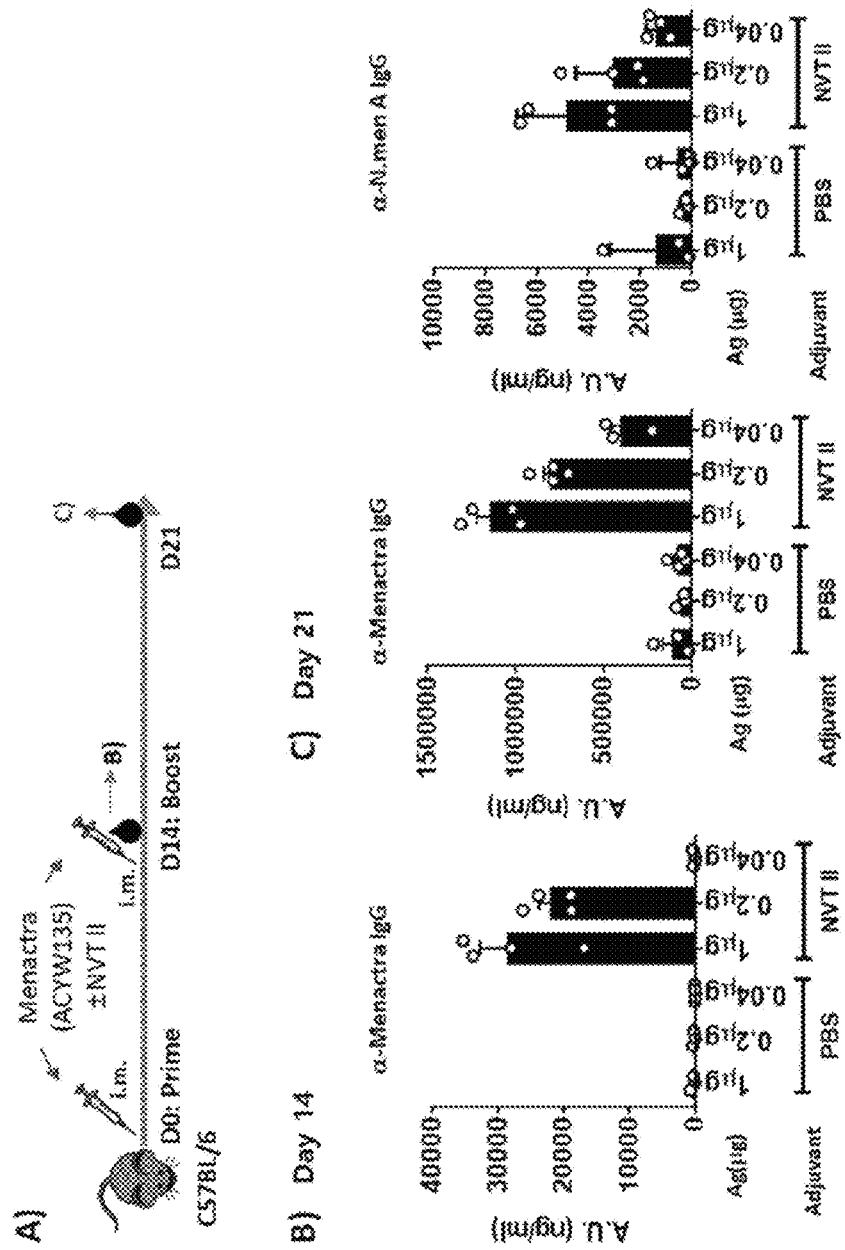
FIG. 11 shows an induction in antibody IgG against a meningococcus vaccine (Menactra®, Sanofi) adjuvanted with NVT 11.

FIG. 11 shows the induction in antibody IgG against a meningococcus vaccine (Menactra®, Sanofi) adjuvanted with the NVT II. FIG. 11A is a schematic diagram of the test method.

B and C of FIG. 11 show antibody increase against the total conjugated antigen (Menactra®) and A type of antigen at 14 and 21 days, respectively, after priming. As shown in FIGS. 11B and 11C, NVT II-adjuvanted Menactra® vaccine strongly induced Menactra® specific antibody by 5 times or more.

Example 12. Immunogenicity Restoration Effect of NVT II

The influenza vaccine (2018/2019 QIV Vaxigrip®) was incubated at 37° C. for 5 weeks to abolish immunogenicity, followed by adjuvanted with NVT II and injected intramuscularly. The IgG ELISA and HAI assay were performed at indicated time points until 18 weeks post-priming.

Figure 12:
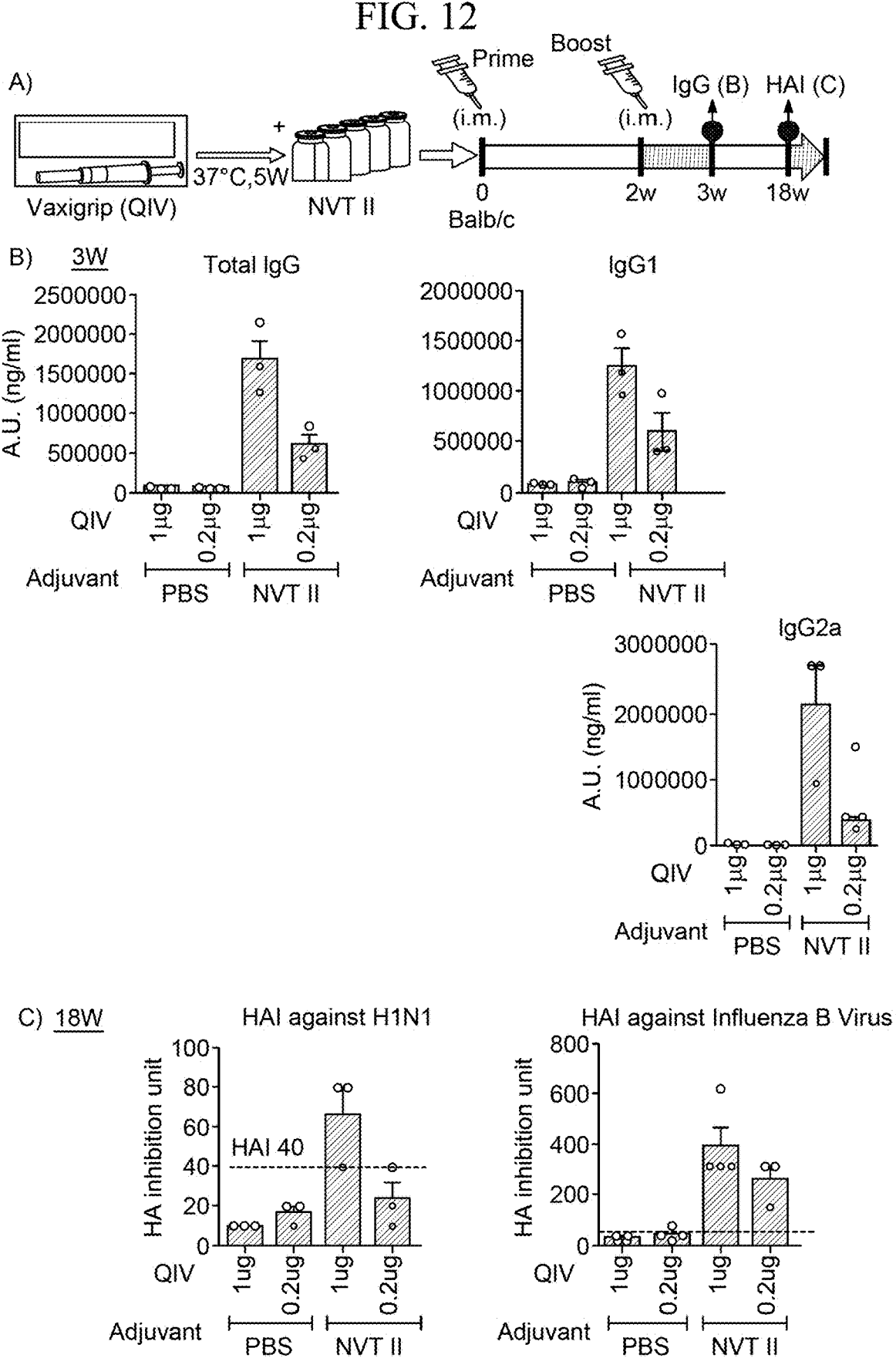
FIG. 12 shows an effect of the NVT II adjuvant on immunogenicity restoration.

FIG. 12 shows an effect of the NVT II adjuvant on immunogenicity restoration. A of FIG. 12 is a schematic diagram of the test method. Vaxigrip® was incubated at 37° C. for 5 weeks and adjuvanted with NVT II or PBS, and the vaccine was injected into mice via intramuscular injection according to the injection schedule as shown in A of FIG. 12. B of FIG. 12 shows that NVT II restored the immunogenicity of Vaxigrip® as assessed by the IgG antibody level. Note Vaxigrip® alone completely lost the immunogenicity. C of FIG. 12 shows that the NVT II-mediated IgG level was correlated with an increase in the HAI titer 50 against IAV H1N1 and IBV at week 18.

As a result, as shown in B of FIG. 12, the binding antibody was markedly increased, and the immunogenicity appeared to be restored. In addition, there was an antigen-saving effect by at least 10 times. As shown in C of FIG. 12, the binding antibody increase correlates with an increase in neutralizing antibodies as the HAI titer against H1N1 and IBV increased to 40 or more at week 18.

In another experiment, when Vaxigrip® was pre-mixed with NVT II and left at 37° C. for 5 weeks, antigenicity was fully maintained, and HAI titer was increased to 40 or more (data not shown).

Example 13. Anti-Tumor Effect of hsRNA on Melanoma Growth In Vivo

Following subcutaneous implantation of B16F10-OVA melanoma cells to 7-week-old female C57BL/6 mice, the NVT in PBS was administered intratumorally or intramuscularly three times at an interval of 2 days from day 6.

Figure 13:
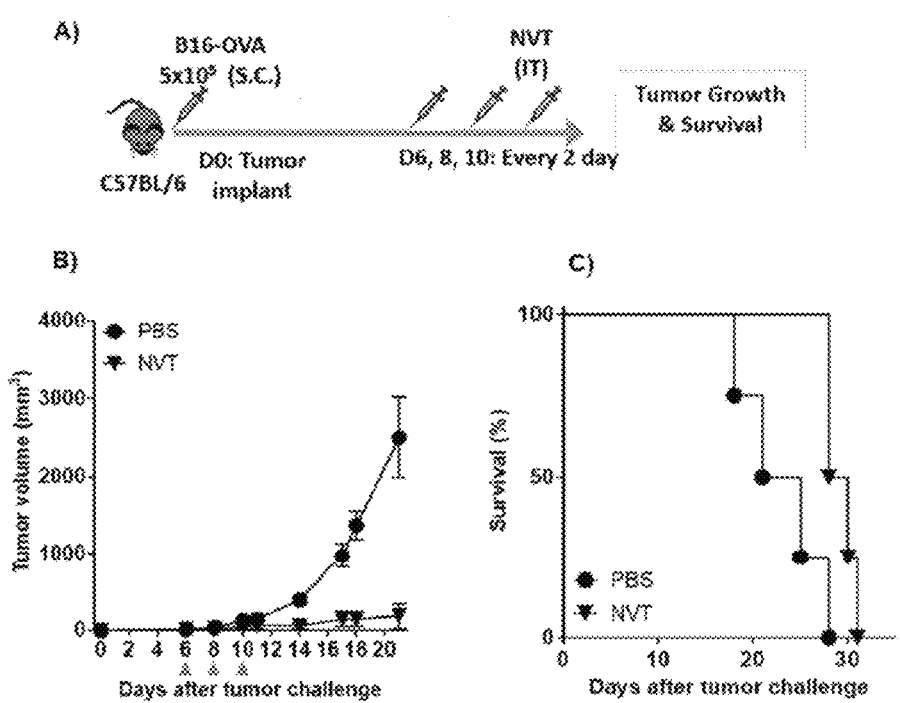
FIG. 13 shows an effect of the hsRNA alone on the arrest of melanoma growth.

FIG. 13 shows an effect of the hsRNA alone on the arrest of melanoma growth. A of FIG. 13 is a schematic diagram of the test method. On 6 days after B16F10-OVA melanoma cell implantation to 7-week-old female C57BL/6 mice, the NVT was administered intratumoral route on days 6, 8, and 10, which was followed by measurement of the tumor mass and mice survival. B of FIG. 13 shows that the hsRNA NVT significantly arrests melanoma growth. C of FIG. 13 shows that the hsRNA NVT prolonged the survival rate of the mice.

As shown in B and C of FIG. 13, tumor growth was retarded in the mice administered with the NVT, and mice survived longer as compared to the control.

Example 14. Inhibitory Effect of the hsRNA on the Growth of Colorectal Cancer and Lung Cancer In Vivo Following subcutaneous implantation of CT26 colorectal cancer and LL/2 lung cancer to 7-week-old female C57BL/6 mice, NVT in PBS alone was administered subcutaneously, intratumorally or intramuscularly once every two days over a total of 8 times.

Figure 14:
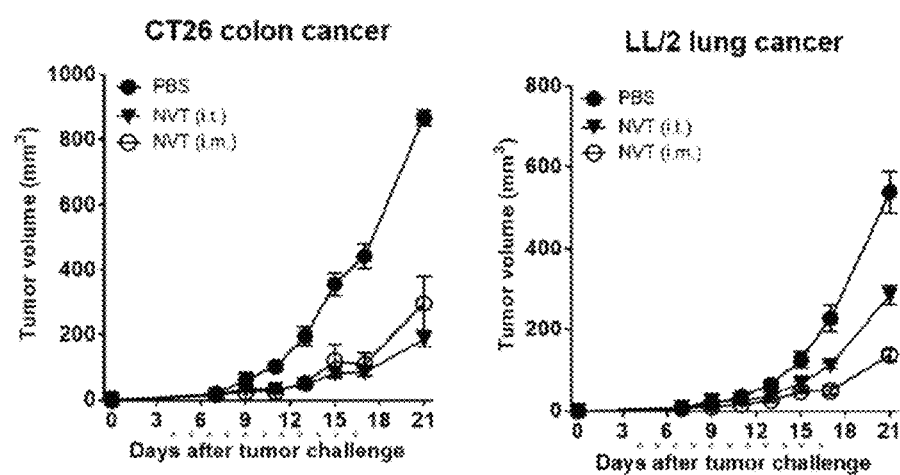
FIG. 14 shows an effect of the hsRNA alone on the growth arrest of colorectal cancer and lung cancer.

FIG. 14 shows an effect of the hsRNA NVT alone on the growth arrest of colorectal cancer and lung cancer. As shown in FIG. 14, the growth of colorectal and lung cancer in mice was retarded by the NVT treatment.

Example 15. Inhibitory Effect of the hsRNA Alone on the Growth and Lung Metastasis of Triple-Negative Breast Cancer (TNBC) In Vivo Following subcutaneous implantation of a 4T1 triple-negative breast cancer (TNBC) cell line to mammary adipose tissue of 7-week-old female C57BL/6 mice, the hsRNA NVT in PBS alone was intratumorally administered once every two days from day 8 over a total of 9 times.

Figure 15:
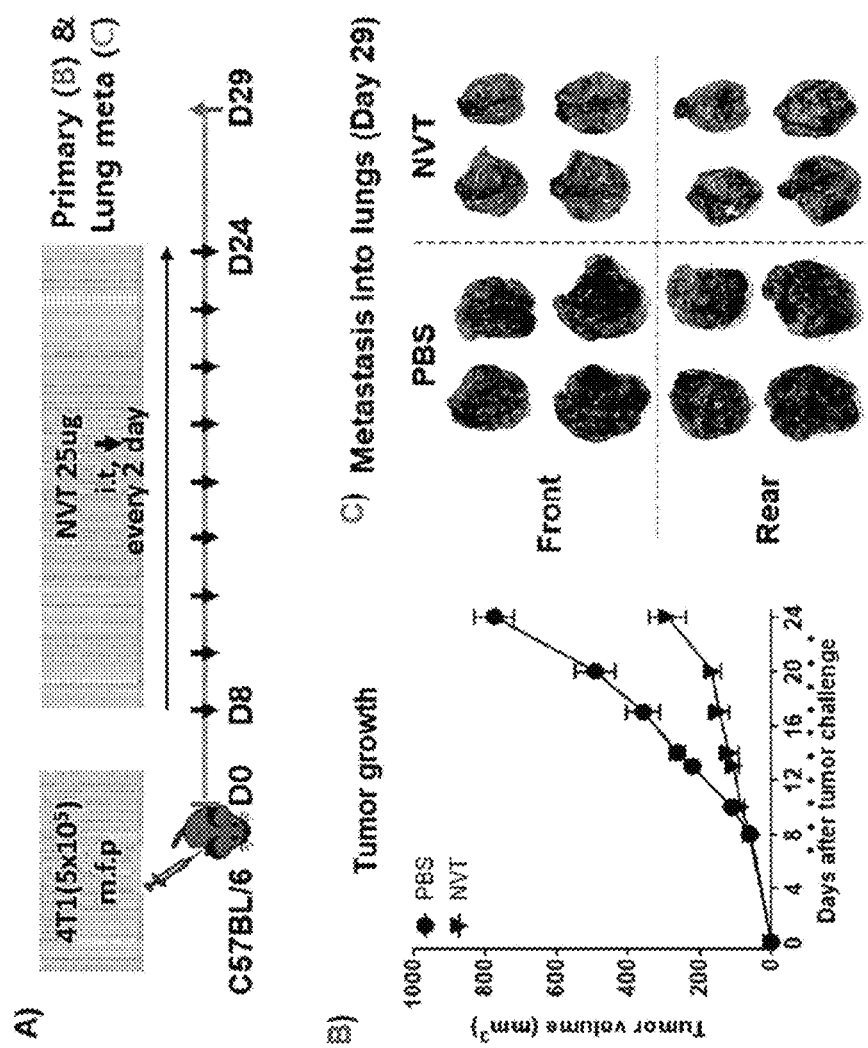
FIG. 15 shows an inhibitory effect of the hsRNA alone on the growth arrest and metastasis of triple-negative breast cancer (TNBC).

FIG. 15 shows an inhibitory effect of the hsRNA in PBS alone on the growth arrest and metastasis of triple-negative breast cancer (TNBC). A of FIG. 15 is a schematic diagram of the test method. A triple-negative breast cancer (TNBC) cells 4T1 was subcutaneously implanted to mammary adipose tissue of 7-week-old female C57BL/6 mice. The NVT hsRNA was intratumorally administered alone once every two days from day 8 over a total of 9 times, which was followed by measurement of tumor masses on indicated days. B of FIG. 15 shows that the NVT arrested the growth of the primary breast by 60%. C of FIG. 15 shows that NVT suppressed metastasis of primary breast cancer to the lung.

As shown in B and C of FIG. 15, primary breast cancer was retarded by 60%, and this growth arrest was consistent with a marked reduction in remote metastasis into the lung.

Example 16. Anti-Metastasis to the Liver of the hsRNA Alone or hsRNA-Complexed TAA Vaccine In Vivo The vaccines (i) PBS, (ii) OVA, (iii) NVT, (iv) OVA+NVT were pre-administered intraperitoneally on day 0. On the third day, B16F10-OVA melanoma was intrasplenically implanted into 7-week-old female C57BL/6 mice. In the following 3 days, and the same vaccines were administered intraperitoneally, and then the degree of metastasis from the spleen to the liver was investigated.

Figure 16:
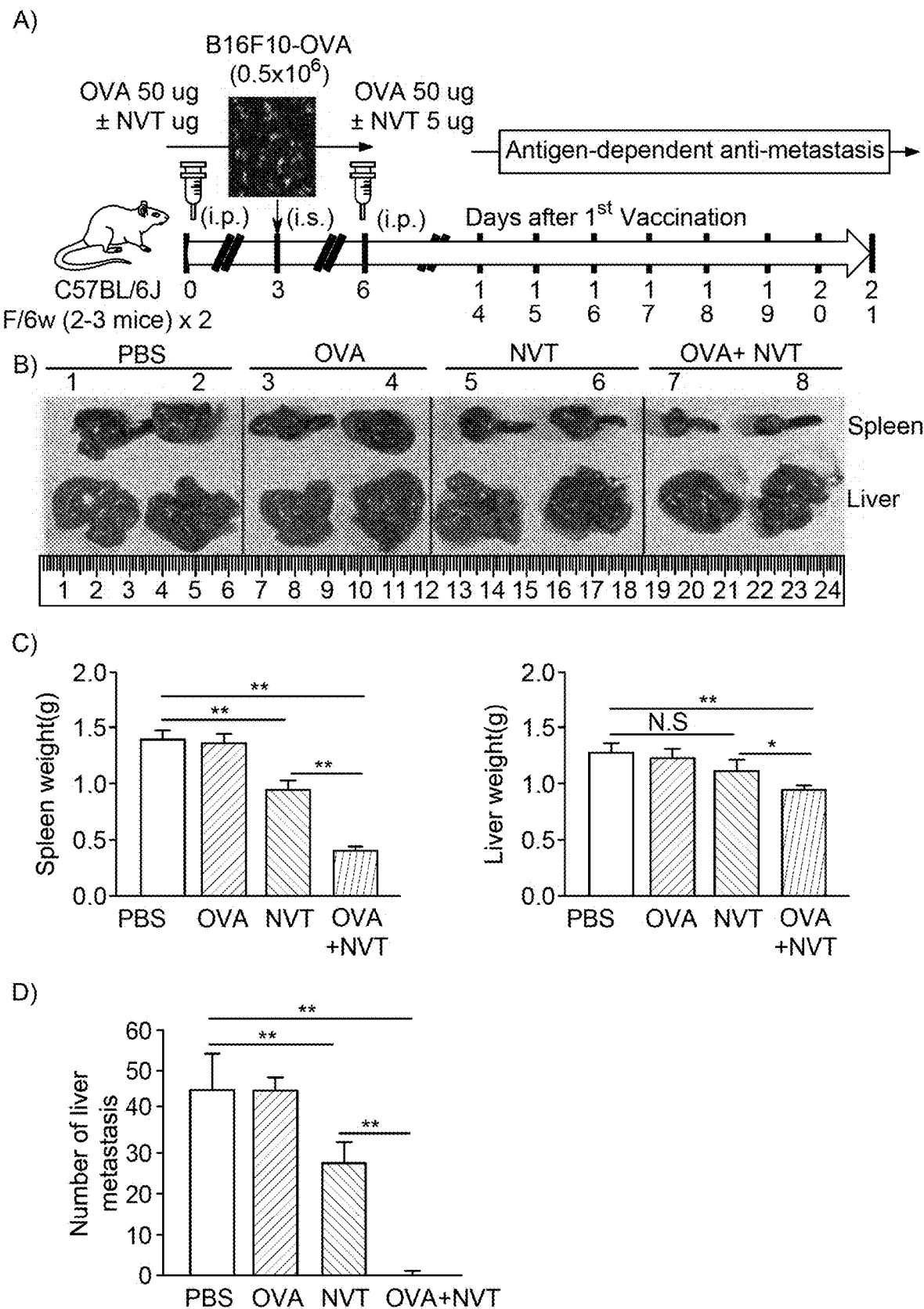
FIG. 16 shows an inhibitory effect of NVT-adjuvanted OVA cancer vaccine administered intraperitoneally on the melanoma cell metastasis.

FIG. 16 shows an inhibitory effect of NVT-adjuvanted OVA cancer vaccine administered intraperitoneally on melanoma cell metastasis. A of FIG. 16 is a schematic diagram of the test method. B of FIG. 16 shows the morphology of the spleen and liver on day 18, where the size and metastatic nodules in the liver can be clearly seen.

C of FIG. 16 shows an average weight of the spleen and liver on day 18.

D of FIG. 16 shows the number of metastasized tumor nodules to the liver. The metastasis to the liver was markedly suppressed in the NVT alone, or NVT+OVA treated group.

As shown in B and C of FIG. 16, metastasis in the NVT- or OVA+NVT treated groups was lower than in the non-treated or OVA alone-treated group. As shown in D of FIG. 16, the metastasis to the liver on day 18 was lower by about 50% in NVT alone and by 90% or more in the OVA+NVT group. As for survival, whereas all mice died within 18 days, starting from day 14 in all other groups, mice in the OVA+NVT-treated group died within 28 days, starting from day 24.

Example 17. Inhibitory Effect of the hsRNA-Adjuvanted OX40 Ab Complex on Primary and Remote Melanoma Growth Following subcutaneous implantation of B16F10-OVA melanoma cells to the left flank of 7-week-old female C57BL/6 mice, the cancer vaccines (i) PBS, (ii) PD-1 Ab, (iii) IR cells, which are irradiated cancer cells, and (iv) IR cells+NVT+OX40 Ab was administered, respectively intratumorally into the primary cancer tissue once every two days four times (on day 6, 8, 10, and 12) after tumor implantation. The growth of the cancer was measured until day 22.

Figure 17:
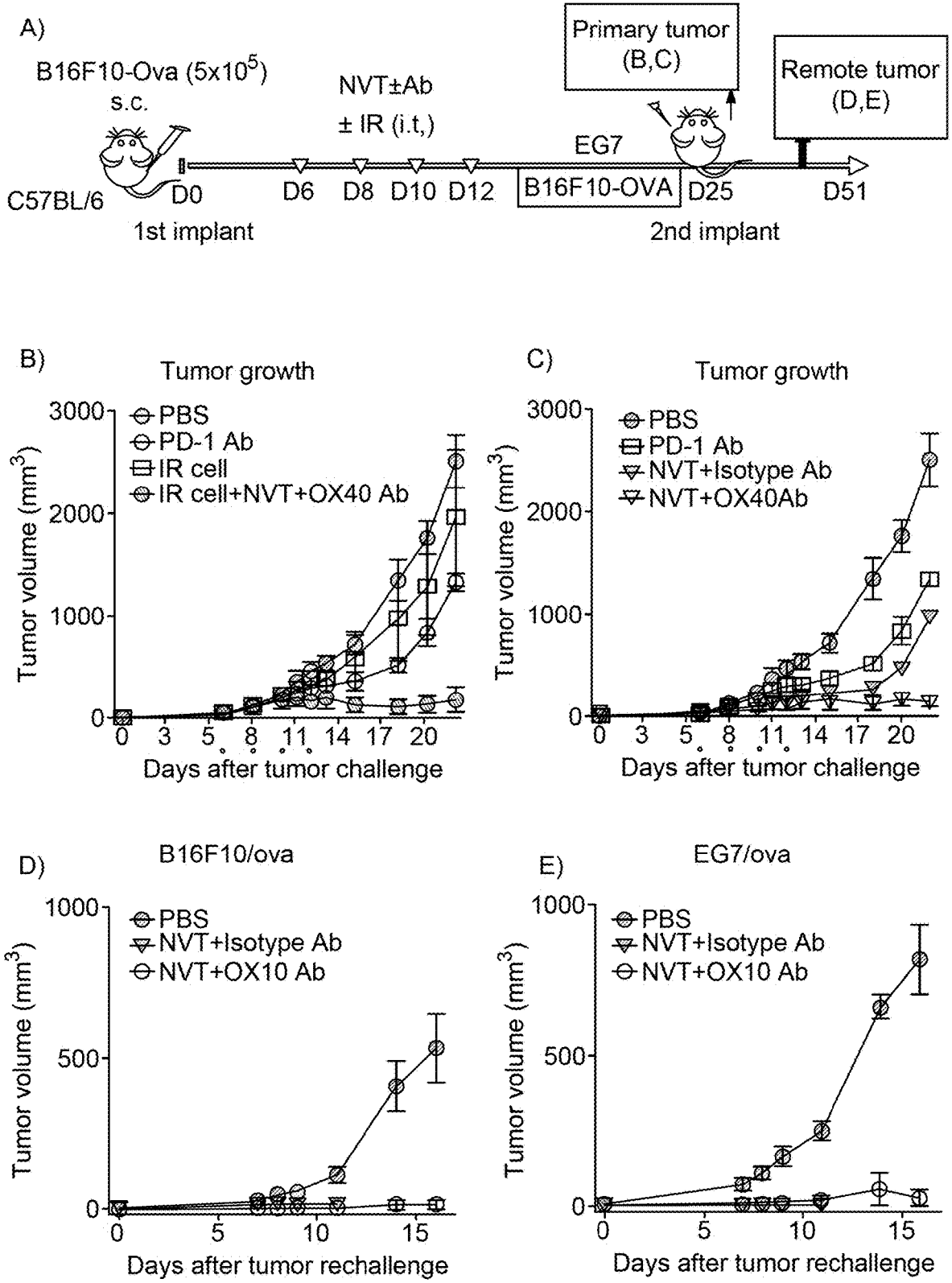
FIG. 17 shows an inhibitory effect of a cancer vaccine comprising the hsRNA and an OX40 antibody on primary and remote cancer growth.

FIG. 17 shows an inhibitory effect of a cancer vaccine comprising the hsRNA NVT and an OX40 antibody on primary and remote cancer growth. A of FIG. 17 is a schematic diagram of the test method. A melanoma cell line B16F10 OVA was subcutaneously implanted to the left flank of 7-week-old female C57BL/6 mice. On day 6 post-implantation, the indicated regimens were (i.e., IR+NVT+OX40 Ab) were administered 4 times once every 2 days (primary cancer). On day 15, the same the mice received B16F10-OVA or EG7/OVA cells on the right flank (remote cancer), which was followed by measurement of tumor masses on indicated days.

B of FIG. 17 shows that irradiated cancer (IR) cell+NVT+OX40 Ab composition considerably inhibited the growth of primary cancer. C of FIG. 17 shows that NVT+OX40 Ab without IR cell fully inhibited the primary melanoma growth. D and E of FIG. 17 show that only NVT+OX40 Ab fully inhibited the remote cancer B16FO-OVA identical to the primary tumor and heterologous remote cancer EG7/OVA.

As shown in B of FIG. 17, whereas primary cancer growth was suppressed by about 50% and 20% only in the PD-I antibody and IR cell, respectively, 90% growth arrest was observed in the IR+NVT+OX40 Ab group.

As shown in C of FIG. 17, NVT+OX40 Ab without IR cells suppressed the growth of primary cancer almost to the same extent to the above, non-necessitating the TAA in the vaccine composition.

On day 15, two cancers (B16F10/OVA) and T cell lymphoma (EG7/OVA) of allogeneic origin were implanted to the second site on the right flank on the opposite side from the first implantation. The growth was measured for the following 16 days without further administering therapeutic vaccines.

As a result, all mice of NVT+OX40 Ab injection resulted in almost no growth in the second site cancer. In contrast, all mice of the NVT+ isotype Ab group died before day 11. Therefore, the size of the mass was not shown in the figure (D and E of FIG. 17).

In summary, the growth of primary melanoma was inhibited by 90% or more with NVT+OX40 Ab regardless of IR. Besides, remote cancers implanted in the other site were also arrested by NVT+OX40 Ab.

Example 18. Inhibitory Effect of the hsRNA-Adjuvanted PD-1 Antibody Or OX40 Complex on Primary and Remote Melanoma Following subcutaneous implantation of B16F10-OVA melanoma cells to the left and right flanks of 7-week-old female C57BL/6 mice, the cancer vaccines (i) PBS, (ii) NVT, (iii) NVT+OX40 antibody (OX40 Ab) (clone OX-86, Rat IgG1, InvivoGen), and (iv) NVT+PD-1 antibody (PD-1 Ab) (clone RMP1-14, Rat IgG2a/λ, InvivoGen) were administered intratumorally into the left primary cancer tissue once every two days four times (on day 6, 8, 10, and 12) after tumor implantation. The growth of cancer in the left flank side (vaccinated tumor) and the right side (remote tumor) were measured until day 20.

Figure 18:
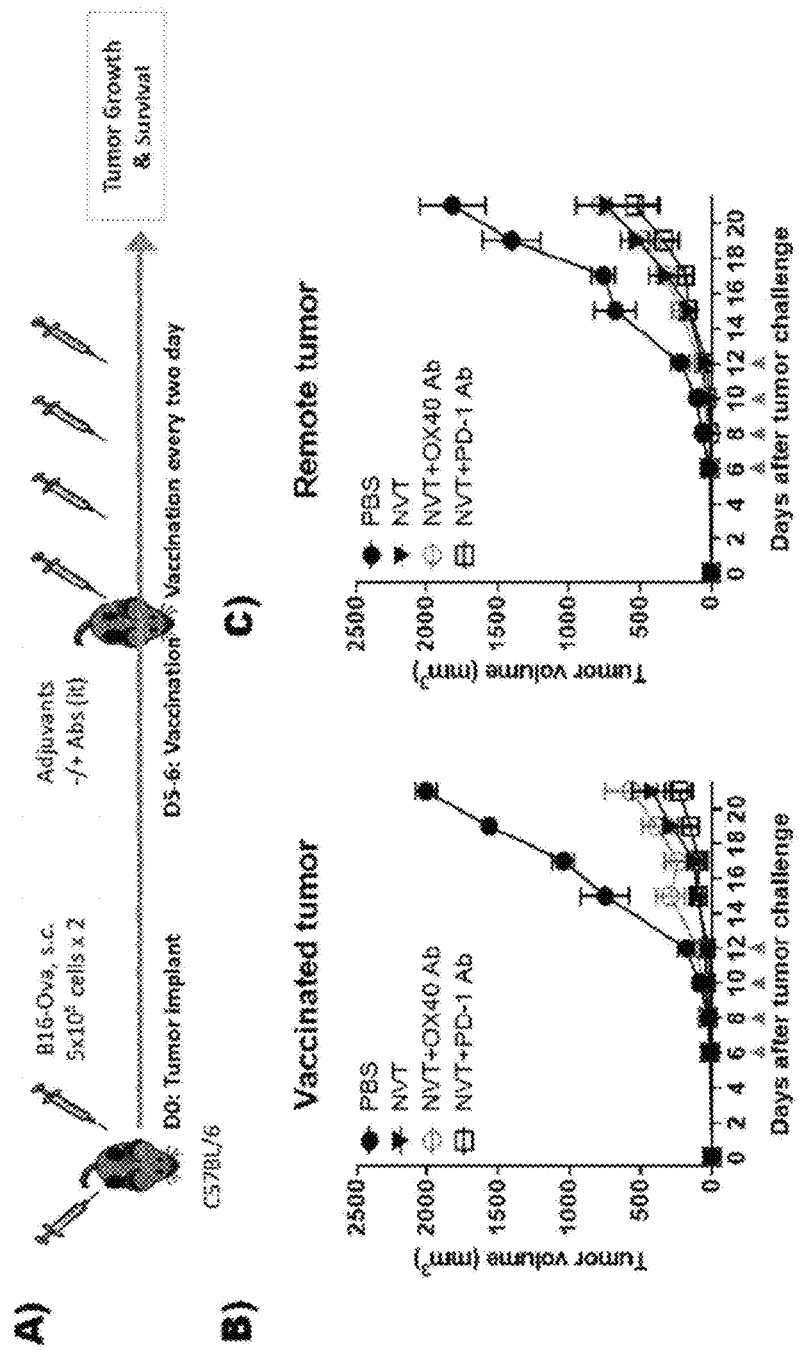
FIG. 18 shows an inhibitory effect of the hsRNA in combination with a PD-1 antibody or OX40 antibody on melanoma growth.

FIG. 18 shows the inhibitory effect of the hsRNA NVT in combination with the ant-PD-1 antibody or OX40 antibody on melanoma growth.

A of FIG. 18 is a schematic diagram of the test method. B of FIG. 18 shows that the tumor inhibitory effect of the NVT+PD-1 composition is generally similar to that of the NVT+OX40 Ab composition.

C of FIG. 18 shows that the two compositions have similar inhibitory effects on the tumors of remote cancer.

As a result, the inhibitory effect NVT+PD-1 Ab on primary cancer was similar to or better than that of NVT+OX40 Ab. The same results were observed in the nonvaccinated remote tumors.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hetero-structured RNA (hsRNA), comprising:
a heteropolymeric double-stranded RNA (dsRNA) region having a first strand and a second strand and single-stranded RNA (ssRNA) regions,
wherein the ssRNA regions are positioned at the 3'-end of the first strand and the 3'-end of the second strand,
which is a RNase T1 cleaved product of a double-stranded RNA formed by base pairing the nucleotide sequence of SEQ ID NO: 30 with the nucleotide sequence of SEQ ID NO: 61,
wherein the ssRNA region is the UAUAG sequence at the 3'-end of the first strand and the second strand.

2. A pharmaceutical composition comprising the hsRNA of claim 1.

3. The pharmaceutical composition of claim 2, wherein the pharmaceutical composition is for preventing or treating an infection, cancer, or for providing an immune response to an antigen.

4. The pharmaceutical composition of claim 3, wherein the infection is a viral or bacterial infection.

5. The pharmaceutical composition of claim 3, wherein the cancer is melanoma, skin cancer, breast cancer, lung cancer, colorectal cancer, pancreas cancer, or a combination thereof.

6. The pharmaceutical composition of claim 3, wherein the pharmaceutical composition further comprises an antigen or therapeutic agent.

7. The pharmaceutical composition of claim 6, wherein the therapeutic agent is an anti-cancer drug.

8. A method of treating a disease or disorder comprising administering to a subject in need of such treatment a therapeutically effective amount of the hsRNA of claim 1.

9. The method of claim 8, wherein the disease or disorder is an infection or cancer.

10. The method of claim 9, wherein the infection is a viral or bacterial infection.

11. The method of claim 9, wherein the cancer is melanoma, skin cancer, breast cancer, lung cancer, colorectal cancer, pancreas cancer, or a combination thereof.

12. A method of enhancing an immune response to an antigen in a subject comprising administering to a subject in need of such treatment a therapeutically effective amount of the hsRNA of claim 1.

* * * * *